United States Patent
ElBsat et al.

(10) Patent No.: US 11,747,800 B2
(45) Date of Patent: Sep. 5, 2023

(54) MODEL PREDICTIVE MAINTENANCE SYSTEM WITH AUTOMATIC SERVICE WORK ORDER GENERATION

(71) Applicant: Johnson Controls Technology Company, Auburn Hills, MI (US)

(72) Inventors: Mohammad N. ElBsat, Milwaukee, WI (US); Michael J. Wenzel, Oak Creek, WI (US); Zhigang Wu, Suzhou (CN); Yasutaka Yoshida, Shimizu-Ku (JP); Robert D. Turney, Watertown, WI (US); Liming Yang, Mequon, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 322 days.

(21) Appl. No.: 16/418,686

(22) Filed: May 21, 2019

(65) Prior Publication Data

US 2019/0271978 A1   Sep. 5, 2019

Related U.S. Application Data

(63) Continuation-in-part of application No. 15/895,836, filed on Feb. 13, 2018, now Pat. No. 11,487,277.
(Continued)

(51) Int. Cl.
   *G05B 23/02*   (2006.01)
   *G06Q 30/0282*   (2023.01)

(52) U.S. Cl.
   CPC ..... *G05B 23/0283* (2013.01); *G05B 23/0294* (2013.01); *G06Q 30/0282* (2013.01)

(58) Field of Classification Search
   CPC ............ G05B 23/0283; G05B 23/0294; G05B 2219/2642; G05B 15/02; G05B 17/02;
   (Continued)

(56) References Cited

U.S. PATENT DOCUMENTS 5,216,612 A   6/1993 Cornett et al.
5,630,070 A   5/1997 Dietrich et al.
(Continued)

FOREIGN PATENT DOCUMENTS

CA   2499695   4/2004
EP   3 088 972 A2   11/2016
(Continued)

OTHER PUBLICATIONS

Don Weigel and Buyang Cao, "Applying GIS and OR Techniques to Solve Sears Technician—Dispatching and Home Delivery Problems", Jan./Feb. 1999, Interfaces 29, pp. 112-130.*
(Continued)

*Primary Examiner* — Juan C Ochoa
(74) *Attorney, Agent, or Firm* — Foley & Lardner LLP

(57) ABSTRACT

An automatic work order generation system for model predictive maintenance (MPM) of building equipment including an MPM system including an equipment controller to operate the building equipment to affect an environmental condition of a building. The MPM system can perform a predictive optimization to determine a service time at which to service the building equipment. The automatic work order generation system includes an equipment service scheduler that can determine whether any service providers are available to perform equipment service within a predetermined time range of the service time. In response to determining that service providers are available to perform the equipment service, the equipment service scheduler can select a service provider and an appointment time based on one or more service provider attributes. The equipment service scheduler can generate a service work order and transmit the service work order to the service provider to schedule a service appointment.

7 Claims, 15 Drawing Sheets

Related U.S. Application Data

(60) Provisional application No. 62/511,113, filed on May 25, 2017.

(58) Field of Classification Search
CPC . G06Q 30/0206; G06Q 10/20; G06Q 30/0282
USPC ........................................................ 703/2, 6
See application file for complete search history.

(56) References Cited

U.S. PATENT DOCUMENTS

| | | | |
|---|---|---|---|
| 7,062,361 | B1 | 6/2006 | Lane |
| 7,124,059 | B2* | 10/2006 | Wetzer ............... G05B 23/0283 702/184 |
| 7,457,762 | B2* | 11/2008 | Wetzer ............. G06Q 10/06315 705/7.25 |
| 7,464,046 | B2* | 12/2008 | Wilson ................... G06Q 10/06 705/7.15 |
| 7,693,735 | B2* | 4/2010 | Carmi ............. G06Q 10/06398 705/7.16 |
| 8,014,892 | B2 | 9/2011 | Glasser |
| 8,126,574 | B2 | 2/2012 | Discenzo et al. |
| 8,170,893 | B1 | 5/2012 | Rossi |
| 8,396,571 | B2 | 3/2013 | Costiner et al. |
| 8,880,962 | B2 | 11/2014 | Hosking et al. |
| 8,903,554 | B2 | 12/2014 | Stagner |
| 9,058,568 | B2 | 6/2015 | Hosking et al. |
| 9,058,569 | B2 | 6/2015 | Hosking et al. |
| 9,185,176 | B2* | 11/2015 | Nielsen ................ G06Q 10/063 |
| 9,235,847 | B2 | 1/2016 | Greene et al. |
| 9,424,693 | B2 | 8/2016 | Rodrigues |
| 9,514,577 | B2 | 12/2016 | Ahn et al. |
| 9,740,545 | B2 | 8/2017 | Aisu et al. |
| 9,760,068 | B2 | 9/2017 | Harkonen et al. |
| 10,094,586 | B2 | 10/2018 | Pavlovski et al. |
| 10,101,731 | B2 | 10/2018 | Asmus et al. |
| 10,190,793 | B2 | 1/2019 | Drees et al. |
| 10,250,039 | B2 | 4/2019 | Wenzel et al. |
| 10,359,748 | B2 | 7/2019 | Elbsat et al. |
| 10,437,241 | B2 | 10/2019 | Higgins et al. |
| 10,438,303 | B2 | 10/2019 | Chen et al. |
| 10,591,875 | B2 | 3/2020 | Shanmugam et al. |
| 10,700,942 | B2 | 6/2020 | Hamilton et al. |
| 10,762,475 | B2 | 9/2020 | Song et al. |
| 11,003,175 | B2 | 5/2021 | Xenos et al. |
| 2002/0072988 | A1 | 6/2002 | Aram |
| 2003/0158803 | A1 | 8/2003 | Darken et al. |
| 2004/0049295 | A1 | 3/2004 | Wojsznis et al. |
| 2004/0054564 | A1 | 3/2004 | Fonseca et al. |
| 2005/0091004 | A1 | 4/2005 | Parlos et al. |
| 2007/0005191 | A1 | 1/2007 | Sloup et al. |
| 2007/0203860 | A1 | 8/2007 | Golden et al. |
| 2009/0204267 | A1 | 8/2009 | Sustaeta et al. |
| 2009/0210081 | A1 | 8/2009 | Sustaeta et al. |
| 2009/0240381 | A1 | 9/2009 | Lane |
| 2009/0313083 | A1 | 12/2009 | Dillon et al. |
| 2009/0319090 | A1 | 12/2009 | Dillon et al. |
| 2010/0241285 | A1 | 9/2010 | Johnson et al. |
| 2011/0018502 | A1 | 1/2011 | Bianciotto et al. |
| 2011/0035328 | A1* | 2/2011 | Nielsen ............ G06Q 10/06311 705/342 |
| 2011/0093310 | A1 | 4/2011 | Watanabe et al. |
| 2011/0130857 | A1 | 6/2011 | Budiman et al. |
| 2011/0178643 | A1 | 7/2011 | Metcalfe |
| 2011/0231028 | A1 | 9/2011 | Ozog |
| 2011/0231320 | A1 | 9/2011 | Irving |
| 2012/0016607 | A1 | 1/2012 | Cottrell et al. |
| 2012/0036250 | A1 | 2/2012 | Vaswani et al. |
| 2012/0092180 | A1 | 4/2012 | Rikkola et al. |
| 2012/0245968 | A1 | 9/2012 | Beaulieu et al. |
| 2012/0296482 | A1 | 11/2012 | Steven et al. |
| 2012/0310860 | A1 | 12/2012 | Kim et al. |
| 2012/0316906 | A1 | 12/2012 | Hampapur et al. |
| 2013/0006429 | A1 | 1/2013 | Shanmugam et al. |
| 2013/0010348 | A1 | 1/2013 | Massard et al. |
| 2013/0020443 | A1 | 1/2013 | Dyckrup et al. |
| 2013/0103481 | A1 | 4/2013 | Carpenter et al. |
| 2013/0113413 | A1 | 5/2013 | Harty |
| 2013/0204443 | A1 | 8/2013 | Steven et al. |
| 2013/0274937 | A1 | 10/2013 | Ahn et al. |
| 2013/0282195 | A1 | 10/2013 | O'Connor et al. |
| 2013/0339080 | A1 | 12/2013 | Beaulieu et al. |
| 2014/0039709 | A1 | 2/2014 | Steven et al. |
| 2014/0163936 | A1 | 6/2014 | Hosking et al. |
| 2014/0201018 | A1 | 7/2014 | Chassin |
| 2014/0244051 | A1 | 8/2014 | Rollins et al. |
| 2014/0249680 | A1 | 9/2014 | Wenzel |
| 2014/0277769 | A1 | 9/2014 | Matsuoka et al. |
| 2014/0316973 | A1 | 10/2014 | Steven et al. |
| 2015/0008884 | A1 | 1/2015 | Waki et al. |
| 2015/0088576 | A1 | 3/2015 | Steven et al. |
| 2015/0134123 | A1 | 5/2015 | Obinelo |
| 2015/0309495 | A1 | 10/2015 | Delorme et al. |
| 2015/0311713 | A1 | 10/2015 | Asghari et al. |
| 2015/0316903 | A1 | 11/2015 | Asmus et al. |
| 2015/0316907 | A1 | 11/2015 | Elbsat et al. |
| 2015/0326015 | A1 | 11/2015 | Steven et al. |
| 2015/0331972 | A1 | 11/2015 | McClure et al. |
| 2015/0371328 | A1 | 12/2015 | Gabel et al. |
| 2016/0020608 | A1 | 1/2016 | Carrasco et al. |
| 2016/0043550 | A1 | 2/2016 | Sharma et al. |
| 2016/0077880 | A1 | 3/2016 | Santos et al. |
| 2016/0092986 | A1 | 3/2016 | Lian et al. |
| 2016/0148137 | A1 | 5/2016 | Phan et al. |
| 2016/0148171 | A1 | 5/2016 | Phan et al. |
| 2016/0190805 | A1 | 6/2016 | Steven et al. |
| 2016/0209852 | A1 | 7/2016 | Beyhaghi et al. |
| 2016/0216722 | A1 | 7/2016 | Tokunaga et al. |
| 2016/0218505 | A1 | 7/2016 | Krupadanam et al. |
| 2016/0246908 | A1 | 8/2016 | Komzsik |
| 2016/0275630 | A1 | 9/2016 | Strelec et al. |
| 2016/0281607 | A1 | 9/2016 | Asati et al. |
| 2016/0305678 | A1 | 10/2016 | Pavlovski et al. |
| 2016/0329708 | A1 | 11/2016 | Day |
| 2016/0356515 | A1 | 12/2016 | Carter |
| 2016/0363948 | A1 | 12/2016 | Steven et al. |
| 2016/0373453 | A1 | 12/2016 | Ruffner et al. |
| 2016/0379149 | A1 | 12/2016 | Saito et al. |
| 2017/0003667 | A1 | 1/2017 | Nakabayashi et al. |
| 2017/0083822 | A1 | 3/2017 | Adendorff et al. |
| 2017/0097647 | A1 | 4/2017 | Lunani et al. |
| 2017/0102162 | A1 | 4/2017 | Drees et al. |
| 2017/0102433 | A1 | 4/2017 | Wenzel et al. |
| 2017/0102434 | A1 | 4/2017 | Wenzel et al. |
| 2017/0102675 | A1 | 4/2017 | Drees |
| 2017/0103483 | A1 | 4/2017 | Drees et al. |
| 2017/0104332 | A1 | 4/2017 | Wenzel et al. |
| 2017/0104336 | A1 | 4/2017 | Elbsat et al. |
| 2017/0104337 | A1 | 4/2017 | Drees |
| 2017/0104342 | A1 | 4/2017 | Elbsat et al. |
| 2017/0104343 | A1 | 4/2017 | Elbsat et al. |
| 2017/0104344 | A1 | 4/2017 | Wenzel et al. |
| 2017/0104345 | A1 | 4/2017 | Wenzel et al. |
| 2017/0104346 | A1 | 4/2017 | Wenzel et al. |
| 2017/0104449 | A1 | 4/2017 | Drees |
| 2017/0167742 | A1 | 6/2017 | Radovanovic et al. |
| 2017/0169143 | A1 | 6/2017 | Farahat et al. |
| 2017/0205818 | A1 | 7/2017 | Adendorff et al. |
| 2017/0236222 | A1 | 8/2017 | Chen et al. |
| 2017/0268795 | A1 | 9/2017 | Yamamoto et al. |
| 2017/0288455 | A1 | 10/2017 | Fife |
| 2017/0309094 | A1 | 10/2017 | Farahat et al. |
| 2017/0351234 | A1 | 12/2017 | Chen et al. |
| 2017/0366414 | A1 | 12/2017 | Hamilton et al. |
| 2018/0046149 | A1* | 2/2018 | Ahmed .................. G06Q 10/10 |
| 2018/0082373 | A1 | 3/2018 | Hong et al. |
| 2018/0173214 | A1 | 6/2018 | Higgins et al. |
| 2018/0180314 | A1 | 6/2018 | Brisette et al. |
| 2018/0196456 | A1 | 7/2018 | Elbsat |
| 2018/0197253 | A1 | 7/2018 | Elbsat et al. |
| 2018/0203961 | A1 | 7/2018 | Aisu et al. |
| 2018/0224814 | A1 | 8/2018 | Elbsat et al. |
| 2018/0341255 | A1 | 11/2018 | Turney et al. |
| 2018/0373234 | A1 | 12/2018 | Khalate et al. |

(56) References Cited

U.S. PATENT DOCUMENTS

| | | |
|---|---|---|
| 2019/0066236 A1 | 2/2019 | Wenzel |
| 2019/0129403 A1 | 5/2019 | Turney et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0325368 A1 | 10/2019 | Turney et al. |
| 2019/0338972 A1 | 11/2019 | Schuster et al. |
| 2019/0338973 A1 | 11/2019 | Turney et al. |
| 2019/0338974 A1 | 11/2019 | Turney et al. |
| 2019/0338977 A1 | 11/2019 | Turney et al. |
| 2019/0347622 A1 | 11/2019 | Elbsat et al. |
| 2019/0354071 A1 | 11/2019 | Turney et al. |
| 2020/0090289 A1 | 3/2020 | Elbsat et al. |
| 2020/0096985 A1 | 3/2020 | Wenzel et al. |
| 2020/0166230 A1 | 5/2020 | Ng et al. |

FOREIGN PATENT DOCUMENTS

| | | |
|---|---|---|
| EP | 3 447 258 A1 | 2/2019 |
| JP | 2001-357112 | 12/2001 |
| JP | 2003-141178 | 5/2003 |
| JP | 2005-148955 A | 6/2005 |
| JP | 2005-182465 | 7/2005 |
| JP | 2010-078447 A | 4/2010 |
| JP | 2012-073866 | 4/2012 |
| WO | WO-2011/080547 A1 | 7/2011 |
| WO | WO-2012/145563 A1 | 10/2012 |
| WO | WO-2014/143908 A1 | 9/2014 |
| WO | WO-2015/031581 A1 | 3/2015 |
| WO | WO-2016/144586 | 9/2016 |
| WO | WO-2018/217251 A1 | 11/2018 |

OTHER PUBLICATIONS

Matthias Döring, Prediction vs Forecasting. Predictions do not always concern the future, Dec. 9, 2018, Machine Learning, online at https://www.datascienceblog.net/post/machine-learning/forecasting_vs_prediction/, 3 pages.*

U.S. Appl. No. 62/673,479, filed May 18, 2018, Johnson Controls Technology Co.

U.S. Appl. No. 62/673,496, filed May 18, 2018, Johnson Controls Technology Co.

U.S. Appl. No. 62/853,983, filed May 29, 2019, Johnson Controls Technology Co.

Ahou et al., "Reliability-centered predictive maintenance scheduling for a continuously monitored system subject to degradation," Reliability Engineering & System Safety, 2007, 92.4, pp. 530-534.

Aynur, "Variable refrigerant flow systems: A review." Energy and Buildings, 2010, 42.7, pp. 1106-1112.

Chan et al., "Estimation of Degradation-Based Reliability in Outdoor Environments," Statistics Preprints, Jun. 19, 2001, 25, 33 pages.

Chu et al., "Predictive maintenance: The one-unit replacement model," International Journal of Production Economics, 1998, 54.3, pp. 285-295.

Chua et al., "Achieving better energy-efficient air conditioning—a review of technologies and strategies," Applied Energy, 2013, 104, pp. 87-104.

Crowder et al., "The Use of Degradation Measures to Design Reliability Test Plans." World Academy of Science, Engineering and Technology, International Journal of Mathematical, Computational, Physical, Electrical and Computer Engineering, 2014, 8, 18 pages.

Costa et al., "A multi-criteria model for auditing a Predictive Maintenance Programme," European Journal of Operational Research, Sep. 29, 2011, 217.2, pp. 381-393.

Emmerich et al., "State-of-the-Art Review of CO2 Demand Controlled Ventilation Technology and Application," NISTIR, Mar. 2001, 47 pages.

Extended European Search Reported on EP Patent Application No. 18176474 dated Sep. 5, 2018, 8 pages.

Fu et al., "Predictive Maintenance in Intelligent-Control-Maintenance-Management System for Hydroelectric Generating Unit," IEEE Transactions on Energy Conversion, Mar. 2004, 19.1, pp. 179-186.

Fuller, Life-Cycle Cost Analysis (LCCA) I WBDG—Whole Building Design Guide, National Institute of Standards and Technology (NIST), https://www.wbdg.org/resources/life-cycle-cost-analysis-lcca, 2016, pp. 1-13.

Gedam, "Optimizing R&M Performance of a System Using Monte Carlo Simulation", 2012 Proceedings Annual Reliability and Maintainability Symposium, 2012, pp. 1-6.

Grall et al., "Continuous-Time Predictive-Maintenance Scheduling for a Deteriorating System," IEEE Transactions on Reliability, Jun. 2002, 51.2, pp. 141-150.

Hagmark, et. al., "Simulation and Calculation of Reliability Performance and Maintenance Costs", 2007 Annual Reliability and Maintainability Symposium, IEEE Xplore, 2007, pp. 34-40, 2007.

Hong et al. "Development and Validation of a New Variable Refrigerant Flow System Model in Energyplus," Energy and Buildings, 2016, 117, pp. 399-411.

Hong et al., "Statistical Methods for Degradation Data With Dynamic Covariates Information and an Application to Outdoor Weathering Data," Technometrics, Nov. 2014, 57.2, pp. 180-193.

JP2003141178 WIPO Translation, Accessed Feb. 18, 2020, 15 pages.

Kharoufeh et al., "Semi-Markov Models for Degradation-Based Reliability," IIE Transactions, May 2010, 42.8, pp. 599-612.

Li et al., "Reliability Modeling and Life Estimation Using an Expectation Maximization Based Wiener Degradation Model for Momentum Wheels" IEEE Transactions on Cybernetics, May 2015, 45.5, pp. 969-977.

Mohsenian-Rad et al., "Smart Grid for Smart city Activities in the California City of Riverside," In: Alberto Leon-Garcia et al.: "Smart City 360°", Aug. 6, 2016, 22 Pages.

Office Action on EP 18150740.1, dated Nov. 5, 2019, 6 pages.

Office Action on EP 18176474.7 dated Sep. 11, 2019. 5 pages.

Office Action on EP 18176474.7, dated Feb. 10, 2020, 6 pages.

Office Action on EP 18190786.6, dated Feb. 5, 2020, 4 pages.

Pan et al., "Reliability modeling of degradation of products with multiple performance characteristics based on gamma processes," Reliability Engineering & System Safety, 2011, 96.8, pp. 949-957.

Peng et al., "Bayesian Degradation Analysis with Inverse Gaussian Process Models Under Time-Varying Degradation Rates," IEEE Transactions on Reliability, Mar. 2017, 66.1, pp. 84-96.

Peng et al., "Bivariate Analysis of Incomplete Degradation Observations Based on Inverse Gaussian Processes and Copulas," IEEE Transactions on Reliability, Jun. 2016, 65.2, pp. 624-639.

Peng et al., "Switching State-Space Degradation Model with Recursive Filter/Smoother for Prognostics of Remaining Useful Life," IEEE Transactions on Industrial Informatics, Feb. 2019, 15.2, pp. 822-832.

Perez-Lombard et al., "A review on buildings energy consumption information," Energy and Buildings, 2008, 40.3, pp. 394-398.

PJM Economic Demand Resource in Energy Market, PJM State and Member Training Department, 2014, 119 pages.

PJM Manual 11: Energy & Ancillary Services Market Operations, pp. 122-137, PJM, 2015.

PJM Open Access Transmission Tariff, Section 3.3A, Apr. 4, 2016, 10 pages.

Rahman et al., "Cost Estimation for Maintenance Contracts for Complex Asset/Equipment", 2008 IEEE International Conference on Industrial Engineering and Engineering Management, 2008, pp. 1355-1358.

Ruijters et al., "Fault Maintenance Trees: Reliability Centered Maintenance via Statistical Model Checking", 2016 Annual Reliability and Maintainability Symposium (RAMS), Jan. 25-28, 2016, pp. 1-6.

Wan et al., "Data Analysis and Reliability Estimation of Step-Down Stress Accelerated Degradation Test Based on Wiener Process," Prognostics and System Health Management Conference (PHM-2014 Hunan), Aug. 2014, 5 pages.

(56) References Cited

OTHER PUBLICATIONS

Wang et al., "Reliability and Degradation Modeling with Random or Uncertain Failure Threshold," Reliability and Maintainability Symposium, 2007, pp. 392-397.

Xiao et al., "Optimal Design for Destructive Degradation Tests with Random Initial Degradation Values Using the Wiener Process," IEEE Transactions on Reliability, Sep. 2016, 65.3, pp. 1327-1342.

Xu et al., "Real-time Reliability Prediction for a Dynamic System Based on the Hidden Degradation Process Identification," IEEE Transactions on Reliability, Jun. 2008, 57.2, pp. 230-242.

Yang et al., "Thermal comfort and building energy consumption implications—a review," Applied Energy, 2014, 115, pp. 164-173.

Zhang et al., "A Novel Variable Refrigerant Flow (VRF) Heat Recovery System Model: Development and Validation," Energy and Buildings, Jun. 2018, 168, pp. 399-412.

Zhang et al., "An Age- and State-Dependent Nonlinear Prognostic Model for Degrading Systems," IEEE Transactions on Reliability, Dec. 2015, 64.4, pp. 1214-1228.

Zhang et al., "Analysis of Destructive Degradation Tests for a Product with Random Degradation Initiation Time," IEEE Transactions on Reliability, Mar. 2015, 64.1, pp. 516-527.

Zhou et al. "Asset Life Prediction Using Multiple Degradation Indicators and Lifetime Data: a Gamma-Based State Space Model Approach," 2009 8th International Conference on Reliability, Maintainability and Safety, Aug. 2009, 5 pages.

U.S. Appl. No. 15/968,187, filed May 1, 2018, Johnson Controls Technology Company.

U.S. Appl. No. 16/034,057, filed Jul. 12, 2018, Johnson Controls Technology Company.

U.S. Appl. No. 16/294,433, filed Mar. 6, 2019, Hitachi-Johnson Controls Air Conditioning, Inc.

Afram et al., Artificial Neural Network (ANN) Based Model Predictive Control (MPC) and Optimization of HVAC Systems: A State of the Art Review and Case Study of a Residential HVAC System, Apr. 15, 2017. 18 pages.

De Carlo et al., Maintenance Cost Optimization in Condition Based Maintenance: A Case Study for Critical Facilities, Oct.-Nov. 2013, 7 pages.

Japanese Search Report for International Application No. PCT/US2018/018039, dated Apr. 24, 2018, 14 pages.

U.S. Appl. No. 16/457,314, filed Jun. 28, 2019, Turney et al.

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

Diederik Kingma and Jimmy Ba. Adam: A Method for Stochastic Optimization. In International Conference on Learning Representations (ICLR), 2015, 15 pages.

Ebbers et al. "Smarter Data Centers—Achieving Great Efficiency—Second Edition", Oct. 21, 2011, 138 pages.

Extended European Search Report on European Patent Application No. 18150740.1 dated May 16, 2018. 7 pages.

Extended European Search Report on European Patent Application No. 18155069.0 dated Jun. 11, 2018. 6 pages.

Extended European Search Report on European Patent Application No. 18190786.6 dated Oct. 10, 2018. 7 pages.

George EP Box, Gwilym M Jenkins, Gregory C Reinsel, and Greta M Ljung. Time Series Analysis: Forecasting and Control. John Wiley & Sons, 2015, chapters 13-15. 82 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor, system Identfication: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv: 1609.05191, 2016, 44 pages.

Moseley et al. "Electrochemical Energy Storage for Renewable Sources and Grid Balancing" Nov. 7, 2014. 14 pages.

Nevena et al. Data center cooling using model-predictive control, 10 pages. 2018.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

International Search Report and Written Opinion on PCT/US2020/042916, dated Oct. 8, 2020, 14 pages.

International Search Report and Written Opinion on PCT/US2020/045238, dated Oct. 26, 2020, 14 pages.

Extended European Search Report on EP 18806317.6, dated Jun. 17, 2021, 10 pages.

Moon, Jin Woo, "Performance of ANN-based predictive and adaptive thermal-control methods for disturbances in and around residential buildings," Building and Environment, 2012, vol. 48, pp. 15-26.

Doring, Matthias, "Prediction vs Forecasting: Predictions do not always concern the future . . . ," Data Science Blog, URL: https://www.datascienceblog.net/post/machinelearning/forecasting_vs_prediction/, 3 pages, Dec. 9, 2018, 3 pages.

Office Action on JP 2020-107153, dated Oct. 5, 2021, 7 pages with English language translation.

Furuta et al., "Optimal Allocation of Fuzzy Controller and its rule tuning for Structural Vibration," Journal of Japan Society for Fuzzy Theory and Intelligent Informatics, Dec. 2008, vol. 20, No. 6 (pp. 921-934).

JP Office Action on JP Appl. Ser. No. 2020-109855 dated Dec. 7, 2021 (10 pages).

International Preliminary Report on Patentability on PCT Appl. Ser. No. PCT/US2020/045238 dated Feb. 17, 2022 (8 pages).

International Preliminary Report on Patentability on PCT Appl. Ser. No. PCT/US2020/042916 dated Feb. 3, 2022 (8 pages).

Japanese Office Action on JP Appl. No. 2019-554919 dated Mar. 29, 2022 (9 pages with English language translation).

JP Office Action on JP Appl. Ser. No. 2020-109855 dated Jul. 12, 2022, with translation (7 pages).

Wikipedia Entry: "Correlation," https://en.wikipedia.org/w/index.php?title=Correlation&oldid=1114178034; printed on Oct. 10, 2022 (12 pages).

EP Office Action on EP Appl. Ser. No. 18806317.6, dated Feb. 8, 2023 (8 pages).

Jakhrani et al., "Life Cycle Cost Analysis of a Standalone PV system," IEEE, 2012 International Conference in Green and Ubiquitous Technology (pp. 82-85).

\* cited by examiner

MODEL PREDICTIVE MAINTENANCE SYSTEM WITH AUTOMATIC SERVICE WORK ORDER GENERATION

CROSS-REFERENCE TO RELATED PATENT APPLICATIONS

This application is a continuation-in-part of U.S. patent application Ser. No. 15/895,836 filed Feb. 13, 2018, which claims the benefit of and priority to U.S. Provisional Patent Application No. 62/511,113 filed May 25, 2017. The entire contents of both these patent applications are incorporated herein by reference.

BACKGROUND

The present disclosure relates generally to a maintenance system for building equipment and more particularly to a maintenance system that uses a predictive optimization technique to determine an optimal maintenance strategy for the building equipment.

Building equipment is typically maintained according to a maintenance strategy for the building equipment. One type of maintenance strategy is run-to-fail. The run-to-fail strategy allows the building equipment to run until a failure occurs. During this running period, only minor operational maintenance tasks (e.g., oil changes) are performed to maintain the building equipment.

Another type of maintenance strategy is preventative maintenance. The preventative maintenance strategy typically involves performing a set of preventative maintenance tasks recommended by the equipment manufactured. The preventative maintenance tasks are usually performed at regular intervals (e.g., every month, every year, etc.) which may be a function of the elapsed time of operation and/or the run hours of the building equipment.

SUMMARY

One implementation of the present disclosure is an automatic work order generation system for model predictive maintenance of building equipment, according to some embodiments. The automatic work order generation system includes a model predictive maintenance system including an equipment controller configured to operate the building equipment to affect an environmental condition of a building, according to some embodiments. The model predictive maintenance system is configured to perform a predictive optimization to determine a service time at which to service the building equipment, according to some embodiments. The automatic work order generation system includes an equipment service scheduler, according to some embodiments. The equipment service scheduler is configured to determine whether any service providers are available to perform equipment service within a predetermined time range of the service time, according to some embodiments. In response to determining that one or more of the service providers are available to perform the equipment service within the predetermined time range, the equipment service scheduler is configured to select a service provider and an appointment time from the one or more available service providers based on one or more service provider attributes of each of the one or more available service providers, according to some embodiments. The equipment service scheduler is configured to generate a service work order for the service provider and the appointment time, according to some embodiments. The equipment service scheduler is configured to transmit the service work order to the service provider to schedule a service appointment at the appointment time for the building equipment, according to some embodiments.

In some embodiments, the one or more service provider attributes include service provider availability, service provider rating, and service cost.

In some embodiments, the equipment service scheduler is configured to determine a score for each of the one or more available service providers based on the one or more service provider attributes.

In some embodiments, the equipment service scheduler is configured to select the service provider with a highest score from the one or more available service providers.

In some embodiments, the equipment service scheduler is configured to search a database of service providers to identify the one or more available service providers and to determine the one or more service provider attributes of each of the one or more available service providers.

In some embodiments, the equipment service scheduler is configured to select the service provider based on a rating equal to or greater than a predetermined value set by a user.

In some embodiments, the equipment service scheduler is configured to provide the service provider and the appointment time to a user for approval. The equipment service scheduler is configured to generate the service work order in response to receiving approval from the user, according to some embodiments.

Another implementation of the present disclosure is a method for automatically generating a service work order, according to some embodiments. The method includes operating the building equipment to affect an environmental condition of a building, according to some embodiments. The method includes performing a predictive optimization of the building equipment, according to some embodiments. The method includes determining a recommended service time at which to service the building equipment based on the predictive optimization, according to some embodiments. The method includes determining whether any service providers are available to perform servicing on the building equipment within a time range of the recommended service time, according to some embodiments. The method includes determining one or more service provider availability times, according to some embodiments. The method includes, in response to determining that one or more of the service providers are available to perform servicing on the building equipment within the time range, selecting one of the one or more available service providers and one of the one or more service provider availability times, according to some embodiments. Selecting the one of the one or more available service providers and the one of the one or more service provider availability times is based on at least one of a difference between the recommended service time and the one or more service provider availability times, a cost of service associated with each of the one or more available service providers, and a rating associated with each of the one or more available service providers, according to some embodiments. The method includes generating the service work order for the selected service provider, according to some embodiments. The method includes providing the service work order to the selected service provider to schedule a service appointment for the building equipment at the selected service provider availability time, according to some embodiments.

In some embodiments, the method includes providing a request for authorization to a user. The request includes the selected service provider and the selected service provider availability time, according to some embodiments. The method includes receiving approval from the user to schedule the service appointment, according to some embodiments. The method includes performing the steps of generating the service work order and providing the service work order to the selected service provider in response to receiving authorization from the user, according to some embodiments.

In some embodiments, the method includes determining a score for each of the one or more available service providers and service provider availability times based on any of the difference between the recommended service time and the one or more service provider availability times, the cost of service associated with each of the one or more available service providers, and the rating associated with each of the one or more available service providers. The method includes selecting the service provider and the service provider availability time with a highest score, according to some embodiments.

In some embodiments, the method includes receiving the one or more service provider availability times and the cost of service from each of the one or more available service providers.

In some embodiments, the method includes identifying the one or more available service providers and at least one of the cost of service and the rating associated with each of the one or more available service providers from a service provider recommendation service.

In some embodiments, the method includes storing the one or more available service providers for future service scheduling.

Another implementation of the present disclosure is another automatic work order generation system for model predictive maintenance of building equipment. The automatic work order generation system includes a model predictive maintenance system, according to some embodiments. The model predictive maintenance system includes an equipment controller configured to operate the building equipment to affect an environmental condition of a building, according to some embodiments. The model predictive maintenance system is configured to perform a predictive optimization to determine a service time at which to service the building equipment, according to some embodiments. The automatic work order generation system includes an equipment service scheduler, according to some embodiments. The equipment service scheduler is configured to determine whether any service providers are available to perform equipment service within a predetermined time range of the service time, according to some embodiments. In response to determining that one or more of the service providers are available to perform the equipment service within the predetermined time range, the equipment service scheduler is configured to provide a user with a list of the one or more available service providers with available appointment times, according to some embodiments. The equipment service scheduler is configured to receive a service provider and an appointment time selected by the user, according to some embodiments. The equipment service scheduler is configured to generate a service work order for the service provider and the appointment time selected by the user, according to some embodiments. The equipment service scheduler is configured to transmit the service work order to the service provider to schedule a service appointment at the appointment time for the building equipment, according to some embodiments.

In some embodiments, the list displays one or more service provider attributes including at least one of a service provider availability, a service provider rating, and a service cost.

In some embodiments, the equipment service scheduler is configured to determine a score for each of the one or more available service providers based on one or more service provider attributes. The list displays the score for each of the one or more available service providers, according to some embodiments.

In some embodiments, the equipment service scheduler is configured to determine an optimal service provider and appointment time. The list indicates the optimal service provider and appointment time, according to some embodiments.

In some embodiments, the one or more available service providers of the list have a rating equal to or greater than a predetermined value set by the user.

In some embodiments, the equipment service scheduler further is configured to search a database of service providers to identify the one or more available service providers and the available appointment times.

In some embodiments, the equipment service scheduler is configured to provide a notification to the user regarding the scheduled service appointment. The notification includes the list, according to some embodiments.

DETAILED DESCRIPTION

Overview

Figure 1:
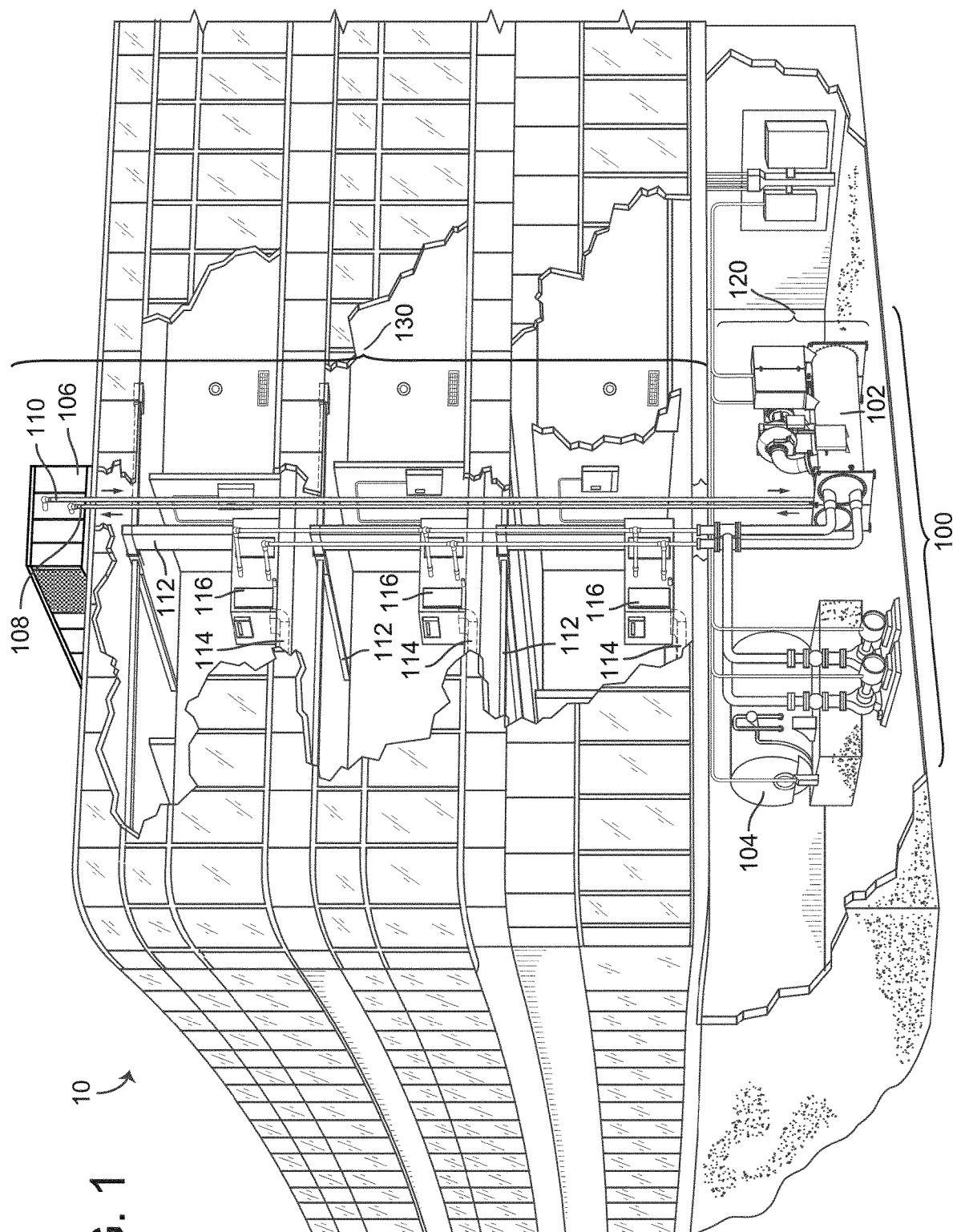
FIG. 1 is a drawing of a building equipped with a HVAC system, according to an exemplary embodiment.

Referring generally to the FIGURES, a model predictive maintenance (MPM) system and components thereof are shown, according to various exemplary embodiments. The MPM system can be configured to determine an optimal maintenance strategy for building equipment. In some embodiments, the optimal maintenance strategy is a set of decisions which optimizes the total cost associated with purchasing, maintaining, and operating the building equipment over the duration of an optimization period (e.g., 30 weeks, 52 weeks, 10 years, 30 years, etc.). The decisions can include, for example, equipment purchase decisions, equipment maintenance decisions, and equipment operating decisions. The MPM system can use a model predictive control technique to formulate an objective function which expresses the total cost as a function of these decisions, which can be included as decision variables in the objective function. The MPM system can optimize (e.g., minimize) the objective function using any of a variety of optimization techniques to identify the optimal values for each of the decision variables.

One example of an objective function which can be optimized by The MPM system is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by the building equipment at time step i of the optimization period, $P_{op,i}$ is the power consumption (e.g., kW) of the building equipment at time step i, $\Delta t$ is the duration of each time step i, $C_{main,i}$ is the cost of maintenance performed on the building equipment at time step i, $B_{main,i}$ is a binary variable that indicates whether the maintenance is performed, $C_{cap,i}$ is the capital cost of purchasing a new device of the building equipment at time step i, $B_{cap,i}$ is a binary variable that indicates whether the new device is purchased, and h is the duration of the horizon or optimization period over which the optimization is performed.

The first term in the objective function J represents the operating cost of the building equipment over the duration of the optimization period. In some embodiments, the cost per unit of energy $C_{op,i}$ is received from a utility as energy pricing data. The cost $C_{op,i}$ may be a time-varying cost that depends on the time of day, the day of the week (e.g., weekday vs. weekend), the current season (e.g., summer vs. winter), or other time-based factors. For example, the cost $C_{op,i}$ may be higher during peak energy consumption periods and lower during off-peak or partial-peak energy consumption periods.

In some embodiments, the power consumption $P_{op,i}$ is based on the heating or cooling load of the building. The heating or cooling load can be predicted by the MPM system as a function of building occupancy, the time of day, the day of the week, the current season, or other factors that can affect the heating or cooling load. In some embodiments, the MPM system uses weather forecasts from a weather service to predict the heating or cooling load. The power consumption $P_{op,i}$ may also depend on the efficiency $\eta_i$ of the building equipment. For example, building equipment that operate at a high efficiency may consume less power $P_{op,i}$ to satisfy the same heating or cooling load relative to building equipment that operate at a low efficiency.

Advantageously, the MPM system can model the efficiency $\eta_i$ of the building equipment at each time step i as a function of the maintenance decisions $B_{main,i}$ and the equipment purchase decisions $B_{cap,i}$. For example, the efficiency for a particular device may start at an initial value $\eta_0$ when the device is purchased and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Performing maintenance or purchasing a new device may result in a relatively lower power consumption $P_{op,i}$ during operation and therefore a lower operating cost at each time step i after the maintenance is performed or the new device is purchased. In other words, performing maintenance or purchasing a new device may decrease the operating cost represented by the first term of the objective function J. However, performing maintenance may increase the second term of the objective function J and purchasing a new device may increase the third term of the objective function J. The objective function J captures each of these costs and can be optimized by the MPM system to determine the optimal set of maintenance and equipment purchase decisions (i.e., optimal values for the binary decision variables $B_{main,i}$ and $B_{cap,i}$) over the duration of the optimization period.

In some embodiments, the MPM system uses equipment performance information received as a feedback from the building equipment to estimate the efficiency and/or the reliability of the building equipment. The efficiency may indicate a relationship between the heating or cooling load on the building equipment and the power consumption of the building equipment. The MPM system can use the efficiency to calculate the corresponding value of $P_{op,i}$. The reliability may be a statistical measure of the likelihood that the building equipment will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since the building equipment last received maintenance and/or an amount of time that has elapsed since the building equipment was purchased or installed.

In some embodiments, the MPM system generates and provides equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of the building equipment may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of the building equipment should be purchased at the $25^{th}$ time step of the optimization period, whereas a value of $B_{cap,25}=0$ may indicate that the new device should not be purchased at that time step.

Advantageously, the equipment purchase and maintenance recommendations generated by the MPM system are predictive recommendations based on the actual operating conditions and actual performance of the building equipment. The optimization performed by the MPM system weighs the cost of performing maintenance and the cost of purchasing new equipment against the decrease in operating cost resulting from such maintenance or purchase decisions in order to determine the optimal maintenance strategy that minimizes the total combined cost J. In this way, the equipment purchase and maintenance recommendations generated by the MPM system may be specific to each group of building equipment in order to achieve the optimal cost J for that specific group of building equipment. The equipment-specific recommendations may result in a lower overall cost J relative to generic preventative maintenance recommendations provided by an equipment manufacturer (e.g., service equipment every year) which may be suboptimal for some groups of building equipment and/or some operating conditions. These and other features of the MPM system are described in detail below.

Building HVAC Systems and Building Management Systems

Figure 2:
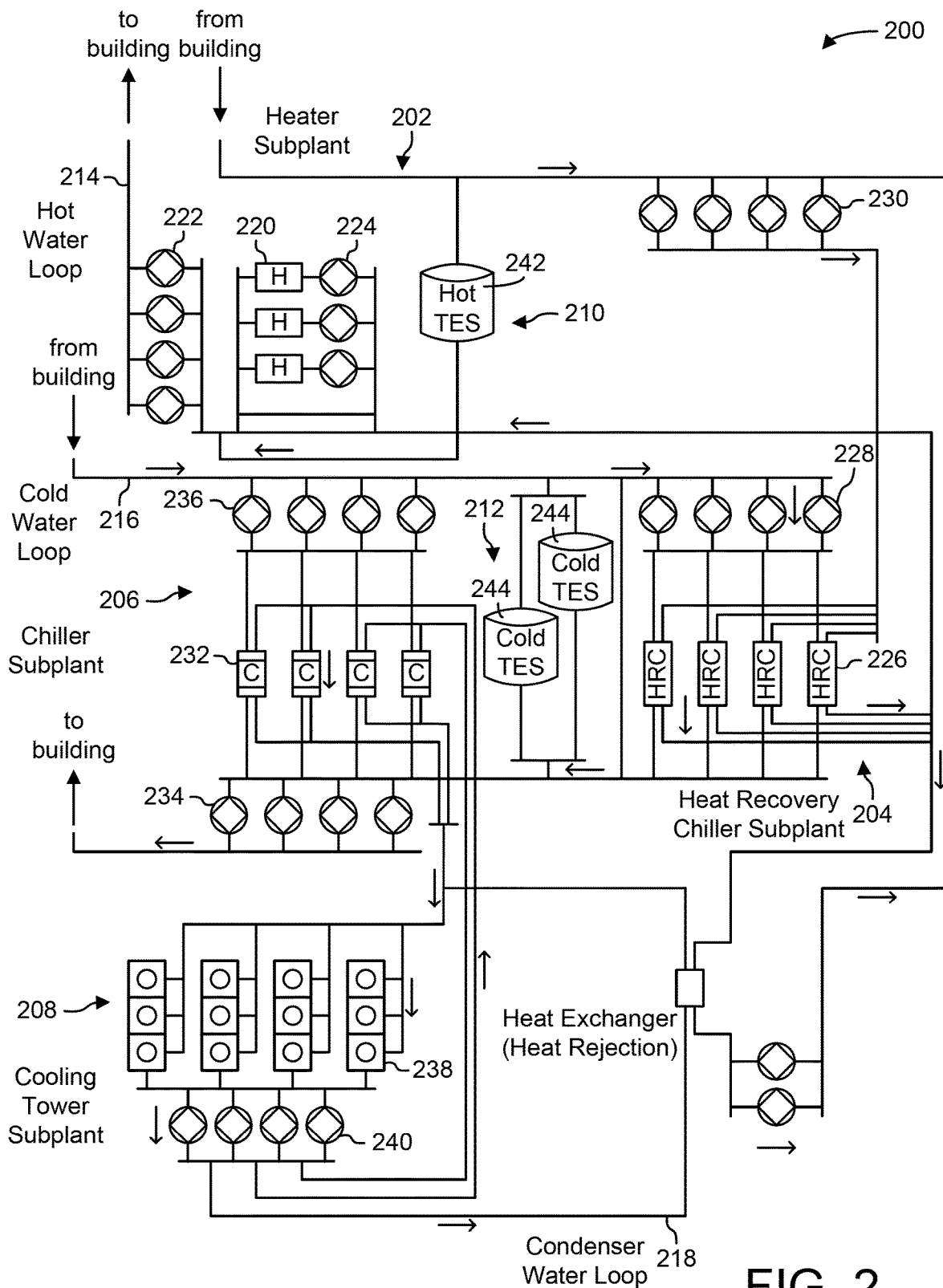
FIG. 2 is a block diagram of a waterside system which can be used to serve the heating or cooling loads of the building of FIG. 1, according to an exemplary embodiment.
Figure 3:
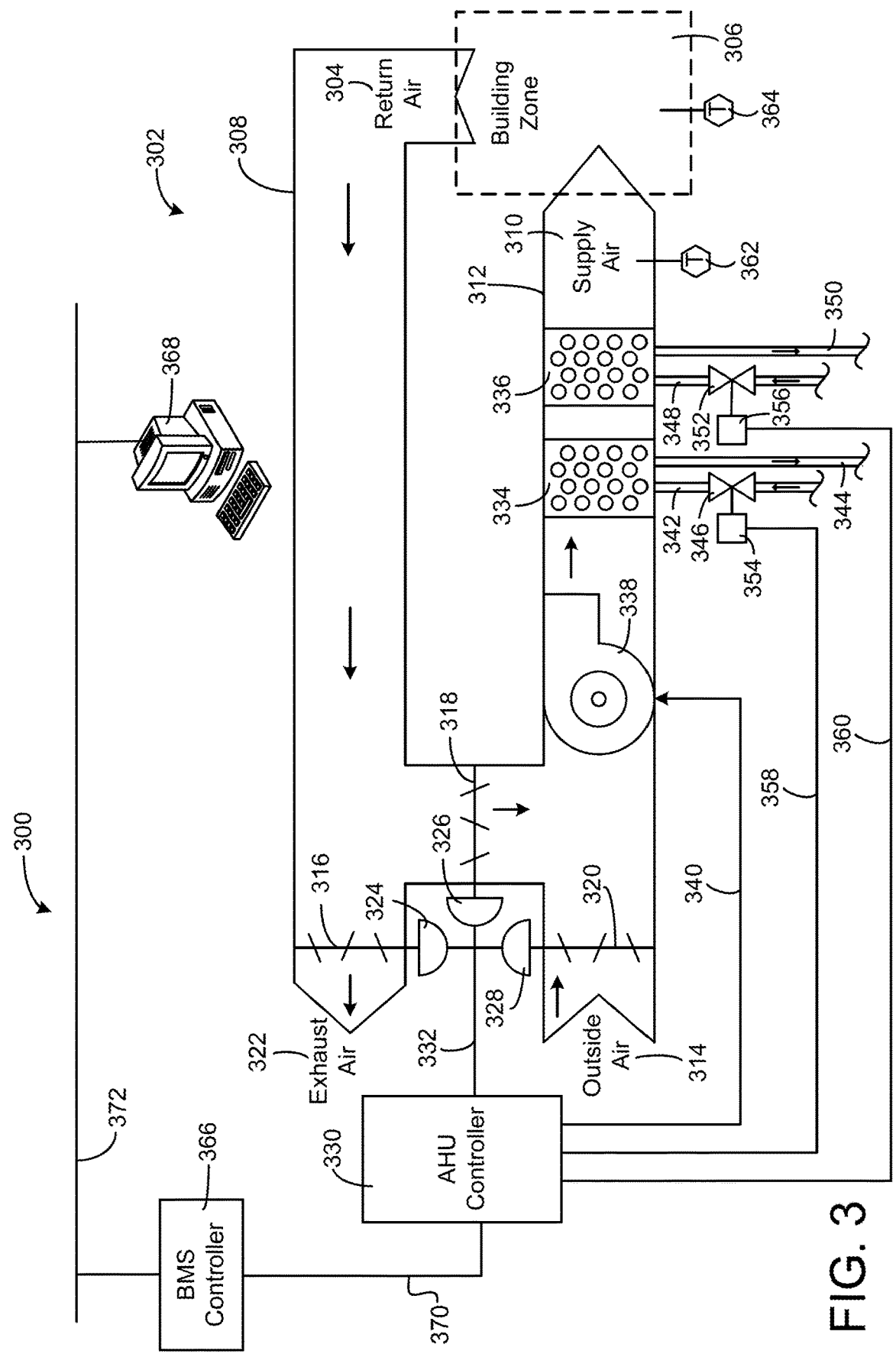
FIG. 3 is a block diagram of an airside system which can be used to serve the heating or cooling loads of the building of FIG. 1, according to an exemplary embodiment.
Figure 4:
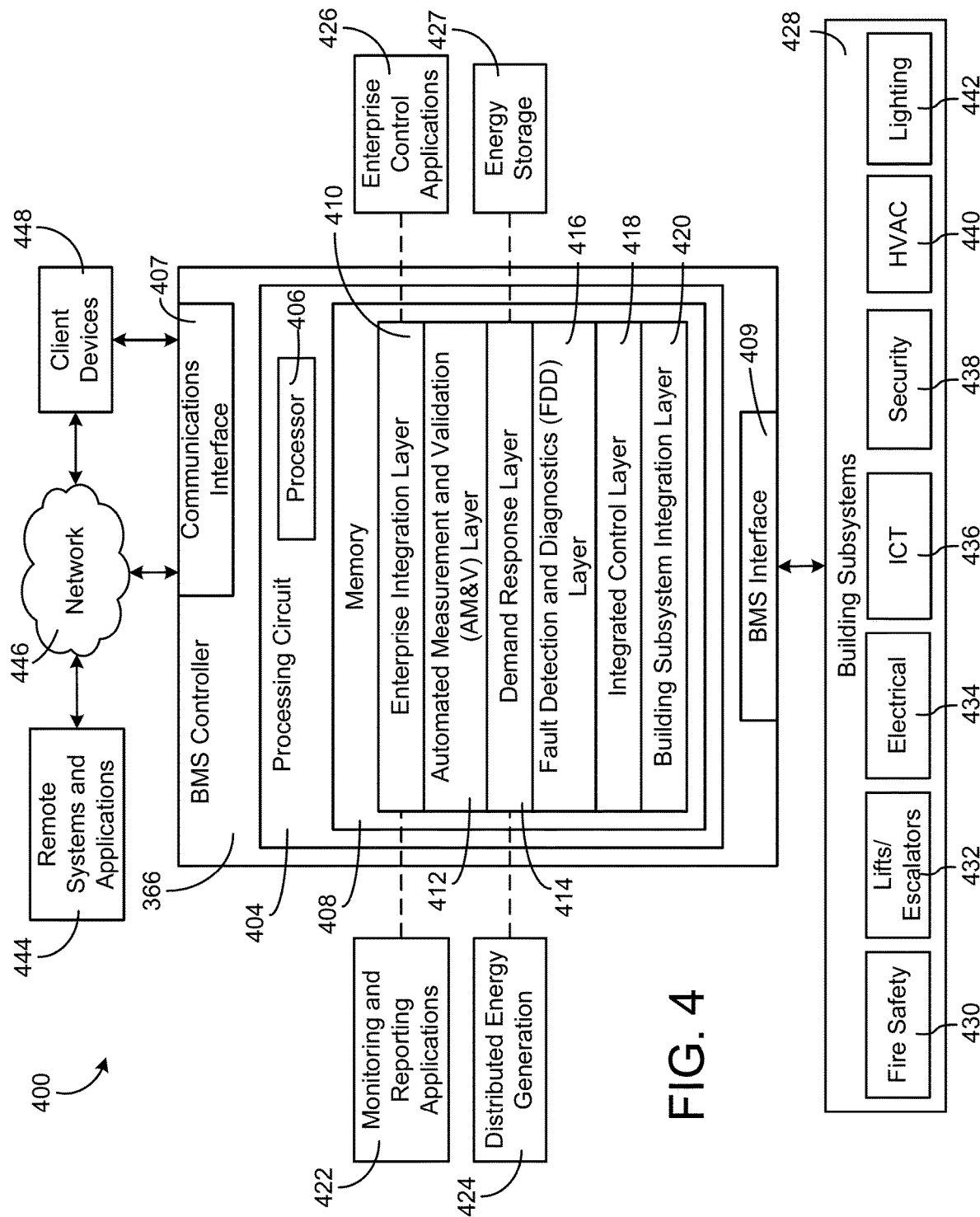
FIG. 4 is a block diagram of a building management system (BMS) which can be used to monitor and control the building of FIG. 1, according to an exemplary embodiment.
Figure 5:
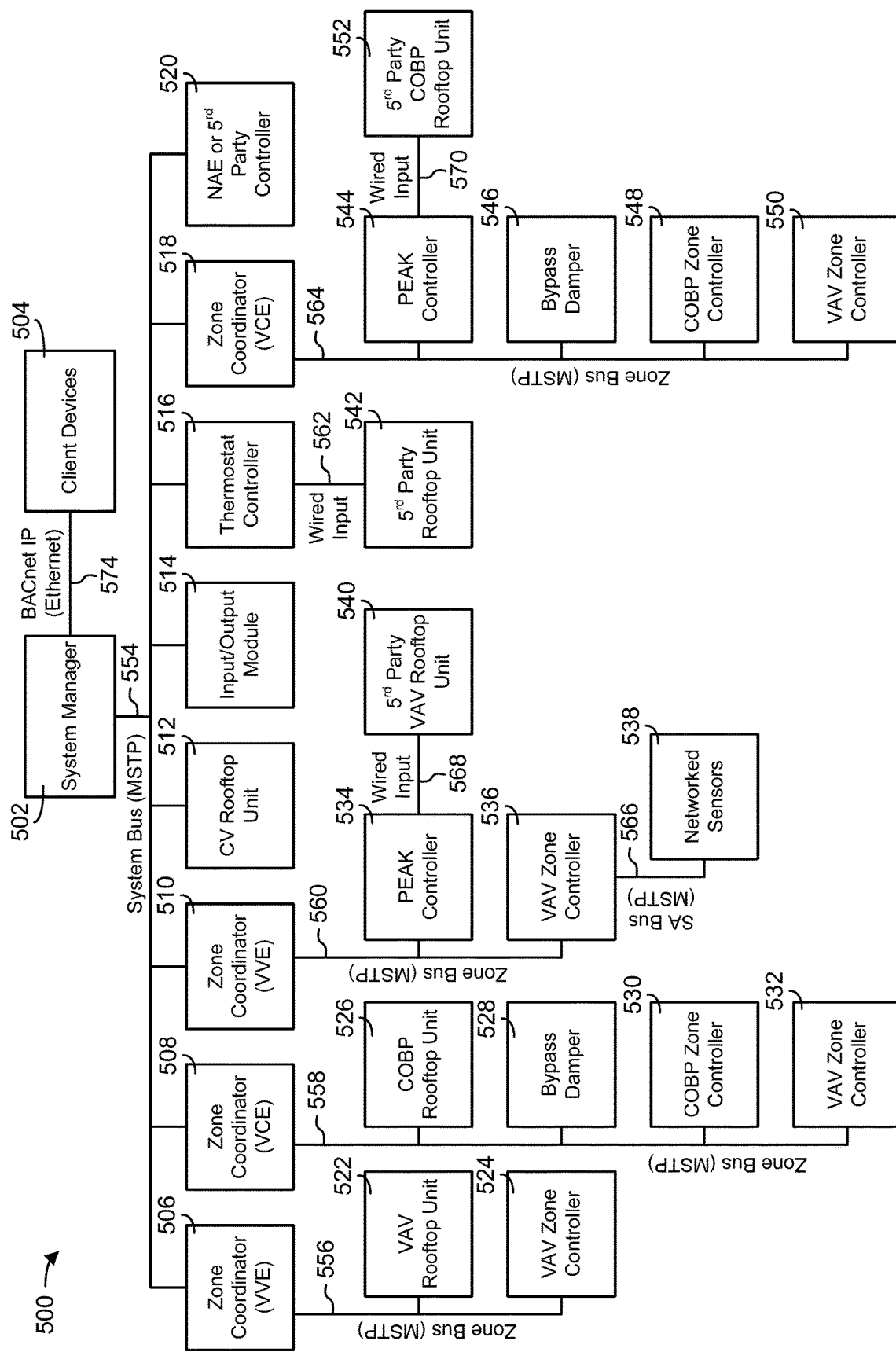
FIG. 5 is a block diagram of another BMS which can be used to monitor and control the building of FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Model Predictive Maintenance System

Figure 6:
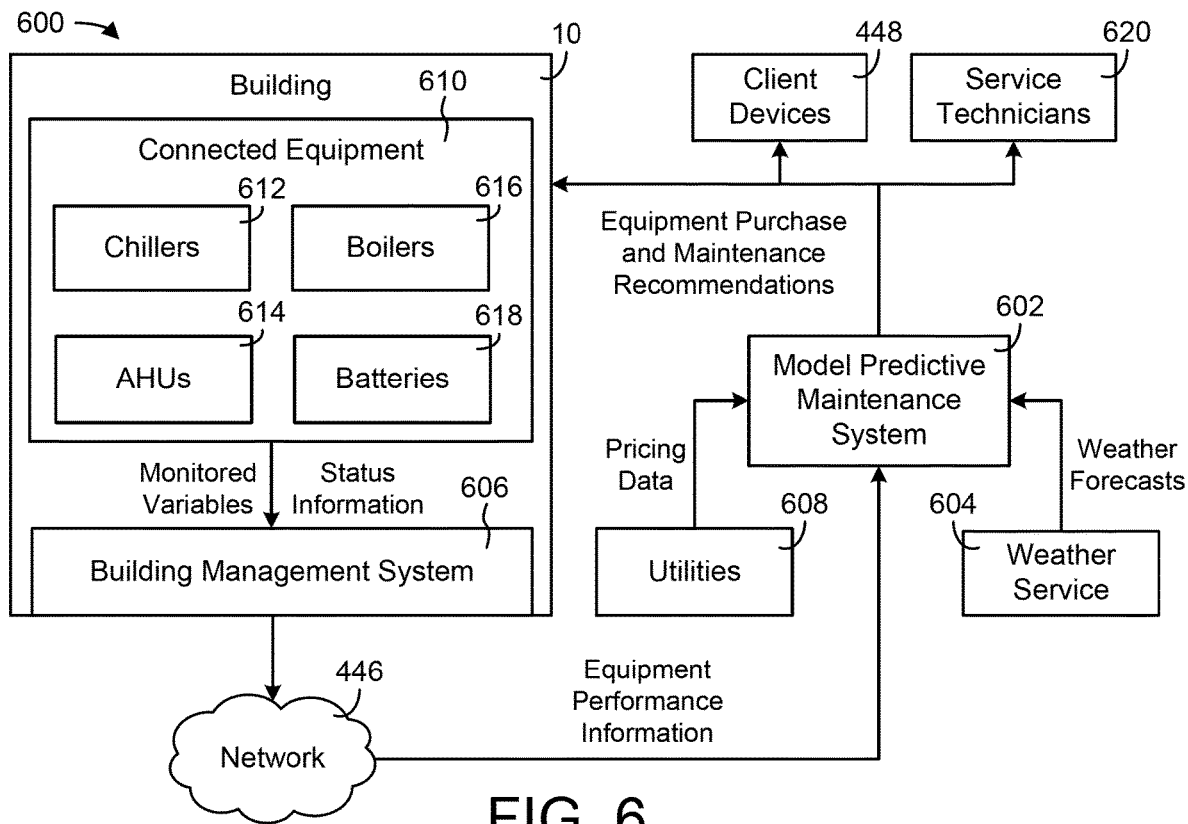
FIG. 6 is a block diagram of a building system including a model predictive maintenance (MPM) system that monitors equipment performance information from connected equipment installed in the building, according to an exemplary embodiment.

Referring now to FIG. 6, a block diagram of a building system 600 is shown, according to an exemplary embodiment. System 600 may include many of the same components as BMS 400 and BMS 500 as described with reference to FIGS. 4-5. For example, system 600 is shown to include building 10, network 446, and client devices 448. Building 10 is shown to include connected equipment 610, which can include any type of equipment used to monitor and/or control building 10. Connected equipment 610 can include connected chillers 612, connected AHUs 614, connected boilers 616, connected batteries 618, or any other type of equipment in a building system (e.g., heaters, economizers, valves, actuators, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Figure 7:
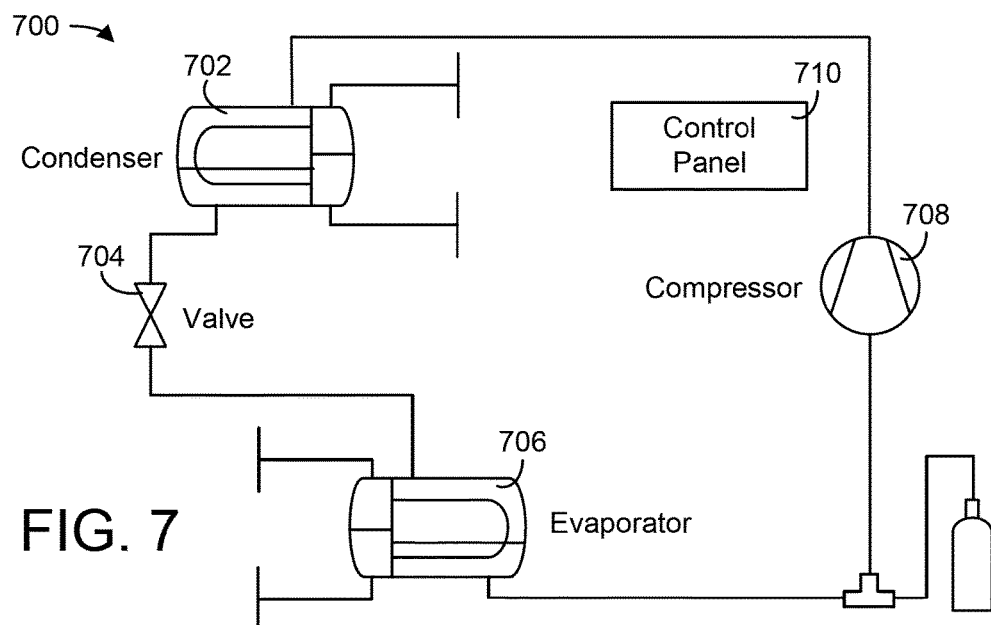
FIG. 7 is a schematic diagram of a chiller which may be a type of connected equipment that provides equipment performance information to the MPM system of FIG. 6, according to an exemplary embodiment.

Connected equipment 610 can be outfitted with sensors to monitor various conditions of the connected equipment 610 (e.g., power consumption, on/off states, operating efficiency, etc.). For example, chillers 612 can include sensors configured to monitor chiller variables such as chilled water temperature, condensing water temperature, and refrigerant properties (e.g., refrigerant pressure, refrigerant temperature, etc.) at various locations in the refrigeration circuit. An example of a chiller 700 which can be used as one of chillers 612 is shown in FIG. 7. Chiller 700 is shown to include a refrigeration circuit having a condenser 702, an expansion valve 704, an evaporator 706, a compressor 708, and a control panel 710. In some embodiments, chiller 700 includes sensors that measure a set of monitored variables at various locations along the refrigeration circuit. Similarly, AHUs 614 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 can monitor and report variables that characterize the performance of the connected equipment 610. Each monitored variable can be forwarded to building management system 606 as a data point including a point ID and a point value.

Monitored variables can include any measured or calculated values indicating the performance of connected equipment 610 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, the hours during which the equipment is running, a safety fault code, or any other information that indicates the current status of connected equipment 610. In some embodiments, each device of connected equipment 610 includes a control panel (e.g., control panel 710 shown in FIG. 7). Control panel 710 can be configured to collect monitored variables and equipment status information from connected equipment 610 and provide the collected data to BMS 606. For example, control panel 710 can compare the sensor data (or a value derived from the sensor data) to predetermined thresholds. If the sensor data or calculated value crosses a safety threshold, control panel 710 can shut down the device. Control panel 710 can generate a data point when a safety shut down occurs. The data point can include a safety fault code which indicates the reason or condition that triggered the shutdown.

Connected equipment 610 can provide monitored variables and equipment status information to BMS 606. BMS 606 can include a building controller (e.g., BMS controller 366), a system manager (e.g., system manager 503), a network automation engine (e.g., NAE 520), or any other system or device of building 10 configured to communicate with connected equipment 610. BMS 606 may include some or all of the components of BMS 400 or BMS 500, as described with reference to FIGS. 4-5. In some embodiments, the monitored variables and the equipment status information are provided to BMS 606 as data points. Each data point can include a point ID and a point value. The point ID can identify the type of data point or a variable measured by the data point (e.g., condenser pressure, refrigerant temperature, power consumption, etc.). Monitored variables can be identified by name or by an alphanumeric code (e.g., Chilled_Water_Temp, 7694, etc.). The point value can include an alphanumeric value indicating the current value of the data point.

BMS 606 can broadcast the monitored variables and the equipment status information to a model predictive maintenance system 602. In some embodiments, model predictive maintenance system 602 is a component of BMS 606. For example, model predictive maintenance system 602 can be implemented as part of a METASYS® brand building automation system, as sold by Johnson Controls Inc. In other embodiments, model predictive maintenance system 602 can be a component of a remote computing system or cloud-based computing system configured to receive and process data from one or more building management systems via network 446. For example, model predictive maintenance system 602 can be implemented as part of a PANOPTIX® brand building efficiency platform, as sold by Johnson Controls Inc. In other embodiments, model predictive maintenance system 602 can be a component of a subsystem level controller (e.g., a HVAC controller), a subplant controller, a device controller (e.g., AHU controller 330, a chiller controller, etc.), a field controller, a computer workstation, a client device, or any other system or device that receives and processes monitored variables from connected equipment 610.

Model predictive maintenance (MPM) system 602 may use the monitored variables and/or the equipment status information to identify a current operating state of connected equipment 610. The current operating state can be examined by MPM system 602 to expose when connected equipment 610 begins to degrade in performance and/or to predict when faults will occur. In some embodiments, MPM system 602 uses the information collected from connected equipment 610 to estimate the reliability of connected equipment 610. For example, MPM system 602 can estimate a likelihood of various types of failures that could potentially occur based on the current operating conditions of connected equipment 610 and an amount of time that has elapsed since connected equipment 610 has been installed and/or since maintenance was last performed. In some embodiments, MPM system 602 estimates an amount of time until each failure is predicted to occur and identifies a financial cost associated with each failure (e.g., maintenance cost, increased operating cost, replacement cost, etc.). MPM system 602 can use the reliability information and the likelihood of potential failures to predict when maintenance will be needed and to estimate the cost of performing such maintenance over a predetermined time period.

MPM system 602 can be configured to determine an optimal maintenance strategy for connected equipment 610. In some embodiments, the optimal maintenance strategy is a set of decisions which optimizes the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions. MPM system 602 can use a model predictive control technique to formulate an objective function which expresses the total cost as a function of these decisions, which can be included as decision variables in the objective function. MPM system 602 can optimize (i.e., minimize) the objective function using any of a variety of optimization techniques to identify the optimal values for each of the decision variables.

One example of an objective function which can be optimized by MPM system 602 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

The first term in the objective function J represents the operating cost of connected equipment 610 over the duration of the optimization period. In some embodiments, the cost per unit of energy $C_{op,i}$ is received from a utility 608 as energy pricing data. The cost $C_{op,i}$ may be a time-varying cost that depends on the time of day, the day of the week (e.g., weekday vs. weekend), the current season (e.g., summer vs. winter), or other time-based factors. For example, the cost $C_{op,i}$ may be higher during peak energy consumption periods and lower during off-peak or partial-peak energy consumption periods.

In some embodiments, the power consumption $P_{op,i}$ is based on the heating or cooling load of building 10. The heating or cooling load can be predicted by MPM system 602 as a function of building occupancy, the time of day, the day of the week, the current season, or other factors that can affect the heating or cooling load. In some embodiments, MPM system 602 uses weather forecasts from a weather service 604 to predict the heating or cooling load. The power consumption $P_{op,i}$ may also depend on the efficiency $\eta_i$ of connected equipment 610. For example, connected equipment 610 that operate at a high efficiency may consume less power $P_{op,i}$ to satisfy the same heating or cooling load relative to connected equipment 610 that operate at a low efficiency. In general, the power consumption $P_{op,i}$ of a particular device of connected equipment 610 can be modeled using the following equations:

$$P_{op,i} = \frac{P_{ideal,i}}{\eta_i}$$

$$P_{ideal,i} = f(Load_i)$$

where $Load_i$ is the heating or cooling load on the device at time step i (e.g., tons cooling, kW heating, etc.), $P_{ideal,i}$ is the value of the equipment performance curve (e.g., tons cooling, kW heating, etc.) for the device at the corresponding load point $Load_i$, and $\eta_i$ is the operating efficiency of the device at time step i (e.g., $0 \leq \eta_i \leq 1$). The function $f(Load_i)$ may be defined by the equipment performance curve for the device or set of devices represented by the performance curve.

In some embodiments, the equipment performance curve is based on manufacturer specifications for the device under ideal operating conditions. For example, the equipment performance curve may define the relationship between power consumption and heating/cooling load for each device of connected equipment 610. However, the actual performance of the device may vary as a function of the actual operating conditions. MPM system 602 can analyze the equipment performance information provided by connected equipment 610 to determine the operating efficiency $\eta_i$ for each device of connected equipment 610. In some embodiments, MPM system 602 uses the equipment performance information from connected equipment 610 to determine the actual operating efficiency $\eta_i$ for each device of connected equipment 610. MPM system 602 can use the operating efficiency $\eta_i$ as an input to the objective function J and/or to calculate the corresponding value of $P_{op,i}$.

Advantageously, MPM system 602 can model the efficiency $\eta_i$ of connected equipment 610 at each time step i as a function of the maintenance decisions and the equipment purchase decisions $B_{cap,i}$. For example, the efficiency $\eta_i$ for a particular device may start at an initial value $\eta_0$ when the device is purchased and may degrade over time such that the efficiency $\eta_i$ decreases with each successive time step i. Performing maintenance on a device may reset the efficiency to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Performing maintenance or purchasing a new device may result in a relatively lower power consumption $P_{op,i}$ during operation and therefore a lower operating cost at each time step i after the maintenance is performed or the new device is purchased. In other words, performing maintenance or purchasing a new device may decrease the operating cost represented by the first term of the objective function J. However, performing maintenance may increase the second term of the objective function J and purchasing a new device may increase the third term of the objective function J. The objective function J captures each of these costs and can be optimized by MPM system 602 to determine the optimal set of maintenance and equipment purchase decisions (i.e., optimal values for the binary decision variables $B_{main,i}$ and $B_{cap,i}$) over the duration of the optimization period.

In some embodiments, MPM system 602 uses the equipment performance information from connected equipment 610 to estimate the reliability of connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance.

MPM system 602 may receive operating data from a plurality of devices of connected equipment 610 distributed across multiple buildings and can use the set of operating data (e.g., operating conditions, fault indications, failure times, etc.) to develop a reliability model for each type of equipment. The reliability models can be used by MPM system 602 to estimate the reliability of any given device of connected equipment 610 as a function of its current operating conditions and/or other extraneous factors (e.g., time since maintenance was last performed, geographic location, water quality, etc.). In some embodiments, MPM system 602 uses the estimated reliability of each device of connected equipment 610 to determine the probability that the device will require maintenance and/or replacement at each time step of the optimization period. MPM system 602 can use these probabilities to determine the optimal set of maintenance and equipment purchase decisions (i.e., optimal values for the binary decision variables $B_{main,i}$ and $B_{cap,i}$) over the duration of the optimization period.

In some embodiments, MPM system 602 generates and provides equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the $25^{th}$ time step of the optimization period, whereas a value of $B_{cap,25}=0$ may indicate that the new device should not be purchased at that time step.

Advantageously, the equipment purchase and maintenance recommendations generated by MPM system 602 are predictive recommendations based on the actual operating conditions and actual performance of connected equipment 610. The optimization performed by MPM system 602 weighs the cost of performing maintenance and the cost of purchasing new equipment against the decrease in operating cost resulting from such maintenance or purchase decisions in order to determine the optimal maintenance strategy that minimizes the total combined cost J. In this way, the equipment purchase and maintenance recommendations generated by MPM system 602 may be specific to each group of connected equipment 610 in order to achieve the optimal cost J for that specific group of connected equipment 610. The equipment-specific recommendations may result in a lower overall cost J relative to generic preventative maintenance recommendations provided by an equipment manufacturer (e.g., service equipment every year) which may be sub-optimal for some groups of connected equipment 610 and/or some operating conditions.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

In some embodiments, MPM system 602 includes a data analytics and visualization platform. MPM system 602 may provide a web interface which can be accessed by service technicians 620, client devices 448, and other systems or devices. The web interface can be used to access the equipment performance information, view the results of the optimization, identify which equipment is in need of maintenance, and otherwise interact with MPM system 602. Service technicians 620 can access the web interface to view a list of equipment for which maintenance is recommended by MPM system 602. Service technicians 620 can use the equipment purchase and maintenance recommendations to proactively repair or replace connected equipment 610 in order to achieve the optimal cost predicted by the objective function J. These and other features of MPM system 602 are described in greater detail below.

Figure 8:
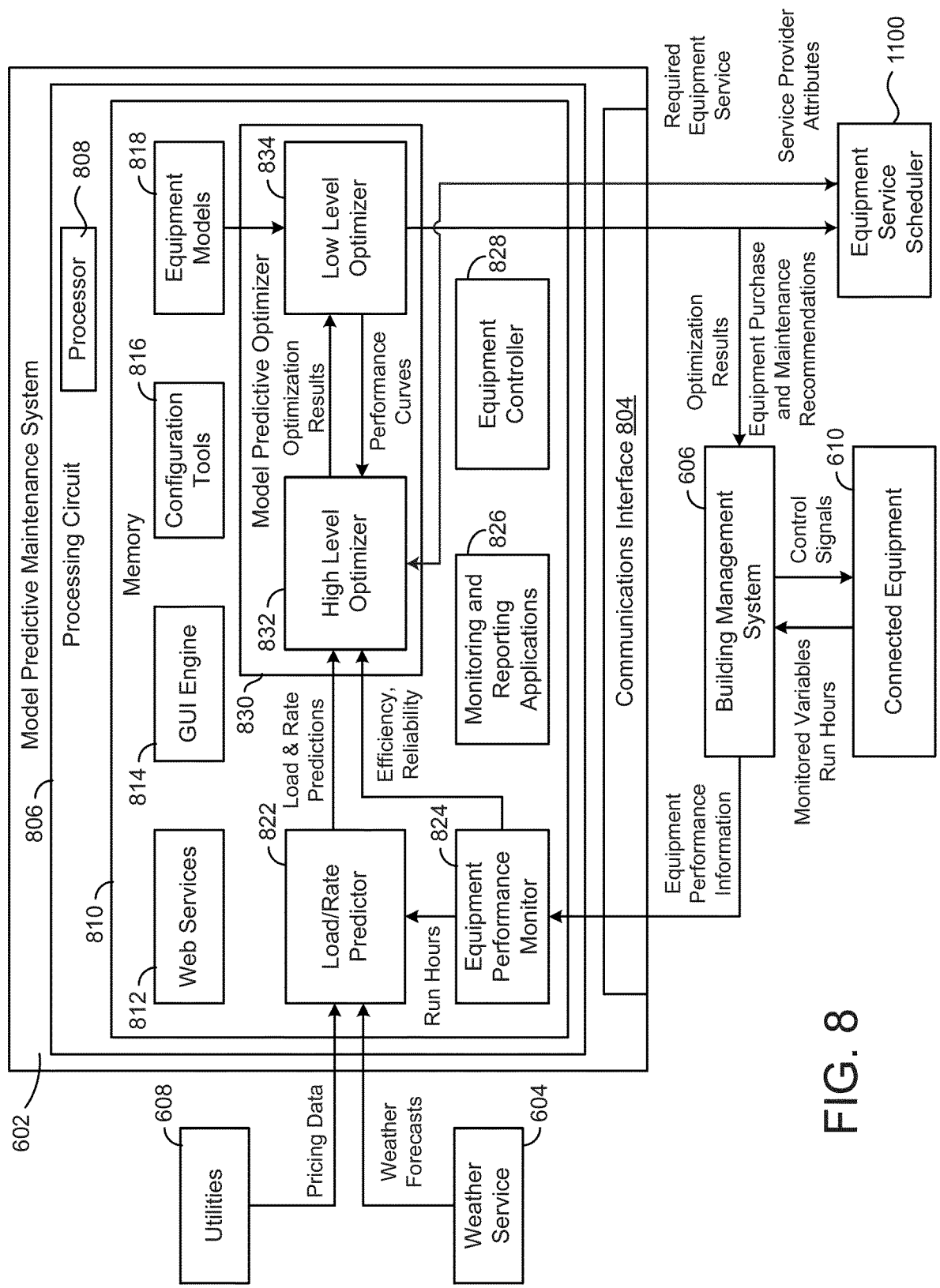
FIG. 8 is a block diagram illustrating the MPM system of FIG. 6 in greater detail, according to an exemplary embodiment.

Referring now to FIG. 8, a block diagram illustrating MPM system 602 in greater detail is shown, according to an exemplary embodiment. MPM system 602 is shown providing optimization results to a building management system (BMS) 606. BMS 606 can include some or all of the features of BMS 400 and/or BMS 500, as described with reference to FIGS. 4-5. The optimization results provided to BMS 606 may include the optimal values of the decision variables in the objective function J for each time step i in the optimization period. In some embodiments, the optimization results include equipment purchase and maintenance recommendations for each device of connected equipment 610.

BMS 606 may be configured to monitor the operation and performance of connected equipment 610. BMS 606 may receive monitored variables from connected equipment 610. Monitored variables can include any measured or calculated values indicating the performance of connected equipment 610 and/or the components thereof. For example, monitored variables can include one or more measured or calculated temperatures, pressures, flow rates, valve positions, resource consumptions (e.g., power consumption, water consumption, electricity consumption, etc.), control setpoints, model parameters (e.g., equipment model coefficients), or any other variables that provide information about how the corresponding system, device, or process is performing.

In some embodiments, the monitored variables indicate the operating efficiency $\eta_i$ of each device of connected equipment 610 or can be used to calculate the operating efficiency $\eta_i$. For example, the temperature and flow rate of chilled water output by a chiller can be used to calculate the cooling load (e.g., tons cooling) served by the chiller. The cooling load can be used in combination with the power consumption of the chiller to calculate the operating efficiency $\eta_i$ (e.g., tons cooling per kW of electricity consumed). BMS 606 may report the monitored variables to MPM system 602 for use in calculating the operating efficiency of each device of connected equipment 610.

In some embodiments, BMS 606 monitors the run hours of connected equipment 610. The run hours may indicate the number of hours within a given time period during which each device of connected equipment 610 is active. For example, the run hours for a chiller may indicate that the chiller is active for approximately eight hours per day. The run hours can be used in combination with the average power consumption of the chiller when active to estimate the total power consumption $P_{op,i}$ of connected equipment 610 at each time step i.

In some embodiments, BMS 606 monitors the equipment failures and fault indications reported by connected equipment 610. BMS 606 can record the times at which each failure or fault occurs and the operating conditions of connected equipment 610 under which the fault or failure occurred. The operating data collected from connected equipment 610 can be used by BMS 606 and/or MPM system 602 to develop a reliability model for each device of connected equipment 610. BMS 606 may provide the monitored variables, the equipment run hours, the operating conditions, and the equipment failures and fault indications to MPM system 602 as equipment performance information.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to MPM system 602. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate connected equipment 610 to affect the monitored conditions within the building and to serve the thermal energy loads of the building.

BMS 606 may provide control signals to connected equipment 610 specifying on/off states, charge/discharge rates, and/or setpoints for connected equipment 610. BMS 606 may control the equipment (e.g., via actuators, power relays, etc.) in accordance with the control signals to achieve setpoints for various building zones and/or devices of connected equipment 610. In various embodiments, BMS 606 may be combined with MPM system 602 or may be part of a separate building management system. According to an exemplary embodiment, BMS 606 is a METASYS® brand building management system, as sold by Johnson Controls, Inc.

MPM system 602 may monitor the performance of connected equipment 610 using information received from BMS 606. MPM system 602 may be configured to predict the thermal energy loads (e.g., heating loads, cooling loads, etc.) of the building for plurality of time steps in the optimization period (e.g., using weather forecasts from a weather service 604). MPM system 602 may also predict the cost of electricity or other resources (e.g., water, natural gas, etc.) using pricing data received from utilities 608. MPM system 602 may generate optimization results that optimize the economic value of operating, maintaining, and purchasing connected equipment 610 over the duration of the optimization period subject to constraints on the optimization process (e.g., load constraints, decision variable constraints, etc.). The optimization process performed by MPM system 602 is described in greater detail below.

According to an exemplary embodiment, MPM system 602 can be integrated within a single computer (e.g., one server, one housing, etc.). In various other exemplary embodiments, MPM system 602 can be distributed across multiple servers or computers (e.g., that can exist in distributed locations). In another exemplary embodiment, MPM system 602 may integrated with a smart building manager that manages multiple building systems and/or combined with BMS 606.

MPM system 602 is shown to include a communications interface 804 and a processing circuit 806. Communications interface 804 may include wired or wireless interfaces (e.g., jacks, antennas, transmitters, receivers, transceivers, wire terminals, etc.) for conducting data communications with various systems, devices, or networks. For example, communications interface 804 may include an Ethernet card and port for sending and receiving data via an Ethernet-based communications network and/or a WiFi transceiver for communicating via a wireless communications network. Communications interface 804 may be configured to communicate via local area networks or wide area networks (e.g., the Internet, a building WAN, etc.) and may use a variety of communications protocols (e.g., BACnet, IP, LON, etc.).

Communications interface 804 may be a network interface configured to facilitate electronic data communications between MPM system 602 and various external systems or devices (e.g., BMS 606, connected equipment 610, utilities 510, etc.). For example, MPM system 602 may receive information from BMS 606 indicating one or more measured states of the controlled building (e.g., temperature, humidity, electric loads, etc.) and equipment performance information for connected equipment 610 (e.g., run hours, power consumption, operating efficiency, etc.). Communications interface 804 may receive inputs from BMS 606 and/or connected equipment 610 and may provide optimization results to BMS 606 and/or other external systems or devices. The optimization results may cause BMS 606 to activate, deactivate, or adjust a setpoint for connected equipment 610 in order to achieve the optimal values of the decision variables specified in the optimization results.

Still referring to FIG. 8, processing circuit 806 is shown to include a processor 808 and memory 810. Processor 808 may be a general purpose or specific purpose processor, an application specific integrated circuit (ASIC), one or more field programmable gate arrays (FPGAs), a group of processing components, or other suitable processing components. Processor 808 may be configured to execute computer code or instructions stored in memory 810 or received from other computer readable media (e.g., CDROM, network storage, a remote server, etc.).

Memory 810 may include one or more devices (e.g., memory units, memory devices, storage devices, etc.) for storing data and/or computer code for completing and/or facilitating the various processes described in the present disclosure. Memory 810 may include random access memory (RAM), read-only memory (ROM), hard drive storage, temporary storage, non-volatile memory, flash memory, optical memory, or any other suitable memory for storing software objects and/or computer instructions. Memory 810 may include database components, object code components, script components, or any other type of information structure for supporting the various activities and information structures described in the present disclosure. Memory 810 may be communicably connected to processor 808 via processing circuit 806 and may include computer code for executing (e.g., by processor 808) one or more processes described herein.

MPM system 602 is shown to include an equipment performance monitor 824. Equipment performance monitor 824 can receive equipment performance information from BMS 606 and/or connected equipment 610. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of connected equipment 610. In some embodiments, equipment performance monitor 824 uses the equipment performance information to calculate the current efficiency $\eta_i$ and reliability of each device of connected equipment 610. Equipment performance monitor 824 can provide the efficiency $\eta_i$ and reliability values to model predictive optimizer 830 for use in optimizing the objective function J.

Still referring to FIG. 8, MPM system 602 is shown to include a load/rate predictor 822. Load/rate predictor 822 may be configured to predict the energy loads ($Load_i$) (e.g., heating load, cooling load, electric load, etc.) of the building or campus for each time step i of the optimization period. Load/rate predictor 822 is shown receiving weather forecasts from a weather service 604. In some embodiments, load/rate predictor 822 predicts the energy loads $Load_i$ as a function of the weather forecasts. In some embodiments, load/rate predictor 822 uses feedback from BMS 606 to predict loads $Load_i$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 822 receives a measured electric load and/or previous measured load data from BMS 606 (e.g., via equipment performance monitor 824). Load/rate predictor 822 may predict loads $Load_i$ as a function of a given weather forecast ($\hat{\phi}_w$), a day type (day), the time of day (t), and previous measured load data ($Y_{i-1}$). Such a relationship is expressed in the following equation:

$$Load_i = f(\hat{\phi}_w, day, t | Y_{i-1})$$

In some embodiments, load/rate predictor 822 uses a deterministic plus stochastic model trained from historical load data to predict loads $Load_i$. Load/rate predictor 822 may use any of a variety of prediction methods to predict loads $Load_i$ (e.g., linear regression for the deterministic portion and an AR model for the stochastic portion). Load/rate predictor 822 may predict one or more different types of loads for the building or campus. For example, load/rate predictor 822 may predict a hot water load $Load_{Hot,i}$, a cold water load $Load_{Cold,i}$, and an electric load $Load_{Elec,i}$ for each time step i within the optimization period. The predicted load values $Load_i$ can include some or all of these types of loads. In some embodiments, load/rate predictor 822 makes load/rate predictions using the techniques described in U.S. patent application Ser. No. 14/717,593, the entire disclosure of which is incorporated by reference herein.

Load/rate predictor 822 is shown receiving utility rates from utilities 608. Utility rates may indicate a cost or price per unit of a resource (e.g., electricity, natural gas, water, etc.) provided by utilities 608 at each time step i in the optimization period. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 608 or predicted utility rates estimated by load/rate predictor 822.

In some embodiments, the utility rates include demand charges for one or more resources provided by utilities 608. A demand charge may define a separate cost imposed by utilities 608 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Model predictive optimizer 830 may be configured to account for demand charges in the high level optimization process performed by high level optimizer 832. Utilities 608 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 822 may store the predicted loads $Load_i$ and the utility rates in memory 810 and/or provide the predicted loads $Load_i$ and the utility rates to model predictive optimizer 830.

Still referring to FIG. 8, MPM system 602 is shown to include a model predictive optimizer 830. Model predictive optimizer 830 can be configured to perform a multi-level optimization process to optimize the total cost associated with purchasing, maintaining, and operating connected equipment 610. In some embodiments, model predictive optimizer 830 includes a high level optimizer 832 and a low level optimizer 834. High level optimizer 832 may optimize the objective function J for an entire set of connected equipment 610 (e.g., all of the devices within a building) or for a subset of connected equipment 610 (e.g., a single device, all of the devices of a subplant or building subsystem, etc.) to determine the optimal values for each of the decision variables (e.g., $P_{op,i}$, $B_{main,i}$, and $B_{cap,i}$) in the objective function J. The optimization performed by high level optimizer 832 is described in greater detail with reference to FIG. 9.

In some embodiments, low level optimizer 834 receives the optimization results from high level optimizer 832. The optimization results may include optimal power consumption values $P_{op,i}$ and/or load values $Load_i$ for each device or set of devices of connected equipment at each time step i in the optimization period. Low level optimizer 834 may determine how to best run each device or set of devices at the load values determined by high level optimizer 832. For example, low level optimizer 834 may determine on/off states and/or operating setpoints for various devices of connected equipment 610 in order to optimize (e.g., minimize) the power consumption of connected equipment 610 meeting the corresponding load value $Load_i$.

Low level optimizer 834 may be configured to generate equipment performance curves for each device or set of devices of connected equipment 610. Each performance curve may indicate an amount of resource consumption (e.g., electricity use measured in kW, water use measured in L/s, etc.) by a particular device or set of devices of connected equipment 610 as a function of the load on the device or set of devices. In some embodiments, low level optimizer 834 generates the performance curves by performing a low level optimization process at various combinations of load points (e.g., various values of $Load_i$) and weather conditions to generate multiple data points. The low level optimization may be used to determine the minimum amount of resource consumption required to satisfy the corresponding heating or cooling load. An example of a low level optimization process which can be performed by low level optimizer 834 is described in detail in U.S. patent application Ser. No. 14/634,615 titled "Low Level Central Plant Optimization" and filed Feb. 27, 2015, the entire disclosure of which is incorporated by reference herein. Low level optimizer 834 may fit a curve to the data points to generate the performance curves.

In some embodiments, low level optimizer 834 generates equipment performance curves for a set of connected equipment 610 (e.g., a chiller subplant, a heater subplant, etc.) by combining efficiency curves for individual devices of connected equipment 610. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 818. For some devices, the device efficiency curves may indicate that resource consumption is a U-shaped function of load. Accordingly, when multiple device efficiency curves are combined into a performance curve for multiple devices, the resultant performance curve may be a wavy curve. The waves are caused by a single device loading up before it is more efficient to turn on another device to satisfy the subplant load. Low level optimizer 834 may provide the equipment performance curves to high level optimizer 832 for use in the high level optimization process.

Still referring to FIG. 8, MPM system 602 is shown to include an equipment controller 828. Equipment controller 828 can be configured to control connected equipment 610 to affect a variable state or condition in building 10 (e.g., temperature, humidity, etc.). In some embodiments, equipment controller 828 controls connected equipment 610 based on the results of the optimization performed by model predictive optimizer 830. In some embodiments, equipment controller 828 generates control signals which can be provided to connected equipment 610 via communications interface 804 and/or BMS 606. The control signals may be based on the optimal values of the decision variables in the objective function J. For example, equipment controller 828 may generate control signals which cause connected equipment 610 to achieve the optimal power consumption values $P_{op,i}$ for each time step i in the optimization period.

Data and processing results from model predictive optimizer 830, equipment controller 828, or other modules of MPM system 602 may be accessed by (or pushed to) monitoring and reporting applications 826. Monitoring and reporting applications 826 may be configured to generate real time "system health" dashboards that can be viewed and navigated by a user (e.g., a system engineer). For example, monitoring and reporting applications 826 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across building management systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the building system.

Still referring to FIG. 8, MPM system 602 may include one or more GUI servers, web services 812, or GUI engines 814 to support monitoring and reporting applications 826. In various embodiments, applications 826, web services 812, and GUI engine 814 may be provided as separate components outside of MPM system 602 (e.g., as part of a smart building manager). MPM system 602 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. MPM system 602 may be configured to provide the results of any such processing to other databases, tables, XML files, or other data structures for further querying, calculation, or access by, for example, external monitoring and reporting applications.

MPM system 602 is shown to include configuration tools 816. Configuration tools 816 can allow a user to define (e.g., via graphical user interfaces, via prompt-driven "wizards," etc.) how MPM system 602 should react to changing conditions in BMS 606 and/or connected equipment 610. In an exemplary embodiment, configuration tools 816 allow a user to build and store condition-response scenarios that can cross multiple devices of connected equipment 610, multiple building systems, and multiple enterprise control applications (e.g., work order management system applications, entity resource planning applications, etc.). For example, configuration tools 816 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 816 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Still referring to FIG. 8, MPM system 602 is shown to be connected to an equipment service scheduler 1100. In some embodiments, MPM system 602 can incorporate some of and/or all of the functionality of equipment service scheduler 1100 as described herein. In some embodiments, equipment service scheduler 1100 can provide service provider attributes to high level optimizer 832. Based on the service provider attributes, high level optimizer 832 can further optimize the objective function J by taking into consideration the service provider attributes (e.g., provider pricing, provider availability, provider rating, etc.), according to some embodiments. For example, high level optimizer 832 can determine that a service provider A is less expensive than a service provider B for repairing an equipment. However, service provider A may not be available until a week later than service provider B. In this case, high level optimizer 832 can choose service provider B if the high level optimizer 832 determines the equipment requiring maintenance will incur more operational costs over the additional week rather than the additional cost of service provider B, according to some embodiments. In some embodiments, equipment service scheduler 1100 can receive required equipment service from high level optimizer 832 via communications interface 804. In some embodiments, the required equipment service can include equipment purchase, replacement, and maintenance recommendations. In some embodiments, the required equipment service can include required equipment service times for an equipment service that is determined to be required by MPM system 602. Based on the required equipment service, equipment service scheduler 1100 can be configured to change what service providers are recommended and/or scheduled for future servicing of equipment, according to some embodiments.

High Level Optimizer

Figure 9:
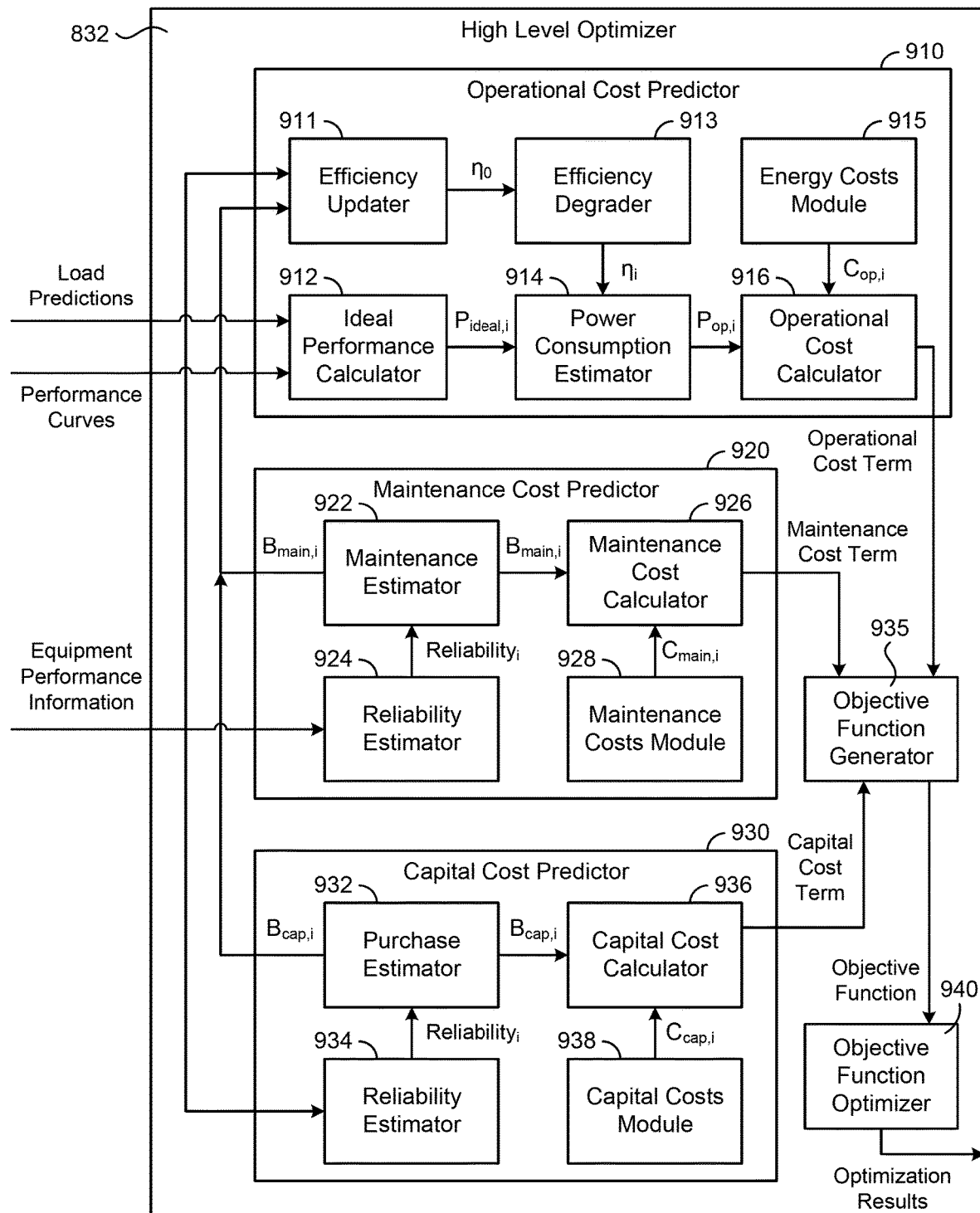
FIG. 9 is a block diagram illustrating a high level optimizer of the MPM system of FIG. 6 in greater detail, according to an exemplary embodiment.

Referring now to FIG. 9, a block diagram illustrating high level optimizer 832 in greater detail is shown, according to an exemplary embodiment. High level optimizer 832 can be configured to determine an optimal maintenance strategy for connected equipment 610. In some embodiments, the optimal maintenance strategy is a set of decisions which optimizes the total cost associated with purchasing, maintaining, and operating connected equipment 610 over the duration of an optimization period (e.g., 30 weeks, 52 weeks, 10 years, 30 years, etc.). The decisions can include, for example, equipment purchase decisions, equipment maintenance decisions, and equipment operating decisions.

High level optimizer 832 is shown to include an operational cost predictor 910, a maintenance cost predictor 920, a capital cost predictor 930, an objective function generator 935, and an objective function optimizer 940. Cost predictors 910, 920, and 930 can use a model predictive control technique to formulate an objective function which expresses the total cost as a function of several decision variables (e.g., maintenance decisions, equipment purchase decisions, etc.) and input parameters (e.g., energy cost, device efficiency, device reliability). Operational cost predictor 910 can be configured to formulate an operational cost term in the objective function. Similarly, maintenance cost predictor 920 can be configured to formulate a maintenance cost term in the objective function and capital cost predictor 930 can be configured to formulate a capital cost term in the objective function. Objective function optimizer 940 can optimize (i.e., minimize) the objective function using any of a variety of optimization techniques to identify the optimal values for each of the decision variables.

One example of an objective function which can be generated by high level optimizer 832 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Operational Cost Predictor

Operational cost predictor 910 can be configured to formulate the first term in the objective function J. The first term in the objective function J represents the operating cost of connected equipment 610 over the duration of the optimization period and is shown to include three variables or parameters (i.e., $C_{op,i}$, $P_{op,i}$, and $\Delta t$). In some embodiments, the cost per unit of energy $C_{op,i}$ is determined by energy costs module 915. Energy costs module 915 can receive a set of energy prices from utility 608 as energy pricing data. In some embodiments, the energy prices are time-varying cost that depend on the time of day, the day of the week (e.g., weekday vs. weekend), the current season (e.g., summer vs. winter), or other time-based factors. For example, the cost of electricity may be higher during peak energy consumption periods and lower during off-peak or partial-peak energy consumption periods.

Energy costs module 915 can use the energy costs to define the value of $C_{op,i}$ for each time step i of the optimization period. In some embodiments, energy costs module 915 stores the energy costs as an array $C_{op}$ including a cost element for each of the h time steps in the optimization period. For example, energy costs module 915 can generate the following array:

$$C_{op} = [C_{op,1} C_{op,2} \ldots C_{op,h}]$$

where the array $C_{op}$ has a size of 1×h and each element of the array $C_{op}$ includes an energy cost value $C_{op,i}$ for a particular time step i=1 . . . h of the optimization period.

Still referring to FIG. 9, operational cost predictor 910 is shown to include an ideal performance calculator 912. Ideal performance calculator 912 may receive load predictions $Load_i$ from load/rate predictor 822 and may receive performance curves from low level optimizer 834. As discussed above, the performance curves may define the ideal power consumption $P_{ideal}$ of a device or set of devices of connected equipment 610 as a function of the heating or cooling load on the device or set of devices. For example, the performance curve one or more devices of connected equipment 610 can be defined by the following equation:

$$P_{ideal,i} = f(Load_i)$$

where $P_{ideal,i}$ is the ideal power consumption (e.g., kW) of connected equipment 610 at time step i and $Load_i$ is the load (e.g., tons cooling, kW heating, etc.) on connected equipment 610 at time step i. The ideal power consumption $P_{ideal,i}$ may represent the power consumption of the one or more devices of connected equipment 610 assuming they operate at perfect efficiency.

Ideal performance calculator 912 can use the performance curve for a device or set of devices of connected equipment 610 to identify the value of $P_{ideal,i}$ that corresponds to the load point $Load_i$ for the device or set of devices at each time step of the optimization period. In some embodiments, ideal performance calculator 912 stores the ideal load values as an array $P_{ideal}$ including an element for each of the h time steps in the optimization period. For example, ideal performance calculator 912 can generate the following array:

$$P_{ideal} = [P_{ideal,1} P_{ideal,2} \ldots P_{ideal,h}]^T$$

where the array $P_{ideal}$ has a size of h×1 and each element of the array $P_{ideal}$ includes an ideal power consumption value $P_{ideal,i}$ for a particular time step i=1 . . . h of the optimization period.

Still referring to FIG. 9, operational cost predictor 910 is shown to include an efficiency updater 911 and an efficiency degrader 913. Efficiency updater 911 can be configured to determine the efficiency $\eta$ of connected equipment 610 under actual operating conditions. In some embodiments, the efficiency $\eta_i$ represents the ratio of the ideal power consumption $P_{ideal}$ of connected equipment to the actual power consumption P actual of connected equipment 610, as shown in the following equation:

$$\eta = \frac{P_{ideal}}{P_{actual}}$$

where $P_{ideal}$ is the ideal power consumption of connected equipment 610 as defined by the performance curve for connected equipment 610 and $P_{actual}$ is the actual power consumption of connected equipment 610. In some embodiments, efficiency updater 911 uses the equipment performance information collected from connected equipment 610 to identify the actual power consumption value $P_{actual}$. Efficiency updater 911 can use the actual power consumption $P_{actual}$ in combination with the ideal power consumption $P_{ideal}$ to calculate the efficiency $\eta$.

Efficiency updater 911 can be configured to periodically update the efficiency $\eta$ to reflect the current operating efficiency of connected equipment 610. For example, efficiency updater 911 can calculate the efficiency $\eta$ of connected equipment 610 once per day, once per week, once per year, or at any other interval as may be suitable to capture changes in the efficiency $\eta$ over time. Each value of the efficiency $\eta$ may be based on corresponding values of $P_{ideal}$ and $P_{actual}$ at the time the efficiency $\eta$ is calculated. In some embodiments, efficiency updater 911 updates the efficiency $\eta$ each time the high level optimization process is performed (i.e., each time the objective function J is optimized). The efficiency value calculated by efficiency updater 911 may be stored in memory 810 as an initial efficiency value $\eta_0$, where the subscript 0 denotes the value of the efficiency $\eta$ at or before the beginning of the optimization period (e.g., at time step 0).

In some embodiments, efficiency updater 911 updates the efficiency $\eta_i$ for one or more time steps during the optimization period to account for increases in the efficiency $\eta$ of connected equipment 610 that will result from performing maintenance on connected equipment 610 or purchasing new equipment to replace or supplement one or more devices of connected equipment 610. The time steps i at which the efficiency $\eta_i$ is updated may correspond to the predicted time steps at which the maintenance will be performed or the equipment will replaced. The predicted time steps at which maintenance will be performed on connected equipment 610 may be defined by the values of the binary decision variables $B_{main,i}$ in the objective function J. Similarly, the predicted time steps at which the equipment will be replaced may be defined by the values of the binary decision variables $B_{cap,i}$ in the objective function J.

Efficiency updater 911 can be configured to reset the efficiency $\eta_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, efficiency updater 911 can be configured to reset the value of $\eta_i$ to $\eta_{main}$, where $\eta_{main}$ is the efficiency value that is expected to result from the maintenance performed at time step i. Similarly, if $B_{cap,i}=1$, efficiency updater 911 can be configured to reset the value of $\eta_i$ to $\eta_{cap}$, where $\eta_{cap}$ is the efficiency value that is expected to result from purchasing a new device to supplement or replace one or more devices of connected equipment 610 performed at time step i. Efficiency updater 911 can dynamically reset the efficiency $\eta_i$ for one or more time steps while the optimization is being performed (e.g., with each iteration of the optimization) based on the values of binary decision variables $B_{main,i}$ and $B_{cap,i}$.

Efficiency degrader 913 can be configured to predict the efficiency $\eta_i$ of connected equipment 610 at each time step i of the optimization period. The initial efficiency $\eta_0$ at the beginning of the optimization period may degrade over time as connected equipment 610 degrade in performance. For example, the efficiency of a chiller may degrade over time as a result of the chilled water tubes becoming dirty and reducing the heat transfer coefficient of the chiller. Similarly, the efficiency of a battery may decrease over time as a result of degradation in the physical or chemical components of the battery. Efficiency degrader 913 can be configured to account for such degradation by incrementally reducing the efficiency $\eta_i$ over the duration of the optimization period.

In some embodiments, the initial efficiency value $\eta_0$ is updated at the beginning of each optimization period. However, the efficiency $\eta$ may degrade during the optimization period such that the initial efficiency value $\eta_0$ becomes increasingly inaccurate over the duration of the optimization period. To account for efficiency degradation during the optimization period, efficiency degrader 913 can decrease the efficiency $\eta$ by a predetermined amount with each successive time step. For example, efficiency degrader 913 can define the efficiency at each time step i=1 ... h as follows:

$$\eta_i = \eta_{i-1} - \Delta\eta$$

where $\eta_i$ is the efficiency at time step i, is the efficiency at time step i−1, and $\Delta\eta$ is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $\eta_i$ may be reset to either $\eta_{main}$ or $\eta_{cap}$ as previously described.

In some embodiments, the value of $\Delta\eta$ is based on a time series of efficiency values calculated by efficiency updater 911. For example, efficiency degrader 913 may record a time series of the initial efficiency values $\eta_0$ calculated by efficiency updater 911, where each of the initial efficiency values $\eta_0$ represents the empirically-calculated efficiency of connected equipment 610 at a particular time. Efficiency degrader 913 can examine the time series of initial efficiency values $\eta_0$ to determine the rate at which the efficiency degrades. For example, if the initial efficiency $\eta_0$ at time $t_1$ is $\eta_{0,1}$ and the initial efficiency at time $t_2$ is $\eta_{0,2}$, efficiency degrader 913 can calculate the rate of efficiency degradation as follows:

$$\frac{\Delta\eta}{\Delta t} = \frac{\eta_{0,2} - \eta_{0,1}}{t_2 - t_1}$$

where $$\frac{\Delta\eta}{\Delta t}$$

is the rate or efficiency degradation. Efficiency degrader 913 can multiply $$\frac{\Delta\eta}{\Delta t}$$

by the duration of each time step $\Delta t$ to calculate the value of $\Delta\eta$ $$\left(\text{i.e., } \Delta\eta = \frac{\Delta\eta}{\Delta t} * \Delta t\right).$$

In some embodiments, efficiency degrader 913 stores the efficiency values over the duration of the optimization period in an array including an element for each of the h time steps in the optimization period. For example, efficiency degrader 913 can generate the following array:

$$\eta = [\eta_1 \eta_2 \ldots \eta_h]$$

where the array $\eta$ has a size of 1×h and each element of the array includes an efficiency value $\eta_i$ for a particular time step i=1 ... h of the optimization period. Each element i of the array $\eta$ may be calculated based on the value of the previous element and the value of $\Delta\eta$ (e.g., if $B_{main,i}=0$ and $B_{cap,i}=0$) or may be dynamically reset to either $\eta_{main}$ or $\eta_{cap}$ (e.g., if $B_{main,i}=1$ or $B_{cap,i}=1$.

The logic characterizing the efficiency updating and resetting operations performed by efficiency updater 911 and efficiency degrader 913 can be summarized in the following equations:

if $B_{main,i}=1 \rightarrow \eta_i = \eta_{main}$ if $B_{cap,i}=1 \rightarrow \eta_i = \eta_{cap}$ if $B_{main,i}=0$ and $B_{cap,i}=0 \rightarrow \eta_i = \eta_{i-1} - \Delta\eta$ which can be applied as constraints on the high level optimization performed by objective function optimizer 940.

Advantageously, efficiency updater 911 and efficiency degrader 913 can model the efficiency $\eta_i$ of connected equipment 610 at each time step i as a function of the maintenance decisions $B_{main,i}$ and the equipment purchase decisions $B_{cap,i}$. For example, the efficiency $\eta_i$ for a particular device may start at an initial value $\eta_0$ at the beginning of the optimization period and may degrade over time such that the efficiency $\eta_i$ decreases with each successive time step i. Performing maintenance on a device may reset the efficiency $\eta_i$ to a higher value immediately after the maintenance is performed. Similarly, purchasing a new device to replace an existing device may reset the efficiency $\eta_i$ to a higher value immediately after the new device is purchased. After being reset, the efficiency $\eta_i$ may continue to degrade over time until the next time at which maintenance is performed or a new device is purchased.

Still referring to FIG. 9, operational cost predictor 910 is shown to include a power consumption estimator 914 and an operational cost calculator 916. Power consumption estimator 914 can be configured to estimate the power consumption $P_{op,i}$ of connected equipment 610 at each time step i of the optimization period. In some embodiments, power consumption estimator 914 estimates the power consumption $P_{op,i}$ as a function of the ideal power consumption $P_{ideal,i}$ calculated by ideal performance calculator 912 and the efficiency $\eta_i$ determined by efficiency degrader 913 and/or efficiency updater 911. For example, power consumption estimator 914 can calculate the power consumption $P_{op,i}$ using the following equation:

$$P_{op,i} = \frac{P_{ideal,i}}{\eta_i}$$

where $P_{ideal,i}$ is the power consumption calculated by ideal performance calculator 912 based on the equipment performance curve for the device at the corresponding load point $Load_i$, and $\eta_i$ is the operating efficiency of the device at time step i.

In some embodiments, power consumption estimator 914 stores the power consumption values as an array $P_{op}$ including an element for each of the h time steps in the optimization period. For example, power consumption estimator 914 can generate the following array:

$$P_{op} = [P_{op,1} P_{op,2} \ldots P_{op,h}]^T$$

where the array $P_{op}$ has a size of h×1 and each element of the array $P_{op}$ includes a power consumption value $P_{op,i}$ for a particular time step i=1 . . . h of the optimization period.

Operational cost calculator 916 can be configured to estimate the operational cost of connected equipment 610 over the duration of the optimization period. In some embodiments, operational cost calculator 916 calculates the operational cost during each time step i using the following equation:

$$Cost_{op,i} = C_{op,i} P_{op,i} \Delta t$$

where $P_{op,i}$ is the predicted power consumption at time step i determined by power consumption estimator 914, $C_{op,i}$ is the cost per unit of energy at time step i determined by energy costs module 915, and $\Delta t$ is the duration of each time step. Operational cost calculator 916 can sum the operational costs over the duration of the optimization period as follows:

$$Cost_{op} = \sum_{i=1}^{h} Cost_{op,i}$$

where $Cost_{op}$ is the operational cost term of the objective function J.

In other embodiments, operational cost calculator 916 estimates the operational cost $Cost_{op}$ by multiplying the cost array $C_{op}$ by the power consumption array $P_{op}$ and the duration of each time step $\Delta t$ as shown in the following equations:

$$Cost_{op} = C_{op} P_{op} \Delta t$$

$$Cost_{op} = [C_{op,1} C_{op,2} \ldots C_{op,h}][P_{op,1} P_{op,2} \ldots P_{op,h}]^T \Delta t$$

Maintenance Cost Predictor

Maintenance cost predictor 920 can be configured to formulate the second term in the objective function J. The second term in the objective function J represents the cost of performing maintenance on connected equipment 610 over the duration of the optimization period and is shown to include two variables or parameters (i.e., $C_{main,i}$ and $B_{main,i}$). Maintenance cost predictor 920 is shown to include a maintenance estimator 922, a reliability estimator 924, a maintenance cost calculator 926, and a maintenance costs module 928.

Reliability estimator 924 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed.

In some embodiments, reliability estimator 924 uses the equipment performance information to identify a current operating state of connected equipment 610. The current operating state can be examined by reliability estimator 924 to expose when connected equipment 610 begins to degrade in performance and/or to predict when faults will occur. In some embodiments, reliability estimator 924 estimates a likelihood of various types of failures that could potentially occur in connected equipment 610. The likelihood of each failure may be based on the current operating conditions of connected equipment 610, an amount of time that has elapsed since connected equipment 610 has been installed, and/or an amount of time that has elapsed since maintenance was last performed. In some embodiments, reliability estimator 924 identifies operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, reliability estimator 924 receives operating data from a plurality of devices of connected equipment 610 distributed across multiple buildings. The operating data can include, for example, current operating conditions, fault indications, failure times, or other data that characterize the operation and performance of connected equipment 610. Reliability estimator 924 can use the set of operating data to develop a reliability model for each type of equipment. The reliability models can be used by reliability estimator 924 to estimate the reliability of any given device of connected equipment 610 as a function of its current operating conditions and/or other extraneous factors (e.g., time since maintenance was last performed, time since installation or purchase, geographic location, water quality, etc.).

One example of a reliability model which can be used by reliability estimator 924 is shown in the following equation:

$$Reliability_i = f(OpCond_i, \Delta t_{main,i}, \Delta t_{cap,i})$$

where Reliability$_i$ is the reliability of connected equipment 610 at time step i, OpCond$_i$ are the operating conditions at time step i, $\Delta t_{main,i}$ is the amount of time that has elapsed between the time at which maintenance was last performed and time step i, and $\Delta t_{cap,i}$ is the amount of time that has elapsed between the time at which connected equipment 610 was purchased or installed and time step i. Reliability estimator 924 can be configured to identify the current operating conditions OpCond$_i$ based on the equipment performance information received as a feedback from connected equipment 610. Operating under more strenuous conditions (e.g., high load, extreme temperatures, etc.) may result in a lower reliability, whereas operating under less strenuous conditions (e.g., low load, moderate temperatures, etc.) may result in a higher reliability.

Reliability estimator 924 may determine the amount of time $\Delta t_{main,i}$ that has elapsed since maintenance was last performed on connected equipment 610 based on the values of the binary decision variables $B_{main,i}$. For each time step i, reliability estimator 924 can examine the corresponding values of $B_{main,i}$ at time step i and each previous time step (e.g., time steps i−1, i−2, . . . , 1). Reliability estimator 924 can calculate the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed may result in a lower reliability, whereas a short amount of time since maintenance was last performed may result in a higher reliability.

Similarly, reliability estimator 924 may determine the amount of time $\Delta t_{cap,i}$ that has elapsed since connected equipment 610 was purchased or installed based on the values of the binary decision variables $B_{cap,i}$. For each time step i, reliability estimator 924 can examine the corresponding values of $B_{cap}$ at time step i and each previous time step (e.g., time steps i−1, i−2, . . . , 1). Reliability estimator 924 can calculate the value of $\Delta t_{cap,i}$ by subtracting the time at which connected equipment 610 was purchased or installed (i.e., the most recent time at which $B_{cap,i}=1$) from the time associated with time step i. A long amount of time $\Delta t_{cap,i}$ since connected equipment 610 was purchased or installed may result in a lower reliability, whereas a short amount of time since connected equipment 610 was purchased or installed may result in a higher reliability.

Reliability estimator 924 can be configured to reset the reliability for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, reliability estimator 924 can be configured to reset the value of Reliability to Reliability$_{main}$, where Reliability$_{main}$ is the reliability value that is expected to result from the maintenance performed at time step i. Similarly, if $B_{cap,i}=1$, reliability estimator 924 can be configured to reset the value of Reliability to Reliability$_{cap}$, where Reliability$_{cap}$ is the reliability value that is expected to result from purchasing a new device to supplement or replace one or more devices of connected equipment 610 performed at time step i. Reliability estimator 924 can dynamically reset the reliability for one or more time steps while the optimization is being performed (e.g., with each iteration of the optimization) based on the values of binary decision variables $B_{main,i}$ and $B_{cap,i}$.

Maintenance estimator 922 can be configured to use the estimated reliability of connected equipment 610 over the duration of the optimization period to determine the probability that connected equipment 610 will require maintenance and/or replacement at each time step of the optimization period. In some embodiments, maintenance estimator 922 is configured to compare the probability that connected equipment 610 will require maintenance at a given time step to a critical value. Maintenance estimator 922 can be configured to set the value of =1 in response to a determination that the probability that connected equipment 610 will require maintenance at time step i exceeds the critical value. Similarly, maintenance estimator 922 can be configured to compare the probability that connected equipment 610 will require replacement at a given time step to a critical value. Maintenance estimator 922 can be configured to set the value of $B_{cap,i}=1$ in response to a determination that the probability that connected equipment 610 will require replacement at time step i exceeds the critical value.

In some embodiments, a reciprocal relationship exists between the reliability of connected equipment 610 and the values of the binary decision variables and $B_{cap,i}$. In other words, the reliability of connected equipment 610 can affect the values of the binary decision variables $B_{main,i}$ and $B_{cap,i}$ selected in the optimization, and the values of the binary decision variables $B_{main,i}$ and $B_{cap,i}$ can affect the reliability of connected equipment 610. Advantageously, the optimization performed by objective function optimizer 940 can identify the optimal values of the binary decision variables and $B_{cap,i}$ while accounting for the reciprocal relationship between the binary decision variables $B_{main,i}$ and $B_{cap,i}$ and the reliability of connected equipment 610.

In some embodiments, maintenance estimator 922 generates a matrix $B_{main}$ of the binary maintenance decision variables. The matrix $B_{main}$ may include a binary decision variable for each of the different maintenance activities that can be performed at each time step of the optimization period. For example, maintenance estimator 922 can generate the following matrix:

$$B_{main} = \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix}$$

where the matrix $B_{main}$ has a size of m×h and each element of the matrix $B_{main}$ includes a binary decision variable for a particular maintenance activity at a particular time step of the optimization period. For example, the value of the binary decision variable $B_{main,j,i}$ indicates whether the jth maintenance activity will be performed during the ith time step of the optimization period.

Still referring to FIG. 9, maintenance cost predictor 920 is shown to include a maintenance costs module 928 and a maintenance costs calculator 926. Maintenance costs module 928 can be configured to determine costs $C_{main,i}$ associated with performing various types of maintenance on connected equipment 610. Maintenance costs module 928 can receive a set of maintenance costs from an external system or device (e.g., a database, a user device, etc.). In some embodiments, the maintenance costs define the economic cost (e.g., $) of performing various types of maintenance. Each type of maintenance activity may have a different economic cost associated therewith. For example, the maintenance activity of changing the oil in a chiller compressor may incur a relatively small economic cost, whereas the maintenance activity of completely disassembling the chiller and cleaning all of the chilled water tubes may incur a significantly larger economic cost.

Maintenance costs module 928 can use the maintenance costs to define the values of $C_{main,i}$ in objective function J. In some embodiments, maintenance costs module 928 stores the maintenance costs as an array $C_{main}$ including a cost element for each of the maintenance activities that can be performed. For example, maintenance costs module 928 can generate the following array:

$$C_{main} = [C_{main,1} C_{main,2} \ldots C_{main,m}]$$

where the array $C_{main}$ has a size of 1×m and each element of the array $C_{main}$ includes a maintenance cost value $C_{main,j}$ for a particular maintenance activity j=1 . . . m.

Some maintenance activities may be more expensive than other. However, different types of maintenance activities may result in different levels of improvement to the efficiency η and/or the reliability of connected equipment 610. For example, merely changing the oil in a chiller may result in a minor improvement in efficiency η and/or a minor improvement in reliability, whereas completely disassembling the chiller and cleaning all of the chilled water tubes may result in a significantly greater improvement to the efficiency η and/or the reliability of connected equipment 610. Accordingly, multiple different levels of post-maintenance efficiency (i.e., $\eta_{main}$) and post-maintenance reliability (i.e., $Reliability_{main}$) may exist. Each level of $\eta_{main}$ and $Reliability_{main}$ may correspond to a different type of maintenance activity.

In some embodiments, maintenance estimator 922 stores each of the different levels of $\eta_{main}$ and $Reliability_{main}$ in a corresponding array. For example, the parameter $\eta_{main}$ can be defined as an array $\eta_{main}$ with an element for each of the m different types of maintenance activities. Similarly, the parameter $Reliability_{main}$ can be defined as an array $Reliability_{main}$ with an element for each of the m different types of maintenance activities. Examples of these arrays are shown in the following equations:

$$\eta_{main} = [\eta_{main,1} \eta_{main,2} \ldots \eta_{main,m}]$$

$$Reliability_{main} = [Reliability_{main,1} Reliability_{main,2} \ldots Reliability_{main,m}]$$

where the array $\eta_{main}$ has a size of 1×m and each element of the array $\eta_{main}$ includes a post-maintenance efficiency value $\eta_{main,j}$ for a particular maintenance activity. Similarly, the array $Reliability_{main}$ has a size of 1×m and each element of the array $Reliability_{main}$ includes a post-maintenance reliability value $Reliability_{main,j}$ for a particular maintenance activity.

In some embodiments, efficiency updater 911 identifies the maintenance activity associated with each binary decision variable $B_{main,j,i}$ and resets the efficiency η to the corresponding post-maintenance efficiency level $\eta_{main,j}$ if $B_{main,j,i}=1$. Similarly, reliability estimator 924 can identify the maintenance activity associated with each binary decision variable $B_{main,j,i}$ and can reset the reliability to the corresponding post-maintenance reliability level $Reliability_{main,j}$ if $B_{main,j,i}=1$.

Maintenance cost calculator 926 can be configured to estimate the maintenance cost of connected equipment 610 over the duration of the optimization period. In some embodiments, maintenance cost calculator 926 calculates the maintenance cost during each time step i using the following equation:

$$Cost_{main,i} = C_{main,i} B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Maintenance cost calculator 926 can sum the maintenance costs over the duration of the optimization period as follows:

$$Cost_{main} = \sum_{i=1}^{h} Cost_{main,i}$$

where $Cost_{main}$ is the maintenance cost term of the objective function J.

In other embodiments, maintenance cost calculator 926 estimates the maintenance cost $Cost_{main}$ by multiplying the maintenance cost array $C_{main}$ by the matrix of binary decision variables $B_{main}$ as shown in the following equations:

$$Cost_{main} = C_{main} B_{main}$$

$$Cost_{main} = \begin{bmatrix} C_{main,1} & C_{main,2} & \ldots & C_{main,m} \end{bmatrix} \begin{bmatrix} B_{main,1,1} & B_{main,1,2} & \ldots & B_{main,1,h} \\ B_{main,2,1} & B_{main,2,2} & \ldots & B_{main,2,h} \\ \vdots & \vdots & \ddots & \vdots \\ B_{main,m,1} & B_{main,m,2} & \ldots & B_{main,m,h} \end{bmatrix}$$

Capital Cost Predictor

Capital cost predictor 930 can be configured to formulate the third term in the objective function J. The third term in the objective function J represents the cost of purchasing new devices of connected equipment 610 over the duration of the optimization period and is shown to include two variables or parameters (i.e., $C_{cap,i}$ and $B_{cap,i}$). Capital cost predictor 930 is shown to include a purchase estimator 932, a reliability estimator 934, a capital cost calculator 936, and a capital costs module 938.

Reliability estimator 934 can include some or all of the features of reliability estimator 924, as described with reference to maintenance cost predictor 920. For example, reliability estimator 934 can be configured to estimate the reliability of connected equipment 610 based on the equipment performance information received from connected equipment 610. The reliability may be a statistical measure of the likelihood that connected equipment 610 will continue operating without fault under its current operating conditions. Operating under more strenuous conditions (e.g., high load, high temperatures, etc.) may result in a lower reliability, whereas operating under less strenuous conditions (e.g., low load, moderate temperatures, etc.) may result in a higher reliability. In some embodiments, the reliability is based on an amount of time that has elapsed since connected equipment 610 last received maintenance and/or an amount of time that has elapsed since connected equipment 610 was purchased or installed. Reliability estimator 934 can include some or all of the features and/or functionality of reliability estimator 924, as previously described.

Purchase estimator 932 can be configured to use the estimated reliability of connected equipment 610 over the duration of the optimization period to determine the probability that new devices of connected equipment 610 will be purchased at each time step of the optimization period. In some embodiments, purchase estimator 932 is configured to compare the probability that new devices of connected equipment 610 will be purchased at a given time step to a critical value. Purchase estimator 932 can be configured to set the value of $B_{cap,i}=1$ in response to a determination that the probability that connected equipment 610 will be purchased at time step i exceeds the critical value.

In some embodiments, purchase estimator 932 generates a matrix $B_{cap}$ of the binary capital decision variables. The matrix $B_{cap}$ may include a binary decision variable for each of the different capital purchases that can be made at each time step of the optimization period. For example, purchase estimator 932 can generate the following matrix:

$$B_{cap} = \begin{bmatrix} B_{cap,1,1} & B_{cap,1,2} & \ldots & B_{cap,1,h} \\ B_{cap,2,1} & B_{cap,2,2} & \ldots & B_{cap,2,h} \\ \vdots & \vdots & \ddots & \vdots \\ B_{cap,p,1} & B_{cap,p,2} & \ldots & B_{cap,p,h} \end{bmatrix}$$

where the matrix $B_{cap}$ has a size of p×h and each element of the matrix $B_{cap}$ includes a binary decision variable for a particular capital purchase at a particular time step of the optimization period. For example, the value of the binary decision variable $B_{cap,k,i}$ indicates whether the kth capital purchase will be made during the ith time step of the optimization period.

Still referring to FIG. 9, capital cost predictor 930 is shown to include a capital costs module 938 and a capital cost calculator 936. Capital costs module 938 can be configured to determine costs $C_{cap,i}$ associated with various capital purchases (i.e., purchasing one or more new devices of connected equipment 610). Capital costs module 938 can receive a set of capital costs from an external system or device (e.g., a database, a user device, etc.). In some embodiments, the capital costs define the economic cost (e.g., $) of making various capital purchases. Each type of capital purchase may have a different economic cost associated therewith. For example, purchasing a new temperature sensor may incur a relatively small economic cost, whereas purchasing a new chiller may incur a significantly larger economic cost.

Capital costs module 938 can use the purchase costs to define the values of $C_{cap,i}$ in objective function J. In some embodiments, capital costs module 938 stores the capital costs as an array $C_{cap}$ including a cost element for each of the capital purchases that can be made. For example, capital costs module 938 can generate the following array:

$$C_{cap}=[C_{cap,1} C_{cap,2} \ldots C_{cap,p}]$$

where the array $C_{cap}$ has a size of 1×p and each element of the array $C_{cap}$ includes a cost value $C_{cap,k}$ for a particular capital purchase k=1 . . . p.

Some capital purchases may be more expensive than other. However, different types of capital purchases may result in different levels of improvement to the efficiency η and/or the reliability of connected equipment 610. For example, purchasing a new sensor to replace an existing sensor may result in a minor improvement in efficiency η and/or a minor improvement in reliability, whereas purchasing a new chiller and control system may result in a significantly greater improvement to the efficiency η and/or the reliability of connected equipment 610. Accordingly, multiple different levels of post-purchase efficiency (i.e., $\eta_{cap}$) and post-purchase reliability (i.e., Reliability$_{cap}$) may exist. Each level of $\eta_{cap}$ and Reliability$_{cap}$ may correspond to a different type of capital purchase.

In some embodiments, purchase estimator 932 stores each of the different levels of $\eta_{cap}$ and Reliability$_{cap}$ in a corresponding array. For example, the parameter $\eta_{cap}$ can be defined as an array $\eta_{cap}$ with an element for each of the p different types of capital purchases which can be made. Similarly, the parameter Reliability$_{cap}$ can be defined as an array Reliability$_{cap}$ with an element for each of the p different types of capital purchases that can be made. Examples of these arrays are shown in the following equations:

$$\eta_{cap}=[\eta_{cap,1} \eta_{cap,2} \ldots \eta_{cap,p}]$$

$$\text{Reliability}_{cap}=[\text{Reliability}_{cap,1} \text{Reliability}_{cap,2} \ldots \text{Reliability}_{cap,p}]$$

where the array $\eta_{cap}$ has a size of 1×p and each element of the array $\eta_{cap}$ includes a post-purchase efficiency value $\eta_{cap,k}$ for a particular capital purchase k. Similarly, the array Reliability$_{cap}$ has a size of 1×p and each element of the array Reliability$_{cap}$ includes a post-purchase reliability value Reliability$_{cap,k}$ for a particular capital purchase k.

In some embodiments, efficiency updater 911 identifies the capital purchase associated with each binary decision variable $B_{main,k,i}$ and resets the efficiency η to the corresponding post-purchase efficiency level $\eta_{cap,k}$ if $B_{cap,k,i}=1$. Similarly, reliability estimator 924 can identify the capital purchase associated with each binary decision variable $B_{cap,k,i}$ and can reset the reliability to the corresponding post-purchase reliability level Reliability$_{cap,k}$ if $B_{main,k,i}=1$.

Capital cost calculator 936 can be configured to estimate the capital cost of connected equipment 610 over the duration of the optimization period. In some embodiments, capital cost calculator 936 calculates the capital cost during each time step i using the following equation:

$$\text{Cost}_{cap,i}=C_{cap,i}B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Capital cost calculator 936 can sum the capital costs over the duration of the optimization period as follows:

$$\text{Cost}_{cap} = \sum_{i=1}^{h} \text{Cost}_{cap,i}$$

where Cost$_{cap}$ is the capital cost term of the objective function J.

In other embodiments, capital cost calculator 936 estimates the capital cost Cost$_{cap}$ by multiplying the capital cost array $C_{cap}$ by the matrix of binary decision variables $B_{cap}$ as shown in the following equations:

$$\text{Cost}_{cap} = C_{cap}B_{cap}$$

$$Cost_{cap} = \begin{bmatrix} C_{cap,1} & C_{cap,2} & \cdots & C_{cap,p} \end{bmatrix} \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

Objective Function Optimizer

Still referring to FIG. 9, high level optimizer 832 is shown to include an objective function generator 935 and an objective function optimizer 940. Objective function generator 935 can be configured to generate the objective function J by summing the operational cost term, the maintenance cost term, and the capital cost term formulated by cost predictors 910, 920, and 930. One example of an objective function which can be generated by objective function generator 935 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated by objective function generator 935 is shown in the following equation:

$$J = C_{op} P_{op} \Delta t + C_{main} B_{main} + C_{cap} B_{cap}$$

$$J = \begin{bmatrix} C_{op,1} & C_{op,2} & \cdots & C_{op,h} \end{bmatrix} \begin{bmatrix} P_{op,1} & P_{op,2} & \cdots & P_{op,h} \end{bmatrix}^T \Delta t +$$

$$\begin{bmatrix} C_{main,1} & C_{main,2} & \cdots & C_{main,m} \end{bmatrix} \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix} +$$

$$\begin{bmatrix} C_{cap,1} & C_{cap,2} & \cdots & C_{cap,p} \end{bmatrix} \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where the array $C_{op}$ includes an energy cost value $C_{op,i}$ for a particular time step i=1 ... h of the optimization period, the array $P_{op}$ includes a power consumption value $P_{op,i}$ for a particular time step i=1 ... h of the optimization period, each element of the array $C_{main}$ includes a maintenance cost value $C_{main,j}$ for a particular maintenance activity j=1 ... m, each element of the matrix $B_{main}$ includes a binary decision variable for a particular maintenance activity j=1 ... m at a particular time step i=1 ... h of the optimization period, each element of the array $C_{rap}$ includes a capital cost value $C_{cap,k}$ for a particular capital purchase k=1 ... p, and each element of the matrix $B_{cap}$ includes a binary decision variable for a particular capital purchase k=1 ... p at a particular time step i=1 ... h of the optimization period.

Objective function generator 935 can be configured to impose constraints on one or more variables or parameters in the objective function J. The constraints can include any of the equations or relationships described with reference to operational cost predictor 910, maintenance cost predictor 920, and capital cost predictor 930. For example, objective function generator 935 can impose a constraint which defines the power consumption values $P_{op,i}$ for one or more devices of connected equipment 610 as a function of the ideal power consumption $P_{ideal,i}$ and the efficiency (e.g., $P_{op,i} = P_{ideal,i}/\eta_i$). Objective function generator 935 can impose a constraint which defines the efficiency $\eta_i$ as a function of the binary decision variables $B_{main,i}$ and $B_{cap,i}$, as described with reference to efficiency updater 911 and efficiency degrader 913. Objective function generator 935 can impose a constraint which constrains the binary decision variables $B_{main,i}$ and $B_{cap,i}$ to a value of either zero or one and defines the binary decision variables $B_{main,i}$ and $B_{cap,i}$ as a function of the reliability Reliability$_i$ of connected equipment 610, as described with reference to maintenance estimator 922 and purchase estimator 932. Objective function generator 935 can impose a constraint which defines the reliability Reliability$_i$ of connected equipment 610 as a function of the equipment performance information (e.g., operating conditions, run hours, etc.) as described with reference to reliability estimators 924 and 934.

Objective function optimizer 940 can optimize the objective function J to determine the optimal values of the binary decision variables $B_{main,i}$ and $B_{cap,i}$ over the duration of the optimization period. Objective function optimizer 940 can use any of a variety of optimization techniques to formulate and optimize the objective function J. For example, objective function optimizer 940 can use integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, objective function optimizer 940 uses mixed integer stochastic optimization to optimize the objective function J. In mixed integer stochastic optimization, some of the variables in the objective function J can be defined as functions of random variables or probabilistic variables. For example, the decision variables $B_{main,i}$ and $B_{cap,i}$ can be defined as binary variables that have probabilistic values based on the reliability of connected equipment 610. Low reliability values may increase the probability that the binary decision variables $B_{main,i}$ and $B_{cap,i}$ will have a value of one (e.g., $B_{main,i}=1$ and $B_{cap,i}=1$), whereas high reliability values may increase the probability that the binary decision variables $B_{main,i}$ and $B_{cap,i}$ will have a value of zero (e.g., $B_{main,i}=0$ and $B_{cap,i}=0$). In some embodiments, maintenance estimator 922 and purchase estimator 932 use a mixed integer stochastic technique to define the values of the binary decision variables $B_{main,i}$ and $B_{cap,i}$ as a probabilistic function of the reliability of connected equipment 610.

As discussed above, the objective function J may represent the predicted cost of operating, maintaining, and purchasing one or more devices of connected equipment 610 over the duration of the optimization period. In some embodiments, objective function optimizer 940 is configured to project these costs back to a particular point in time (e.g., the current time) to determine the net present value (NPV) of the one or more devices of connected equipment 610 at a particular point in time. For example, objective function optimizer 940 can project each of the costs in objective function J back to the current time using the following equation:

$$NPV_{cost} = \sum_{i=1}^{h} \frac{Cost_i}{(1+r)^i}$$

where r is the interest rate, $Cost_i$ is the cost incurred during time step i of the optimization period, and $NPV_{cost}$ is the net present value (i.e., the present cost) of the total costs incurred over the duration of the optimization period. In some embodiments, objective function optimizer 940 optimizes the net present value $NPV_{cost}$ to determine the NPV of one or more devices of connected equipment 610 at a particular point in time.

As discussed above, one or more variables or parameters in the objective function J can be updated dynamically based on closed-loop feedback from connected equipment 610. For example, the equipment performance information received from connected equipment 610 can be used to update the reliability and/or the efficiency of connected equipment 610. Objective function optimizer 940 can be configured to optimize the objective function/periodically (e.g., once per day, once per week, once per month, etc.) to dynamically update the predicted cost and/or the net present value $NPV_{cost}$ based on the closed-loop feedback from connected equipment 610.

In some embodiments, objective function optimizer 940 generates optimization results. The optimization results may include the optimal values of the decision variables in the objective function J for each time step i in the optimization period. The optimization results include operating decisions, equipment maintenance decisions, and/or equipment purchase decisions for each device of connected equipment 610. In some embodiments, the optimization results optimize the economic value of operating, maintaining, and purchasing connected equipment 610 over the duration of the optimization period. In some embodiments, the optimization results optimize the net present value of one or more devices of connected equipment 610 at a particular point in time. The optimization results may cause BMS 606 to activate, deactivate, or adjust a setpoint for connected equipment 610 in order to achieve the optimal values of the decision variables specified in the optimization results.

In some embodiments, MPM system 602 uses the optimization results to generate equipment purchase and maintenance recommendations. The equipment purchase and maintenance recommendations may be based on the optimal values for the binary decision variables $B_{main,i}$ and $B_{cap,i}$ determined by optimizing the objective function J. For example, a value of $B_{main,25}=1$ for a particular device of connected equipment 610 may indicate that maintenance should be performed on that device at the $25^{th}$ time step of the optimization period, whereas a value of $B_{main,25}=0$ may indicate that the maintenance should not be performed at that time step. Similarly, a value of $B_{cap,25}=1$ may indicate that a new device of connected equipment 610 should be purchased at the $25^{th}$ time step of the optimization period, whereas a value of $B_{cap,25}=0$ may indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Model Predictive Maintenance Process

Figure 10:
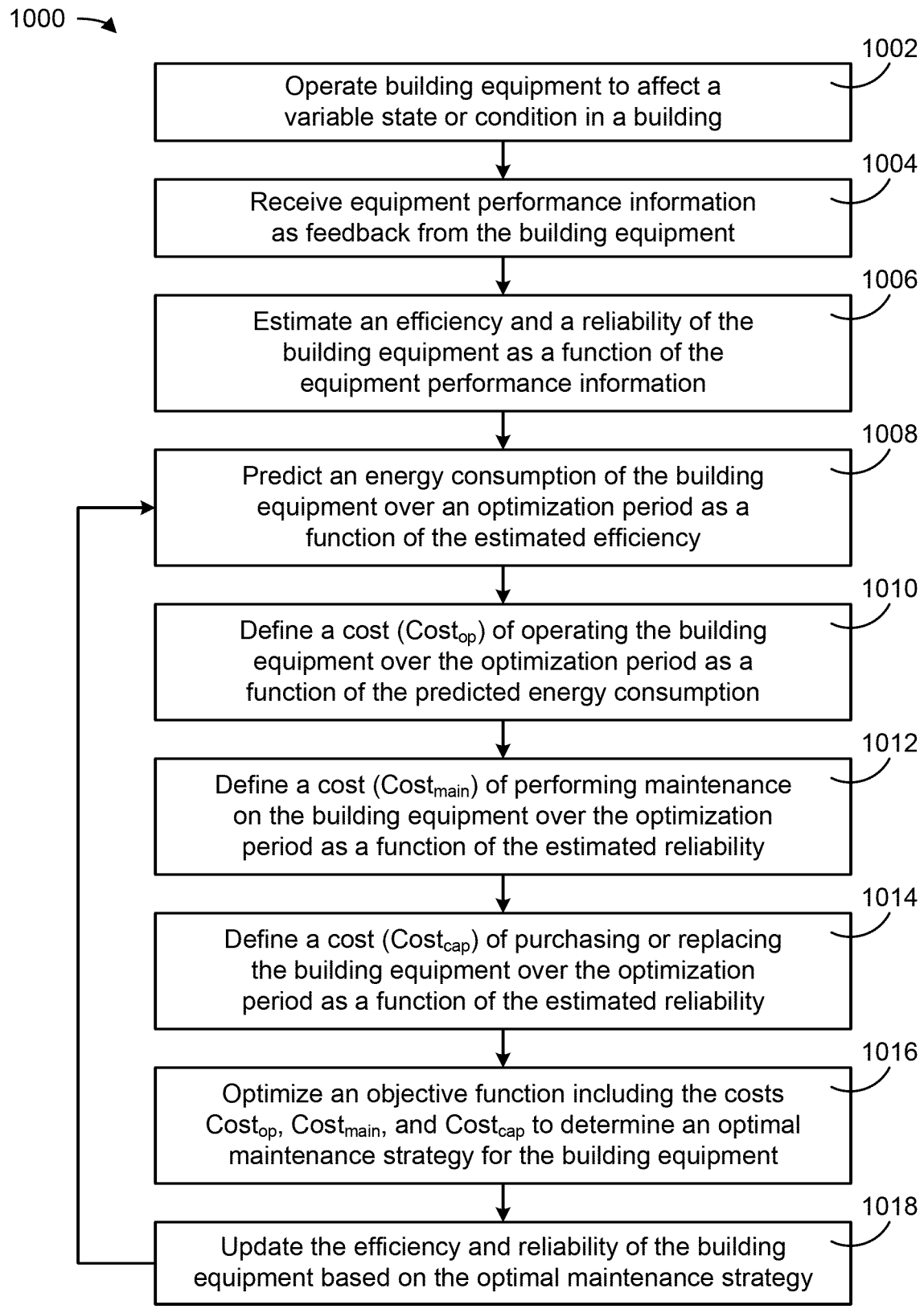
FIG. 10 is a flowchart of a process for operating the MPM system of FIG. 6, according to an exemplary embodiment.

Referring now to FIG. 10, a flowchart of a model predictive maintenance process 1000 is shown, according to an exemplary embodiment. Process 1000 can be performed by one or more components of building system 600. In some embodiments, process 1000 is performed by MPM system 602, as described with reference to FIGS. 6-9.

Process 1000 is shown to include operating building equipment to affect a variable state or condition of a building (step 1002) and receiving equipment performance information as feedback from the building equipment (step 1004). The building equipment can include type of equipment which can be used to monitor and/or control a building (e.g., connected equipment 610). For example, the building equipment can include chillers, AHUs, boilers, batteries, heaters, economizers, valves, actuators, dampers, cooling towers, fans, pumps, lighting equipment, security equipment, refrigeration equipment, or any other type of equipment in a building system or building management system. The building equipment can include any of the equipment of HVAC system 100, waterside system 200, airside system 300, BMS 400, and/or BMS 500, as described with reference to FIGS. 1-5. The equipment performance information can include samples of monitored variables (e.g., measured temperature, measured pressure, measured flow rate, power consumption, etc.), current operating conditions (e.g., heating or cooling load, current operating state, etc.), fault indications, or other types of information that characterize the performance of the building equipment.

Process 1000 is shown to include estimating an efficiency and reliability of the building equipment as a function of the equipment performance information (step 1006). In some embodiments, step 1006 is performed by efficiency updater 911 and reliability estimators 924, 926 as described with reference to FIG. 9. Step 1006 can include using the equipment performance information to determine the efficiency η of the building equipment under actual operating conditions. In some embodiments, the efficiency $\eta_i$ represents the ratio of the ideal power consumption $P_{ideal}$ of the building equipment to the actual power consumption $P_{actual}$ of the building equipment, as shown in the following equation:

$$\eta = \frac{P_{ideal}}{P_{actual}}$$

where $P_{ideal}$ is the ideal power consumption of the building equipment as defined by the performance curve for the building equipment and $P_{actual}$ is the actual power consumption of the building equipment. In some embodiments, step 1006 includes using the equipment performance information collected in step 1002 to identify the actual power consumption value $P_{actual}$. Step 1006 can include using the actual power consumption $P_{actual}$ in combination with the ideal power consumption $P_{ideal}$ to calculate the efficiency $\eta$.

Step 1006 can include periodically updating the efficiency $\eta$ to reflect the current operating efficiency of the building equipment. For example, step 1006 can include calculating the efficiency $\eta$ of the building equipment once per day, once per week, once per year, or at any other interval as can be suitable to capture changes in the efficiency $\eta$ over time. Each value of the efficiency $\eta$ can be based on corresponding values of $P_{ideal}$ and $P_{actual}$ at the time the efficiency $\eta$ is calculated. In some embodiments, step 1006 includes updating the efficiency $\eta$ each time the high level optimization process is performed (i.e., each time the objective function J is optimized). The efficiency value calculated in step 1006 can be stored in memory 810 as an initial efficiency value $\eta_0$, where the subscript 0 denotes the value of the efficiency $\eta$ at or before the beginning of the optimization period (e.g., at time step 0).

Step 1006 can include predicting the efficiency $\eta_i$ of the building equipment at each time step i of the optimization period. The initial efficiency $\eta_0$ at the beginning of the optimization period can degrade over time as the building equipment degrade in performance. For example, the efficiency of a chiller can degrade over time as a result of the chilled water tubes becoming dirty and reducing the heat transfer coefficient of the chiller. Similarly, the efficiency of a battery can decrease over time as a result of degradation in the physical or chemical components of the battery. Step 1006 can account for such degradation by incrementally reducing the efficiency $\eta_i$ over the duration of the optimization period.

In some embodiments, the initial efficiency value $\eta_0$ is updated at the beginning of each optimization period. However, the efficiency $\eta$ can degrade during the optimization period such that the initial efficiency value $\eta_0$ becomes increasingly inaccurate over the duration of the optimization period. To account for efficiency degradation during the optimization period, step 1006 can include decreasing the efficiency $\eta$ by a predetermined amount with each successive time step. For example, step 1006 can include defining the efficiency at each time step i=1 . . . h as follows:

$$\eta_i = \eta_{i-1} - \Delta\eta$$

where $\eta_i$ is the efficiency at time step i, is the efficiency at time step i−1, and $\Delta\eta$ is the degradation in efficiency between consecutive time steps. In some embodiments, this definition of $\eta_i$ is applied to each time step for which $B_{main,i}=0$ and $B_{cap,i}=0$. However, if either $B_{main,i}=1$ or $B_{cap,i}=1$, the value of $\eta_i$ can be reset to either $\eta_{main}$ or $\eta_{cap}$ in step 1018.

In some embodiments, the value of $\Delta\eta$ is based on a time series of efficiency values. For example, step 1006 can include recording a time series of the initial efficiency values $\eta_0$, where each of the initial efficiency values $\eta_0$ represents the empirically-calculated efficiency of the building equipment at a particular time. Step 1006 can include examining the time series of initial efficiency values $\eta_0$ to determine the rate at which the efficiency degrades. For example, if the initial efficiency $\eta_0$ at time $t_1$ is $\eta_{0,1}$ and the initial efficiency at time $t_2$ is $\eta_{0,2}$, the rate of efficiency degradation can be calculated as follows:

$$\frac{\Delta\eta}{\Delta t} = \frac{\eta_{0,2} - \eta_{0,1}}{t_2 - t_1}$$

where $$\frac{\Delta\eta}{\Delta t}$$

is the rate of efficiency degradation. Step 1006 can include multiplying $$\frac{\Delta\eta}{\Delta t}$$

by the duration of each time step Otto calculate the value of $\Delta\eta$ $$\left(\text{i.e., } \Delta\eta = \frac{\Delta\eta}{\Delta t} * \Delta t\right).$$

Step 1006 can include estimating the reliability of the building equipment based on the equipment performance information received in step 1004. The reliability can be a statistical measure of the likelihood that the building equipment will continue operating without fault under its current operating conditions. Operating under more strenuous conditions (e.g., high load, high temperatures, etc.) can result in a lower reliability, whereas operating under less strenuous conditions (e.g., low load, moderate temperatures, etc.) can result in a higher reliability. In some embodiments, the reliability is based on an amount of time that has elapsed since the building equipment last received maintenance and/or an amount of time that has elapsed since the building equipment were purchased or installed.

In some embodiments, step 1006 includes using the equipment performance information to identify a current operating state of the building equipment. The current operating state can be examined to expose when the building equipment begin to degrade in performance and/or to predict when faults will occur. In some embodiments, step 1006 includes estimating a likelihood of various types of failures that could potentially occur the building equipment. The likelihood of each failure can be based on the current operating conditions of the building equipment, an amount of time that has elapsed since the building equipment have been installed, and/or an amount of time that has elapsed since maintenance was last performed. In some embodiments, step 1006 includes identifying operating states and predicts the likelihood of various failures using the systems and methods described in U.S. patent application Ser. No. 15/188,824 titled "Building Management System With Predictive Diagnostics" and filed Jun. 21, 2016, the entire disclosure of which is incorporated by reference herein.

In some embodiments, step 1006 includes receiving operating data from building equipment distributed across multiple buildings. The operating data can include, for example, current operating conditions, fault indications, failure times, or other data that characterize the operation and performance of the building equipment. Step 1006 can include using the set of operating data to develop a reliability model for each type of equipment. The reliability models can be used in step 1006 to estimate the reliability of any given device of the building equipment as a function of its current operating conditions and/or other extraneous factors (e.g., time since maintenance was last performed, time since installation or purchase, geographic location, water quality, etc.).

One example of a reliability model which can be used in step 1006 is shown in the following equation:

$$\text{Reliability}_i = f(\text{OpCond}_i, \Delta t_{main,i}, \Delta t_{cap,i})$$

where $\text{Reliability}_i$ is the reliability of the building equipment at time step i, $\text{OpCond}_i$ are the operating conditions at time step i, $\Delta t_{main,i}$ is the amount of time that has elapsed between the time at which maintenance was last performed and time step i, and $\Delta t_{cap,i}$ is the amount of time that has elapsed between the time at which the building equipment were purchased or installed and time step i. Step 1006 can include identifying the current operating conditions $\text{OpCond}_i$ based on the equipment performance information received as a feedback from the building equipment. Operating under more strenuous conditions (e.g., high load, extreme temperatures, etc.) can result in a lower reliability, whereas operating under less strenuous conditions (e.g., low load, moderate temperatures, etc.) can result in a higher reliability.

Still referring to FIG. 10, process 1000 is shown to include predicting an energy consumption of the building equipment over an optimization period as a function of the estimated efficiency (step 1008). In some embodiments, step 1008 is performed by ideal performance calculator 912 and/or power consumption estimator, as described with reference to FIG. 9. Step 1008 can include receiving load predictions $\text{Load}_i$ from load/rate predictor 822 and performance curves from low level optimizer 834. As discussed above, the performance curves can define the ideal power consumption $P_{ideal}$ of the building equipment a function of the heating or cooling load on the device or set of devices. For example, the performance curve for the building equipment can be defined by the following equation:

$$P_{ideal,i} = f(\text{Load}_i)$$

where $P_{ideal,i}$ is the ideal power consumption (e.g., kW) of the building equipment at time step i and $\text{Load}_i$ is the load (e.g., tons cooling, kW heating, etc.) on the building equipment at time step i. The ideal power consumption $P_{ideal,i}$ can represent the power consumption of the building equipment assuming they operate at perfect efficiency. Step 1008 can include using the performance curve for the building equipment to identify the value of $P_{ideal,i}$ that corresponds to the load point $\text{Load}_i$ for the building equipment at each time step of the optimization period.

In some embodiments, step 1008 includes estimating the power consumption $P_{op,i}$ as a function of the ideal power consumption $P_{ideal,i}$ and the efficiency $\eta_i$ of the building equipment. For example, step 1008 can include calculating the power consumption $P_{op,i}$ using the following equation:

$$P_{op,i} = \frac{P_{ideal,i}}{\eta_i}$$

where $P_{ideal,i}$ is the power consumption based on the equipment performance curve for the building equipment at the corresponding load point $\text{Load}_i$, and $\eta_i$ is the operating efficiency of the building equipment at time step i.

Still referring to FIG. 10, process 1000 is shown to include defining a cost $\text{Cost}_{op}$ of operating the building equipment over the optimization period as a function of the predicted energy consumption (step 1010). In some embodiments, step 1010 is performed by operational cost calculator 916, as described with reference to FIG. 9. Step 1010 can include calculating the operational cost during each time step i using the following equation:

$$\text{Cost}_{op,i} = C_{op,i} P_{op,i} \Delta t$$

where $P_{op,i}$ is the predicted power consumption at time step i determined in step 1008, $C_{op,i}$ is the cost per unit of energy at time step i, and $\Delta t$ is the duration of each time step. Step 1010 can include summing the operational costs over the duration of the optimization period as follows:

$$\text{Cost}_{op} = \sum_{i=1}^{h} \text{Cost}_{op,i}$$

where $\text{Cost}_{op}$ is the operational cost term of the objective function J.

In other embodiments, step 1010 can include calculating the operational cost $\text{Cost}_{op}$ by multiplying the cost array $C_{op}$ by the power consumption array $P_{op}$ and the duration of each time step $\Delta t$ as shown in the following equations:

$$\text{Cost}_{op} = C_{op} P_{op} \Delta t$$

$$\text{Cost}_{op} = [C_{op,1} C_{op,2} \ldots C_{op,h}][P_{op,1} P_{op,2} \ldots P_{op,h}]^T \Delta t$$

where the array $C_{op}$ includes an energy cost value $C_{op,i}$ for a particular time step i=1 ... h of the optimization period, the array $P_{op}$ includes a power consumption value $P_{op,i}$ for a particular time step i=1 ... h of the optimization period.

Still referring to FIG. 10, process 1000 is shown to include defining a cost of performing maintenance on the building equipment over the optimization period as a function of the estimated reliability (step 1012). Step 1012 can be performed by maintenance cost predictor 920, as described with reference to FIG. 9. Step 1012 can include using the estimated reliability of the building equipment over the duration of the optimization period to determine the probability that the building equipment will require maintenance and/or replacement at each time step of the optimization period. In some embodiments, step 1012 includes comparing the probability that the building equipment will require maintenance at a given time step to a critical value. Step 1012 can include setting the value of $B_{main,i}=1$ in response to a determination that the probability that the building equipment will require maintenance at time step i exceeds the critical value. Similarly, step 1012 can include comparing the probability that the building equipment will require replacement at a given time step to a critical value. Step 1012 can include setting the value of $B_{cap,i}=1$ in response to a determination that the probability that the building equipment will require replacement at time step i exceeds the critical value.

Step 1012 can include determining the costs $C_{main,i}$ associated with performing various types of maintenance on the building equipment. Step 1012 can include receiving a set of maintenance costs from an external system or device (e.g., a database, a user device, etc.). In some embodiments, the maintenance costs define the economic cost (e.g., $) of performing various types of maintenance. Each type of maintenance activity can have a different economic cost associated therewith. For example, the maintenance activity of changing the oil in a chiller compressor can incur a relatively small economic cost, whereas the maintenance activity of completely disassembling the chiller and cleaning all of the chilled water tubes can incur a significantly larger economic cost. Step 1012 can include using the maintenance costs to define the values of $C_{main,i}$ in objective function J.

Step 1012 can include estimating the maintenance cost of the building equipment over the duration of the optimization period. In some embodiments, step 1012 includes calculating the maintenance cost during each time step i using the following equation:

$$Cost_{main,i} = C_{main,i} B_{main,i}$$

where $C_{main,i}$ is an array of maintenance costs including an element for each of the m different types of maintenance activities that can be performed at time step i and $B_{main,i}$ is an array of binary decision variables indicating whether each of the m maintenance activities will be performed at time step i. Step 1012 can include summing the maintenance costs over the duration of the optimization period as follows:

$$Cost_{main} = \sum_{i=1}^{h} Cost_{main,i}$$

where $Cost_{main}$ is the maintenance cost term of the objective function J.

In other embodiments, step 1012 includes estimating the maintenance cost $Cost_{main}$ by multiplying the maintenance cost array $C_{main}$ by the matrix of binary decision variables $B_{main}$ as shown in the following equations:

$$Cost_{main} = C_{main} B_{main}$$

$$Cost_{main} = \begin{bmatrix} C_{main,1} & C_{main,2} & \ldots & C_{main,m} \end{bmatrix} \begin{bmatrix} B_{main,1,1} & B_{main,1,2} & \ldots & B_{main,1,h} \\ B_{main,2,1} & B_{main,2,2} & \ldots & B_{main,2,h} \\ \vdots & \vdots & \ddots & \vdots \\ B_{main,m,1} & B_{main,m,2} & \ldots & B_{main,m,h} \end{bmatrix}$$

where each element of the array $C_{main}$ includes a maintenance cost value $C_{main,j}$ for a particular maintenance activity j=1 . . . m and each element of the matrix $B_{main}$ includes a binary decision variable for a particular maintenance activity j=1 . . . m at a particular time step i=1 . . . h of the optimization period.

Still referring to FIG. 10, process 1000 is shown to include defining a cost $Cost_{cap}$ of purchasing or replacing the building equipment over the optimization period as a function of the estimated reliability (step 1014). Step 1014 can be performed by capital cost predictor 930, as described with reference to FIG. 9. In some embodiments, step 1014 includes using the estimated reliability of the building equipment over the duration of the optimization period to determine the probability that new devices of the building equipment will be purchased at each time step of the optimization period. In some embodiments, step 1014 includes comparing the probability that new devices of the building equipment will be purchased at a given time step to a critical value. Step 1014 can include setting the value of $B_{cap,i}=1$ in response to a determination that the probability that the building equipment will be purchased at time step i exceeds the critical value.

Step 1014 can include determining the costs $C_{cap,i}$ associated with various capital purchases (i.e., purchasing one or more new devices of the building equipment). Step 1014 can include receiving a set of capital costs from an external system or device (e.g., a database, a user device, etc.). In some embodiments, the capital costs define the economic cost (e.g., $) of making various capital purchases. Each type of capital purchase can have a different economic cost associated therewith. For example, purchasing a new temperature sensor can incur a relatively small economic cost, whereas purchasing a new chiller can incur a significantly larger economic cost. Step 1014 can include using the purchase costs to define the values of $C_{cap,i}$ in objective function J.

Some capital purchases can be more expensive than other. However, different types of capital purchases can result in different levels of improvement to the efficiency η and/or the reliability of the building equipment. For example, purchasing a new sensor to replace an existing sensor can result in a minor improvement in efficiency η and/or a minor improvement in reliability, whereas purchasing a new chiller and control system can result in a significantly greater improvement to the efficiency η and/or the reliability of the building equipment. Accordingly, multiple different levels of post-purchase efficiency (i.e., $η_{cap}$) and post-purchase reliability (i.e., $Reliability_{cap}$) can exist. Each level of $η_{cap}$ and $Reliability_{cap}$ can correspond to a different type of capital purchase.

Step 1014 can include estimating the capital cost of the building equipment over the duration of the optimization period. In some embodiments, step 1014 includes calculating the capital cost during each time step i using the following equation:

$$Cost_{cap,i} = C_{cap,i} B_{cap,i}$$

where $C_{cap,i}$ is an array of capital purchase costs including an element for each of the p different capital purchases that can be made at time step i and $B_{cap,i}$ is an array of binary decision variables indicating whether each of the p capital purchases will be made at time step i. Step 1014 can include summing the capital costs over the duration of the optimization period as follows:

$$Cost_{cap} = \sum_{i=1}^{h} Cost_{cap,i}$$

where $Cost_{cap}$ is the capital cost term of the objective function J.

In other embodiments, step 1014 includes estimating the capital cost $Cost_{cap}$ by multiplying the capital cost array $C_{cap}$ by the matrix of binary decision variables $B_{cap}$ as shown in the following equations:

$$Cost_{cap} = C_{cap} B_{cap}$$

$$Cost_{cap} = \begin{bmatrix} C_{cap,1} & C_{cap,2} & \ldots & C_{cap,p} \end{bmatrix} \begin{bmatrix} B_{cap,1,1} & B_{cap,1,2} & \ldots & B_{cap,1,h} \\ B_{cap,2,1} & B_{cap,2,2} & \ldots & B_{cap,2,h} \\ \vdots & \vdots & \ddots & \vdots \\ B_{cap,p,1} & B_{cap,p,2} & \ldots & B_{cap,p,h} \end{bmatrix}$$

where each element of the array $C_{cap}$ includes a capital cost value $C_{cap,k}$ for a particular capital purchase k=1 . . . p and each element of the matrix $B_{cap}$ includes a binary decision variable for a particular capital purchase k=1 . . . p at a particular time step i=1 . . . h of the optimization period.

Still referring to FIG. 10, process 1000 is shown to include optimizing an objective function including the costs $Cost_{op}$, $Cost_{main}$, and $Cost_{cap}$ to determine an optimal maintenance strategy for the building equipment (step 1016). Step 1016 can include generating the objective function J by summing the operational cost term, the maintenance cost term, and the capital cost term formulated in steps 1010-1014. One example of an objective function which can be generated in step 1016 is shown in the following equation:

$$J = \sum_{i=1}^{h} C_{op,i} P_{op,i} \Delta t + \sum_{i=1}^{h} C_{main,i} B_{main,i} + \sum_{i=1}^{h} C_{cap,i} P_{cap,i}$$

where $C_{op,i}$ is the cost per unit of energy (e.g., $/kWh) consumed by connected equipment 610 at time step i of the optimization period, $P_{op,i}$ is the power consumption (e.g., kW) of connected equipment 610 at time step i, $\Delta t$ is the duration of each time step i, $C_{main,i}$ is the cost of maintenance performed on connected equipment 610 at time step i, $B_{main,i}$ is a binary variable that indicates whether the maintenance is performed, $C_{cap,i}$ is the capital cost of purchasing a new device of connected equipment 610 at time step i, $B_{cap,i}$ is a binary variable that indicates whether the new device is purchased, and h is the duration of the horizon or optimization period over which the optimization is performed.

Another example of an objective function which can be generated in step 1016 is shown in the following equation:

$$J = C_{op} P_{op} \Delta t + C_{main} B_{main} + C_{cap} B_{cap}$$

$$J = [C_{op,1} \; C_{op,2} \; \ldots \; C_{op,h}][P_{op,1} \; P_{op,2} \; \ldots \; P_{op,h}]^T \Delta t +$$

$$[C_{main,1} \; C_{main,2} \; \ldots \; C_{main,m}] \begin{bmatrix} B_{main,1,1} & B_{main,1,2} & \cdots & B_{main,1,h} \\ B_{main,2,1} & B_{main,2,2} & \cdots & B_{main,2,h} \\ \vdots & \vdots & \ddots & \vdots \\ B_{main,m,1} & B_{main,m,2} & \cdots & B_{main,m,h} \end{bmatrix} +$$

$$[C_{cap,1} \; C_{cap,2} \; \ldots \; C_{cap,p}] \begin{bmatrix} B_{cap,1,1} & B_{cap,1,2} & \cdots & B_{cap,1,h} \\ B_{cap,2,1} & B_{cap,2,2} & \cdots & B_{cap,2,h} \\ \vdots & \vdots & \ddots & \vdots \\ B_{cap,p,1} & B_{cap,p,2} & \cdots & B_{cap,p,h} \end{bmatrix}$$

where the array $C_{op}$ includes an energy cost value $C_{op,i}$ for a particular time step i=1 . . . h of the optimization period, the array $P_{op}$ includes a power consumption value $P_{op,i}$ for a particular time step i=1 . . . h of the optimization period, each element of the array $C_{main}$ includes a maintenance cost value $C_{main,j}$ for a particular maintenance activity j=1 . . . m, each element of the matrix $B_{main}$ includes a binary decision variable for a particular maintenance activity j=1 . . . m at a particular time step i=1 . . . h of the optimization period, each element of the array $C_{cap}$ includes a capital cost value $C_{cap,k}$ for a particular capital purchase k=1 . . . p, and each element of the matrix $B_{cap}$ includes a binary decision variable for a particular capital purchase k=1 . . . p at a particular time step i=1 . . . h of the optimization period.

Step 1016 can include imposing constraints on one or more variables or parameters in the objective function J. The constraints can include any of the equations or relationships described with reference to operational cost predictor 910, maintenance cost predictor 920, and capital cost predictor 930. For example, step 1016 can include imposing a constraint which defines the power consumption values $P_{op,i}$ for one or more devices of the building equipment as a function of the ideal power consumption $P_{ideal,i}$ and the efficiency (e.g., $P_{op,i}=P_{ideal,i}/\eta_i$). Step 1016 can include imposing a constraint which defines the efficiency $\eta_i$ as a function of the binary decision variables $B_{main}$ and $B_{cap,i}$, as described with reference to efficiency updater 911 and efficiency degrader 913. Step 1016 can include imposing a constraint which constrains the binary decision variables $B_{main,i}$ and $B_{cap,i}$ to a value of either zero or one and defines the binary decision variables $B_{main,i}$ and $B_{cap,i}$ as a function of the reliability $Reliability_i$ of connected equipment 610, as described with reference to maintenance estimator 922 and purchase estimator 932. Step 1016 can include imposing a constraint which defines the reliability $Reliability_i$ of connected equipment 610 as a function of the equipment performance information (e.g., operating conditions, run hours, etc.) as described with reference to reliability estimators 924 and 934.

Step 1016 can include optimizing the objective function J to determine the optimal values of the binary decision variables $B_{main,i}$ and $B_{cap,i}$ over the duration of the optimization period. Step 1016 can include using any of a variety of optimization techniques to formulate and optimize the objective function J. For example, step 1016 can include using integer programming, mixed integer linear programming, stochastic optimization, convex programming, dynamic programming, or any other optimization technique to formulate the objective function J, define the constraints, and perform the optimization. These and other optimization techniques are known in the art and will not be described in detail here.

In some embodiments, step 1016 includes using mixed integer stochastic optimization to optimize the objective function J. In mixed integer stochastic optimization, some of the variables in the objective function J can be defined as functions of random variables or probabilistic variables. For example, the decision variables $B_{main,i}$ and $B_{cap,i}$ can be defined as binary variables that have probabilistic values based on the reliability of the building equipment. Low reliability values can increase the probability that the binary decision variables $B_{main,i}$ and $B_{cap,i}$ will have a value of one (e.g., $B_{main,i}=1$ and $B_{cap,i}=1$), whereas high reliability values can increase the probability that the binary decision variables $B_{main,i}$ and $B_{cap,i}$ will have a value of zero (e.g., $B_{main,i}=0$ and $B_{cap,i}=0$). In some embodiments, step 1016 includes using a mixed integer stochastic technique to define the values of the binary decision variables $B_{main,i}$ and $B_{cap,i}$ as a probabilistic function of the reliability of the building equipment.

As discussed above, the objective function J can represent the predicted cost of operating, maintaining, and purchasing one or more devices of the building equipment over the duration of the optimization period. In some embodiments, step 1016 includes projecting these costs back to a particular point in time (e.g., the current time) to determine the net present value (NPV) of the one or more devices of the building equipment at a particular point in time. For example, step 1016 can include projecting each of the costs in objective function J back to the current time using the following equation:

$$NPV_{cost} = \sum_{i=1}^{h} \frac{Cost_i}{(1+r)^i}$$

where r is the interest rate, $Cost_i$ is the cost incurred during time step i of the optimization period, and $NPV_{cost}$ is the net present value (i.e., the present cost) of the total costs incurred over the duration of the optimization period. In some embodiments, step 1016 includes optimizing the net present value $NPV_{cost}$ to determine the NPV of the building equipment at a particular point in time.

As discussed above, one or more variables or parameters in the objective function J can be updated dynamically based on closed-loop feedback from the building equipment. For example, the equipment performance information received from the building equipment can be used to update the reliability and/or the efficiency of the building equipment. Step 1016 can include optimizing the objective function J periodically (e.g., once per day, once per week, once per month, etc.) to dynamically update the predicted cost and/or the net present value $NPV_{cost}$ based on the closed-loop feedback from the building equipment.

In some embodiments, step 1016 include generating optimization results. The optimization results can include the optimal values of the decision variables in the objective function J for each time step i in the optimization period. The optimization results include operating decisions, equipment maintenance decisions, and/or equipment purchase decisions for each device of the building equipment. In some embodiments, the optimization results optimize the economic value of operating, maintaining, and purchasing the building equipment over the duration of the optimization period. In some embodiments, the optimization results optimize the net present value of one or more devices of the building equipment at a particular point in time. The optimization results can cause BMS 606 to activate, deactivate, or adjust a setpoint for the building equipment in order to achieve the optimal values of the decision variables specified in the optimization results.

In some embodiments, process 1000 includes using the optimization results to generate equipment purchase and maintenance recommendations. The equipment purchase and maintenance recommendations can be based on the optimal values for the binary decision variables $B_{main,i}$ and $B_{cap,i}$ determined by optimizing the objective function J. For example, a value of $B_{main,25}=1$ for a particular device of the building equipment can indicate that maintenance should be performed on that device at the $25^{th}$ time step of the optimization period, whereas a value of $B_{main,25}=0$ can indicate that the maintenance should not be performed at that time step. Similarly, a value of $B_{cap,25}=1$ can indicate that a new device of the building equipment should be purchased at the $25^{th}$ time step of the optimization period, whereas a value of $B_{cap,25}=0$ can indicate that the new device should not be purchased at that time step.

In some embodiments, the equipment purchase and maintenance recommendations are provided to building 10 (e.g., to BMS 606) and/or to client devices 448. An operator or building owner can use the equipment purchase and maintenance recommendations to assess the costs and benefits of performing maintenance and purchasing new devices. In some embodiments, the equipment purchase and maintenance recommendations are provided to service technicians 620. Service technicians 620 can use the equipment purchase and maintenance recommendations to determine when customers should be contacted to perform service or replace equipment.

Still referring to FIG. 10, process 1000 is shown to include updating the efficiency and the reliability of the building equipment based on the optimal maintenance strategy (step 1018). In some embodiments, step 1018 includes updating the efficiency $\eta_i$ for one or more time steps during the optimization period to account for increases in the efficiency $\eta$ of the building equipment that will result from performing maintenance on the building equipment or purchasing new equipment to replace or supplement one or more devices of the building equipment. The time steps i at which the efficiency $\eta_i$ is updated can correspond to the predicted time steps at which the maintenance will be performed or the equipment will replaced. The predicted time steps at which maintenance will be performed on the building equipment can be defined by the values of the binary decision variables $B_{main,i}$ in the objective function J. Similarly, the predicted time steps at which the building equipment will be replaced can be defined by the values of the binary decision variables $B_{cap,i}$ in the objective function J.

Step 1018 can include resetting the efficiency $\eta_i$ for a given time step i if the binary decision variables $B_{main,i}$ and $B_{cap,i}$ indicate that maintenance will be performed at that time step and/or new equipment will be purchased at that time step (i.e., $B_{main,i}=1$ and/or $B_{cap,i}=1$). For example, if $B_{main,i}=1$, step 1018 can include resetting the value of $\eta_i$ to $\eta_{main}$, where $\eta_{main}$ is the efficiency value that is expected to result from the maintenance performed at time step i. Similarly, if $B_{cap,i}=1$, step 1018 can include resetting the value of $\eta_i$ to $\eta_{cap}$, where $\eta_{cap}$ is the efficiency value that is expected to result from purchasing a new device to supplement or replace one or more devices of the building equipment performed at time step i. Step 1018 can include resetting the efficiency $\eta_i$ for one or more time steps while the optimization is being performed (e.g., with each iteration of the optimization) based on the values of binary decision variables and $B_{cap,i}$.

Step 1018 can include determining the amount of time $\Delta t_{main,i}$ that has elapsed since maintenance was last performed on the building equipment based on the values of the binary decision variables $B_{main,i}$. For each time step i, step 1018 can examine the corresponding values of $B_{main}$ at time step i and each previous time step (e.g., time steps i−1, i−2, . . . , 1). Step 1018 can include calculating the value of $\Delta t_{main,i}$ by subtracting the time at which maintenance was last performed (i.e., the most recent time at which $B_{main,i}=1$) from the time associated with time step i. A long amount of time $\Delta t_{main,i}$ since maintenance was last performed can result in a lower reliability, whereas a short amount of time since maintenance was last performed can result in a higher reliability.

Similarly, step 1018 can include determining the amount of time $\Delta t_{cap,i}$ that has elapsed since the building equipment were purchased or installed based on the values of the binary decision variables $B_{cap,i}$. For each time step i, step 1018 can examine the corresponding values of $B_{cap}$ at time step i and each previous time step (e.g., time steps i−1, i−2, . . . , 1). Step 1018 can include calculating the value of $\Delta t_{cap,i}$ by subtracting the time at which the building equipment were purchased or installed (i.e., the most recent time at which $B_{cap,i}=1$) from the time associated with time step i. A long amount of time $\Delta t_{cap,i}$ since the building equipment were purchased or installed can result in a lower reliability, whereas a short amount of time since the building equipment were purchased or installed can result in a higher reliability Some maintenance activities can be more expensive than other. However, different types of maintenance activities can result in different levels of improvement to the efficiency $\eta$ and/or the reliability of the building equipment. For example, merely changing the oil in a chiller can result in a minor improvement in efficiency $\eta$ and/or a minor improvement in reliability, whereas completely disassembling the chiller and cleaning all of the chilled water tubes can result in a significantly greater improvement to the efficiency $\eta$ and/or the reliability of the building equipment. Accordingly, multiple different levels of post-maintenance efficiency (i.e., $\eta_{main}$) and post-maintenance reliability (i.e., $Reliability_{main}$) can exist. Each level of $\eta_{main}$ and $Reliability_{main}$ can correspond to a different type of maintenance activity.

In some embodiments, step 1018 includes identifying the maintenance activity associated with each binary decision variable $B_{main,j,i}$ and resets the efficiency η to the corresponding post-maintenance efficiency level $\eta_{main,j}$ if $B_{main,j,i}=1$. Similarly, step 1018 can include identifying the maintenance activity associated with each binary decision variable $B_{main,i}$ and can reset the reliability to the corresponding post-maintenance reliability level Reliability$_{main,j}$ if $B_{main,j,i}=1$.

Some capital purchases can be more expensive than other. However, different types of capital purchases can result in different levels of improvement to the efficiency η and/or the reliability of the building equipment. For example, purchasing a new sensor to replace an existing sensor can result in a minor improvement in efficiency η and/or a minor improvement in reliability, whereas purchasing a new chiller and control system can result in a significantly greater improvement to the efficiency η and/or the reliability of the building equipment. Accordingly, multiple different levels of post-purchase efficiency (i.e., $\eta_{cap}$) and post-purchase reliability (i.e., Reliability$_{cap}$) can exist. Each level of $\eta_{cap}$ and Reliability$_{cap}$ can correspond to a different type of capital purchase.

In some embodiments, step 1018 includes identifying the capital purchase associated with each binary decision variable $B_{main,k,i}$ and resetting the efficiency η to the corresponding post-purchase efficiency level $\eta_{cap,k}$ if $B_{cap,k,i}=1$. Similarly, step 1018 can include identifying the capital purchase associated with each binary decision variable $B_{cap,k,i}$ and can resetting the reliability to the corresponding post-purchase reliability level Reliability$_{cap,k}$ if $B_{main,k,i}=1$.

Model Predictive Maintenance with Automatic Service Work Order Generation

Referring generally to FIGS. 8 and 11-15, systems and methods for model predictive maintenance with automatic service work order generation are shown, according to various exemplary embodiments. In some embodiments, a service work order is generated due to maintenance, replacement, and/or purchase of equipment being required in a building management system (BMS) such as the BMS that serves HVAC system 100. Throughout this disclosure, the terms "equipment service" and/or "service of equipment" are used to refer generally to any actions performed as a result of the decisions generated by MPM system 602 including, for example, maintenance, replacement, and/or purchase of equipment. In some embodiments, model predictive maintenance (MPM) system 602 is configured to predict when service of equipment is required and have a service work order generated based on the prediction. In some embodiments, MPM system 602 is configured to detect unexpected failure of equipment and have a service work order generated based on the detection.

In some embodiments, model predictive maintenance system 602 is configured to operate either in an automatic mode or an advisory mode. In some embodiments, the advisory mode is an operational mode such that a user is required to give feedback and/or approval on one or more service providers that can provide the required service of equipment. After the user approves a service provider to perform the required service of equipment, the service of equipment can be scheduled and then performed. In some embodiments, the automatic mode is an operational mode such that a user is not required to give any feedback and/or approval on one or more service providers. In automatic mode, equipment service can be scheduled with little or no input from the user, which can reduce the amount of time the user needs to spend on equipment service.

Figure 11:
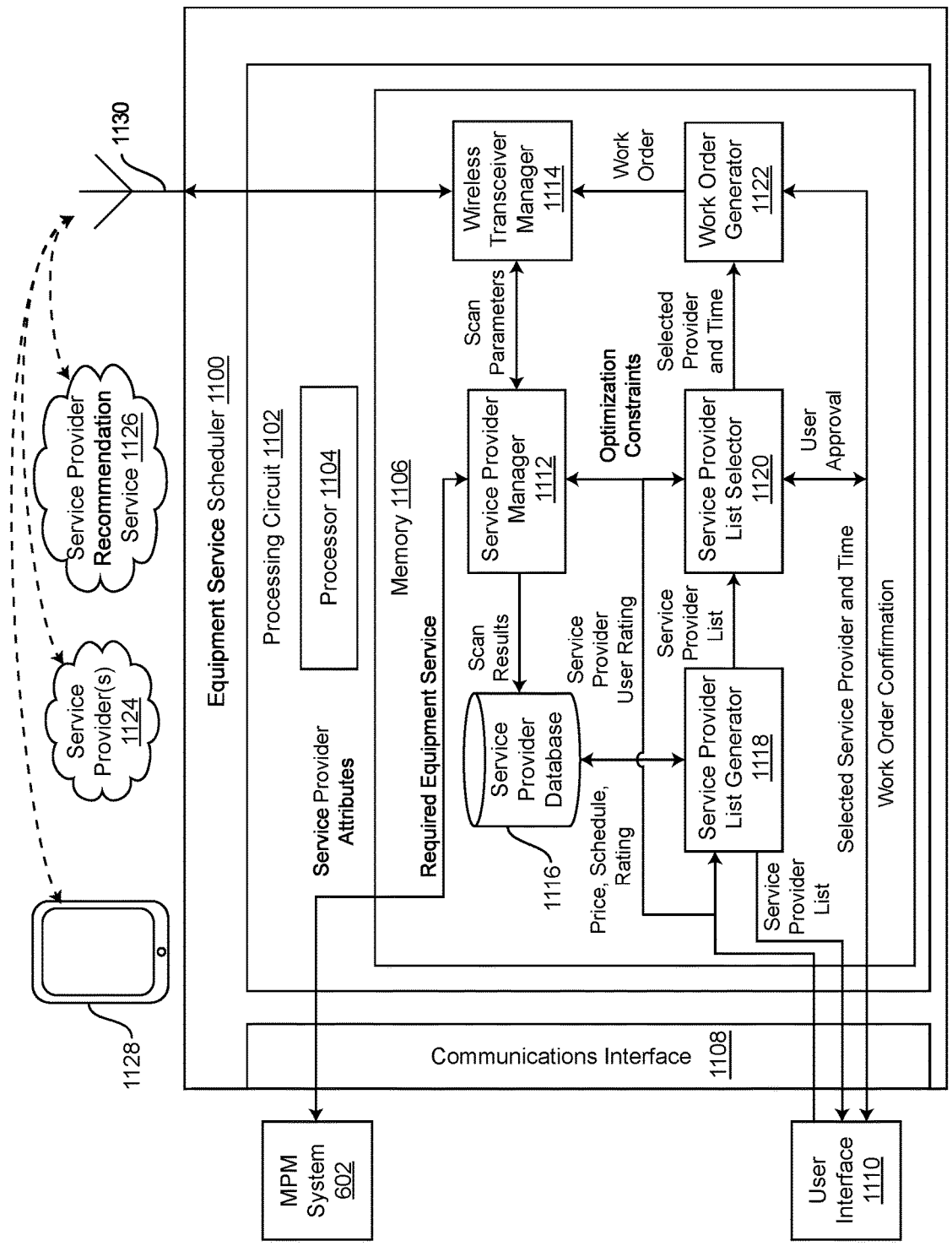
FIG. 11 is a block diagram illustrating the maintenance scheduler of FIG. 8, according to an exemplary embodiment.

Referring particularly to FIG. 11, equipment service scheduler 1100 is shown in greater detail, according to some embodiments. In some embodiments, MPM system 602 incorporates some of and/or all of the functionality of equipment service scheduler 1100 as described herein. In some embodiments, equipment service scheduler 1100 is a local controller (e.g., on-site). In some embodiments, equipment service scheduler 1100 is a remote controller (e.g., off-site). In some embodiments, MPM system 602 is local (e.g., on-site) to building management system (BMS) 606 described with reference to FIG. 8 to which MPM system 602 provides optimization results. In some embodiments, MPM system 602 is remote (e.g., off-site) from BMS 606. In some embodiments, equipment service scheduler 1100 is configured to provide service provider information and/or service provider recommendations to MPM system 602 described with reference to FIG. 8. A service provider can be required when an equipment in MPM system 602 requires equipment service. Types of equipment service can include, for example, replacement of equipment (e.g., a capital purchase as described in greater detail with reference to FIG. 10), repair of equipment parts, and reconfiguring settings of the equipment. In order to reduce an overall cost of equipment service over an optimization period, equipment service scheduler 1100 can be configured to select a service provider from one or more service providers based on the service provider information. Once a service provider is selected, a service work order can be automatically generated, equipment service can be scheduled and performed, and a user can be charged for the equipment service.

Equipment service scheduler 1100 is shown to include a processing circuit 1102. In some embodiments, processing circuit 1102 includes a processor 1104 and/or a memory 1106. Processor 1104 can be implemented as a general-purpose processor, an application specific integrated circuit (ASIC), one or more field programmable gate arrays (FPGAs), a group of processing components, or other suitable electronic processing components.

Memory 1106 can include one or more devices (e.g., memory units, memory devices, storage devices, etc.) for storing data and/or computer code for completing and/or facilitating the various processes described in the present disclosure. Memory 1106 can include random access memory (RAM), read-only memory (ROM), hard drive storage, temporary storage, non-volatile memory, flash memory, optical memory, or any other suitable memory for storing software objects and/or computer instructions. Memory 1106 can include database components, object code components, script components, or any other type of information structure for supporting the various activities and information structures described in the present disclosure. Memory 1106 can be communicably connected to processor 1104 via processing circuit 1102 and can include computer code for executing (e.g., by processor 1104) one or more processes described herein.

Still referring to FIG. 11, equipment service scheduler 1100 is shown to include a communications interface 1108. In some embodiments, communications interface 1108 includes wired or wireless interfaces (e.g., jacks, antennas, transmitters, receivers, transceivers, wire terminals, etc.) for conducting data communications with various systems, devices, or networks. For example, communications interface 1108 can include an Ethernet card and port for sending and receiving data via an Ethernet-based communications network and/or a WiFi transceiver for communicating via a wireless communications network. In some embodiments, communications interface 1108 is be configured to communicate via local area networks or wide area networks (e.g., the Internet, a building WAN, etc.) and can use a variety of communications protocols (e.g., BACnet, IP, LON, etc.).

In some embodiments, communications interface 1108 is be a network interface configured to facilitate electronic data communications between equipment service scheduler 1100 and various external systems or devices (e.g., MPM system 602, a service provider recommendation service 1126, a user interface 1110, a service provider(s) 1124, a mobile device 1128, etc.). For example, equipment service scheduler 1100 can receive information from service provider recommendation service 1126 (e.g., Facebook, Better Business Bureau (BBB), Angie's List, Yelp, etc.) regarding service provider attributes of various service providers via communications interface 1108. The service provider attributes provided by service provider recommendation service 1126 can include, for example, a service provider rating, a service provider specialty, service provider availability, and a service provider cost. Similarly, for example, equipment service scheduler 1100 can receive information regarding required equipment service from MPM system 602 via communications interface 1108. In some embodiments, a wireless transceiver manager 1114 controls operation of communications interface 1108. In some embodiments, communications interface 1108 utilizes a wireless transceiver 1130 to facilitate the electronic data communications. In some embodiments, wireless transceiver 1130 facilitates wireless data communication as required by wireless transceiver manager 1114. In some embodiments, communications interface 1108 facilitates wired data communication (e.g., Ethernet).

Still referring to FIG. 11, memory 1106 is shown to include a service provider manager 1112. In some embodiments, service provider manager 1112 is configured to receive required equipment service information via communications interface 1108 as determined and provided by MPM system 602. Required equipment service information can include information about, for example, a required type of equipment service, a device that requires service, and when equipment service needs to be performed. Service provider manager 1112 can communicate service provider attributes to MPM system 602 via communications interface 1108 once one or more possible service providers are determined for a required equipment service. In some embodiments, after receiving the service provider attributes, MPM system 602 determines one or more optimization constraints via optimization of objective function J, such that the optimization constraints constrain the possible service providers that can be selected to perform the required equipment service. In some embodiments, MPM system 602 can iteratively perform an optimization and/or calculation for each of the possible service providers given service provider attributes of each service provider (e.g., availability, pricing, etc.). In some embodiments, the determination of the one or more optimization constraints is further explained with reference to FIG. 12.

In some embodiments, service provider manager 1112 can be configured to communicate one or more scan parameters to a wireless transceiver manager 1114. In some embodiments, the one or more scan parameters include information regarding how one or more external services should be searched to find one or more service providers. For example, a scan parameter can be a list of what websites to gather service provider ratings from (e.g., BBB, Yelp, etc.), one or more specialties a service provider can have, or a minimum rating of a service provider to search for. In response to receiving the one or more scan parameters, wireless transceiver manager 1114 can be configured to execute a scan of service provider recommendation service 1126 via communications interface 1108. Service provider recommendation service 1126 can be, for example, an external website, a list of service providers previously used by in a BMS, etc. In some embodiments, service provider recommendation service 1126 includes a service provider that provides information regarding themselves. In some embodiments, service provider recommendation service 1126 includes one or more service provider recommendation services. In some embodiments, wireless transceiver manager 1114 communicates scan results of the scan to service provider manager 1112.

In some embodiments, BMS 606, controlled by MPM system 602 as described with reference to FIG. 8, has an internal service provider used to perform some and/or all equipment servicing. In some embodiments, where the internal service provider is used, service provider recommendation service 1126 does not need to be queried, and instead, only a few service provider attributes of the internal service provider need to be determined (e.g., availability of the internal service provider). In some embodiments, if the internal service provider is used, equipment service scheduler 1100 does not communicate with any external services.

In some embodiments, wireless transceiver manager 1114 communicates scan results to service provider manager 1112. Based on the scan results received from wireless transceiver manager 1114, service provider manager 1112 can compile and/or analyze the scan results to discern any information that is determined to be important for selecting a service provider. Service provider manager 1112 can communicate compiled scan results to service provider database 1116. In some embodiments, service provider database 1116 is configured, upon reception of the compiled scan results, to store the compiled scan results. By storing the compiled scan results, service provider database 1116 can later query the compiled scan results without requiring another query of service provider recommendation service 1126 by wireless transceiver manager 1114, according to some embodiments. In some embodiments, by reducing the amount of external queries for information regarding service providers, the overall operating and processing efficiency of equipment service scheduler 1100 is increased.

Still referring to FIG. 11, after service provider manager 1112 receives information regarding a required equipment service from MPM system 602 via communications interface 1108, service provider manager 1112 can communicate to a service provider list generator 1118 that a service provider list should be generated. In some embodiments, the communication between service provider manager 1112 and service provider list generator 1118 occurs after wireless transceiver manager 1114 queries service provider recommendation service 1126 and scan results are stored in service provider database 1116. If relevant scan results already exist in service provider database 1116, service provider manager 1112 can immediately communicate with service provider list generator 1118 upon reception of the information regarding required service from MPM system 602.

After service provider list generator 1118 receives communication that a service provider list should be generated, service provider list generator 1118 can receive service provider information from service provider database 1116 based on previous scan results. The service provider information can include, for example, service provider pricing, a service provider schedule, and a service provider rating. Based on the received service provider information, service provider list generator 1118 can generate the service provider list including some and/or all of the service providers indicated by the service provider information. In some embodiments, the service provider list includes service provider attributes describing each of the service providers. The service provider attributes can include, for example, availability within a future time period, pricing, service provider specialties, and service provider ratings.

In some embodiments, the service provider list generated by service provider list generator 1118 does not include any service providers. For example, an optimization performed by MPM system 602 may have no knowledge of service provider availability. If no knowledge of service provider availability exists, the service provider list may not include any service providers if none are available during times in which equipment service should be performed as indicated by MPM system 602. If the service provider list is determined to not include any service providers, MPM system 602 may be required to generate an updated schedule for equipment services based on said determination.

In some embodiments, after service provider list generator 1118 generates the service provider list, service provider list generator 1118 communicates the service provider list to user interface 1110 via communications interface 1108 if equipment service scheduler 1100 is operating in advisory mode. User interface 1110 can include, for example, one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with equipment service scheduler 1100. In some embodiments, user interface 1110 is a computer workstation, a client terminal, a remote or local interface, or any other type of user interface device. In some embodiments, user interface 1110 is a stationary terminal or a mobile device. For example, user interface 1110 is a desktop computer, a computer server with a user interface, a laptop computer, a tablet, a smartphone, a PDA, a thermostat, or any other type of mobile or non-mobile device.

Based on the service provider list, a user operating user interface 1110 can provide one or more service provider user ratings of one or more of the service providers in the service provider list. According to various embodiments, the user is required to provide a service provider user rating for all, some, or none of the service providers in the service provider list. In some embodiments, a number of service providers in the service provider list that the user is required to provide a service provider user rating on are determined by service provider manager 1112. In some embodiments, one or more service provider user ratings are then communicated to service provider list generator 1118. In some embodiments, the one or more service provider user ratings are also communicated to service provider manager 1112 and/or a service provider list selector 1120 to be used to identify user preferences. Based on the one or more service provider user ratings, service provider list generator 1118 can remove one or more service providers from the service provider list. For example, if a user provides a service provider user rating of 0 out of 5 for a service provider A, the service provider A can be removed from the service provider list by service provider list generator 1118. In some embodiments, after an equipment service has been performed, user interface 1110 prompts the user to provide a post-service user rating. In some embodiments, the post-service user rating is used for future equipment servicing needs. For example, if a user provides a post-service user rating of 5 out of 5 for a service provider B, the service provider B can be prioritized for future equipment servicing.

In some embodiments, when equipment service scheduler 1100 is operating in automatic mode, the service provider list generated by service provider list generator 1118 is not communicated to user interface 1110. In some embodiments, if equipment service scheduler 1100 is operating in automatic mode, the service provider list generated by service provider list generator 1118 is communicated to user interface 1110, but makes a decision automatically without waiting for user input. In some embodiments, when operating in automatic mode, the user is not required to have significant interaction with equipment service scheduler 1100. In some embodiments, when operating in automatic mode, equipment service scheduler 1100 makes some and/or all decisions related to selecting a service provider. In some embodiments, by operating in automatic mode, equipment service scheduler 1100 facilitates a more autonomous equipment service scheduling system that reduces the need for a user to manually schedule equipment service. By facilitating an autonomous equipment service scheduling system, various problems can be avoided such as, for example, a user forgetting to approve an equipment service, a user selecting a less than optimal equipment service time and/or service provider, and consuming a user's time to schedule equipment service that can be otherwise used for more pressing matters. In some embodiments, equipment service scheduler 1100 receives a switch command from a user via user interface 1110 that indicates equipment service scheduler 1100 should switch from automatic mode to advisory mode or from advisory mode to automatic mode. In some embodiments, if equipment service scheduler 1100 is operating in advisory mode, equipment service scheduler 1100 provides reminders to a user to schedule equipment service via user interface 1110.

In some embodiments, after the service provider list is set (e.g., after a user provides service provider user ratings which can be applied to the service provider list or immediately after the service provider list is generated), service provider list generator 1118 communicates the service provider list to service provider list selector 1120. In some embodiments, service provider list selector 1120 is configured to select a service provider and an associated equipment service time from the service provider list. In some embodiments, a user provides one or more optimization constraints to service provider list selector 1120 via user interface 1110. An optimization constraint can include, for example, a minimum required rating of a service provider, a maximum cost threshold, a required availability date, and a required service provider specialty. In some embodiments, service provider list selector 1120 accesses a calendar of a user to determine an optimization constraint of an appropriate time equipment service can take place based on availability of the user. In general, the one or more optimization constraints can help optimize equipment service costs over an optimization period as determined by high level optimizer 832 described with reference to FIG. 12.

Based on the one or more optimization constraints, service provider list selector 1120 can select a service provider from the service provider list that best fits the optimization constraints and/or the service provider user ratings. For example, consider the one or more optimization constraints include constraints of a service provider costing under $100 and the service provider must be available within 3 days. Further consider a service provider A available within 2 days that costs $50 and a service provider B that costs $150 and is available in 4 days. Based on the optimization constraints, service provider list selector 1120 can select service provider A because service provider A adheres to all optimization constraints.

In some embodiments, each of the one or more optimization constraints has a constraint weight. A constraint weight can indicate how important the optimization constraint is as determined by service provider manager 1112 and/or as assigned by a user via user interface 1110. In some embodiments, the constraint weights help service provider list selector 1120 to better select a service provider. In general, service provider list selector 1120 can determine a service provider score for each service provider by the following equation:

$$Score_{sp} = \sum_{i=1}^{n} w_i \times B_i$$

where $Score_{sp}$ is the service provider score for a service provider, n is a total number of service provider attributes, $w_i$ is a weight for an $i^{th}$ service provider attributes, and $B_i$ is a binary decision variable (e.g., 0 or 1) of an array of binary decision variables B that indicates whether service provider attribute i meets an optimization constraint for the service provider attribute i. In general, B can have the following form:

$$B = \begin{bmatrix} B_1 \\ B_2 \\ \vdots \\ B_n \end{bmatrix}$$

where $B_1$ is a binary decision variable for service provider attribute 1, $B_2$ is a binary decision variable for service provider attribute 2, and $B_n$ is a binary decision variable for service provider attribute n. For example, if an optimization constraint indicates a service provider price should not exceed $1,000, $B_i=1$ can indicate the service provider price of the service provider is less than or equal to $1,000, and $B_i=0$ can indicate the service provider price of the service provider exceeds $1,000. For an example of utilizing the $Score_{sp}$ equation, consider the one or more optimization constraints to include a cost constraint of a service provider costing under $100 and a service provider availability constraint indicating the service provider must be available within 3 days, and such that the service provider availability constraint has a constraint weight of 0.75 and the cost constraint has a constraint weight of 0.25. Further consider a service provider A which costs $75 and is available within 5 days and a service provider B that costs $125 and is available in 2 days. In this example, both the service provider A and the service provider B meet one constraint, but fail to meet the other. However, service provider list selector 1120 can still select the service provider B, as the service provider B has a service provider score of 0.75 while service provider A has a service provider score of 0.25 as determined by the $Score_{sp}$ equation.

In some embodiments, no optimization constraints are communicated to service provider list selector 1120. If no optimization constraints are communicated to service provider list selector 1120, service provider list selector 1120 can select a service provider based on a highest service provider score calculated by the $Score_{sp}$ equation where all binary decision variables in B are 1. In some embodiments, two or more service providers have a same highest service provider score. In some embodiments, when two or more service provider have the same highest service provider score, service provider list selector 1120 uses a tiebreaker score to determine which service provider should be selected. For example, a tiebreaker score can be how many times the service provider has been selected before, a service provider rating, and a lowest service provider cost.

In some embodiments, after service provider list selector 1120 selects a service provider and the associated service time and equipment service scheduler 1100 is operating in advisory mode, an equipment service appointment is generated and a notification is communicated to user interface 1110 via communications interface 1108 such that the user is prompted to approve the equipment service appointment. In some embodiments, the equipment service appointment includes the selected service provider and the associated service time. In some embodiments, the user rejects the equipment service appointment. For example, the user may reject the equipment service appointment because the associated time is during a meeting the user is required to attend. In some embodiments, if equipment service appointment is rejected by the user, service provider list selector 1120 selects a next best service provider and associated next best equipment service time from the service provider list and provide the next best service provider and associated next best equipment service time as a new equipment service appointment to the user for approval. In some embodiments, the user approves the equipment service appointment. In some embodiments, service provider list selector 1120 and/or a work order generator 1122 are configured to receive a user approval message indicating the user approves of the equipment service appointment. When service provider list selector 1120 receives the user approval message, service provider list selector 1120 can communicate the equipment service appointment to work order generator 1122. In some embodiments, rather than a single equipment service appointment being provided to the user to approve, a list of equipment service appointments (i.e., a list including available service providers and appointment times) is provided to the user. In some embodiments, the list includes a service provider score $Score_{sp}$ for each equipment service appointment. Based on the list, the user can select an equipment service appointment. In some embodiments, the list of equipment service appointments provides an indication (e.g., a highlighted cell, a star, a pointer, etc.) of a recommended equipment service appointment.

In some embodiments, after service provider list selector 1120 selects a service provider and the associated service time for an equipment service appointment and equipment service scheduler 1100 is operating in automatic mode, the equipment service appointment (i.e., the selected service provider and the associated service time) is communicated to work order generator 1122. In some embodiments, if equipment service scheduler 1100 is operating in automatic mode, there is minimal communication with a user. The minimal communication with the user can be provide many benefits such as, for example, preventing a non-optimal service provider from being selected, saving the user time, and reducing costs related to equipment servicing. In some embodiments, if operating in automatic mode, service provider list selector 1120 is configured to approve the equipment service appointment itself.

In some embodiments, after work order generator 1122 receives the equipment service appointment, work order generator 1122 generates a service work order. In some embodiments, if equipment service scheduler 1100 is operating in advisory mode, a service work order confirmation is communicated to user interface 1110 via communications interface 1108. In some embodiments, the service work order confirmation serves as an indication to the user that the service work order was successfully generated and/or the required equipment service is scheduled. In some embodiments, if equipment service scheduler 1100 is operating in automatic mode, a service work order is not required to be provided to user interface 1110 via communications interface 1108. In some embodiments, if equipment service scheduler 1100 is operating in automatic mode, a service work order is still provided to user interface 1110 via communications interface 1108 if desired. Work order generator 1122 can also be configured to communicate the service work order to wireless transceiver manager 1114. Based on the service work order, wireless transceiver manager 1114 can be further configured to communicate the service work order via communications interface 1108 to a service provider 1124. Wireless transceiver manager 1114 can also communicate the service work order to a mobile device 1128 of the user and/or to a service provider 1124 to notify them of the service work order. In some embodiments, after service provider 1124 receives the service work order, the required equipment service is performed by service provider 1124 and the user is charged accordingly. The user can be charged, for example, by requiring the user to write a check, by automatically withdrawing from a bank account of the user, a credit transaction, etc.

If the equipment service is completed, the user can set a value marking the service as complete via user interface 1110. For example, the value may be a binary value such that 0 indicates the equipment service is not complete and 1 indicates the equipment service is complete. Based on the value being set to indicate the equipment service is complete, MPM can verify a degradation state estimate of the equipment. If the equipment service is performed correctly, the degradation state estimate of the equipment may improve, indicating the equipment is at a lower state of degradation after the equipment service.

Figure 12:
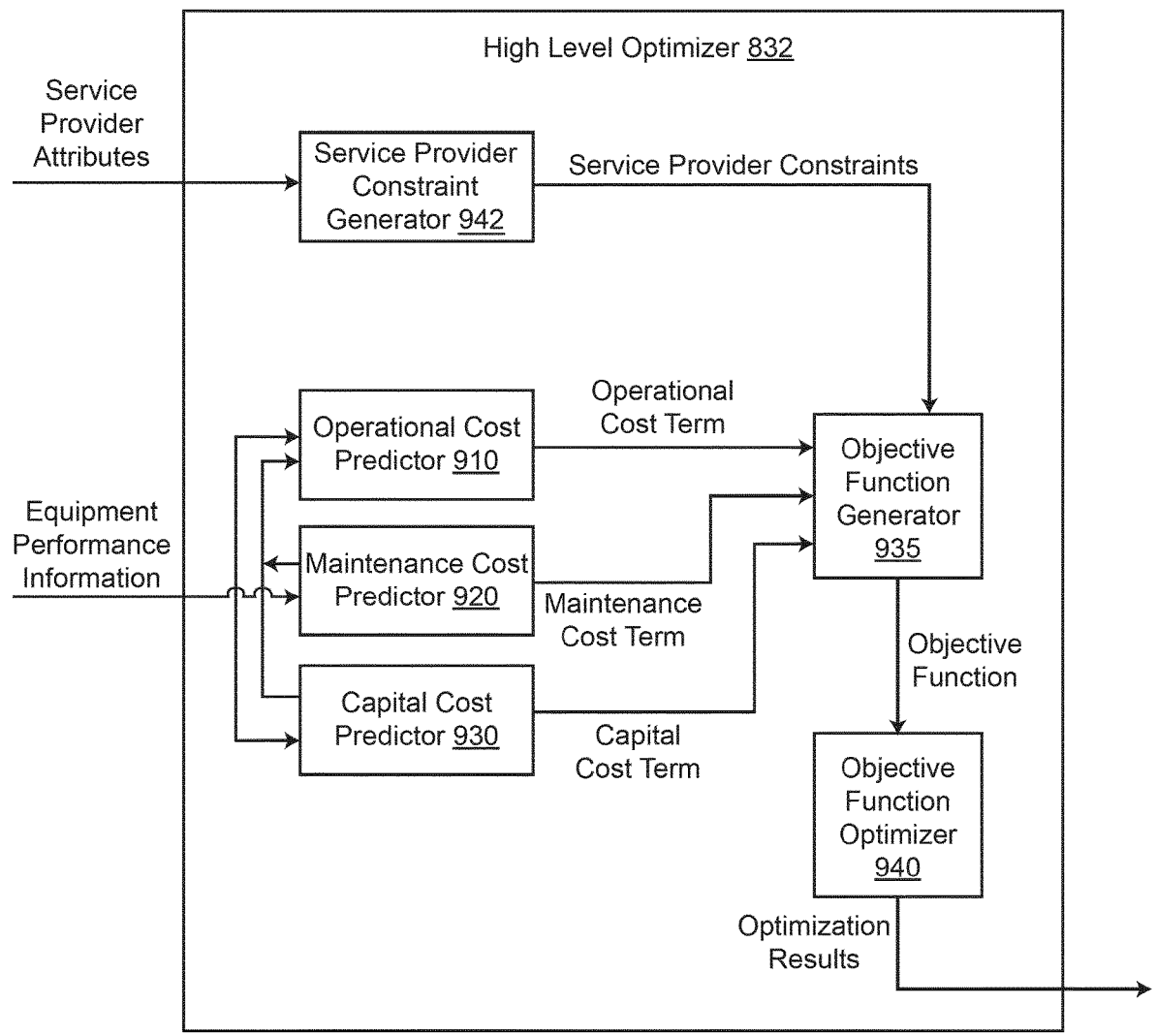
FIG. 12 is a block diagram illustrating the high level optimizer of FIG. 9 with additional constraint generators, according to an exemplary embodiment.

Referring now to FIG. 12, high level optimizer 832 of MPM system 602 is described in greater detail, according to some embodiments. In some embodiments, high level optimizer 832 is similar to and/or the same as high level optimizer 832 as described in greater detail above with reference to FIG. 9.

High level optimizer 832 is shown to include a service provider constraint generator 942. In some embodiments, service provider constraint generator 942 receives one or more service provider attributes as communicated to MPM system 602 from service provider manager 1112 as described with reference to FIG. 11. In some embodiments, the one or more service provider attributes are communicated by equipment service scheduler 1100 described with reference to FIG. 11. In some embodiments, based on the one or more service provider attributes, service provider constraint generator 942 generates one or more service provider constraints to provide to objective function generator 935. The service provider constraints can include constraints indicating, for example, that a service provider costs a certain amount, that a service provider is only available at a certain time, and a rating of the service provider. In some embodiments, based on the one or more service provider constraints along with the operational cost term, maintenance cost term, and capital cost term, objective function generator 935 generates the objective function J. In some embodiments, objective function optimizer 940 optimizes the objective function J while adhering to the service provider constraints. Through optimization of the objective function J, optimal values of decision variables can be determined. In some embodiments, based on the optimal values of the decision variables, one or more required equipment services are generated and communicated to equipment service scheduler 1100. The one or more required equipment services can include information such as, for example, a type of required equipment service (e.g., a particular HVAC unit needs to be replaced) and a required time the equipment service should be completed by. In some embodiments, the required equipment services are generated as to provide guidance to equipment service scheduler 1100 to select optimal and/or near optimal service providers. For example, an optimal equipment service time period can be within 1 day for a second equipment service, however a required equipment service can indicate a time period indicating the equipment service should be performed within 2 days. The additional day indicated by the required equipment service can lead to near optimization of the equipment service schedule while allowing some flexibility in service provider selection.

Figure 13:
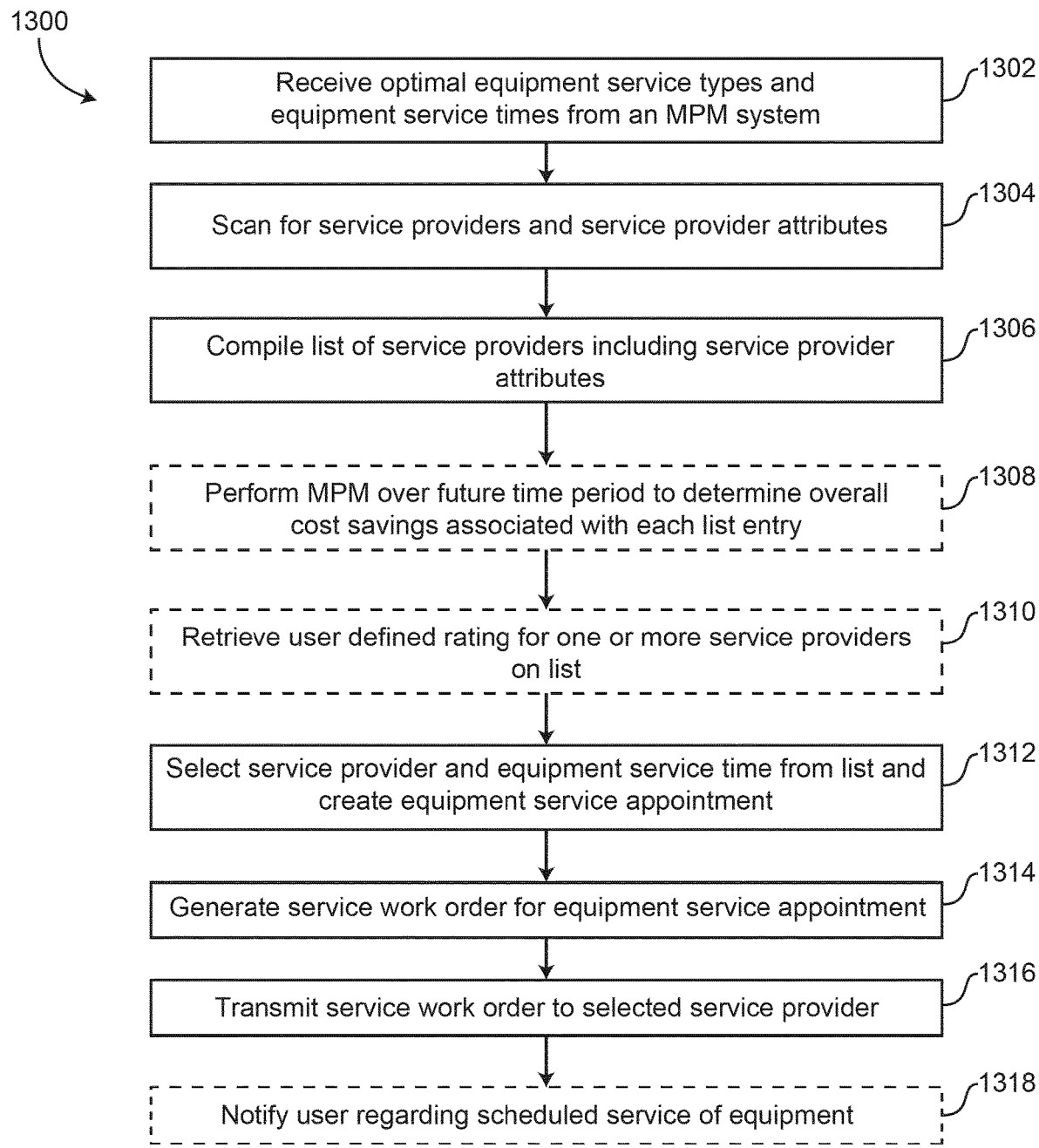
FIG. 13 is a flow diagram of a process for automatically generating a service work order through an MPM system, according to an exemplary embodiment.

Referring now to FIG. 13, a flow diagram of a process 1300 for automatically generating a service work order through MPM system 602 is shown, according to some embodiments. In some embodiments, equipment service scheduler 1100 is configured to perform some and/or all steps of process 1300.

Process 1300 includes receiving optimal equipment service types and equipment service times (i.e. a required equipment service) from an MPM system (e.g., model predictive maintenance (MPM) system 602, step 1302), according to some embodiments. In some embodiments, the optimal equipment service types and equipment service times are generated by MPM system 602 without knowledge of any service providers. In some embodiments, the equipment service types and the equipment service times are generated by MPM system 602 based on degradation states of equipment. In some embodiments, MPM system 602 generates the equipment service types and the equipment service times based on knowledge of one or more service providers. For example, if MPM system 602 knows a preferred service provider A is available to perform equipment service at a time step i, MPM system 602 can generate the equipment service types and equipment service times based on that knowledge. The optimal equipment service times can be generated based on optimization of the objective function J without constraints via objective function optimizer 940 of MPM system 602. In some embodiments, step 1302 is performed by service provider manager 1112 and communications interface 1108.

Process 1300 includes scanning for one or more service providers and one or more service provider attributes that describe the one or more service providers (step 1304), according to some embodiments. In some embodiments, equipment service scheduler 1100 scans service provider recommendation service 1126 and/or service provider database 1116 (described with reference to FIG. 11) for the one or more service providers and the one or more service provider attributes. The service provider attributes can include attributes such as, for example, a service provider availability, a service provider specialty, a service provider cost, and a service provider rating. In some embodiments, step 1304 is performed by wireless transceiver manager 1114. In some embodiments, step 1304 is performed by service provider database 1116.

Process 1300 includes compiling a list of service providers including the one or more service providers and the one or more service provider attributes that describe each service provider as determined in step 1304 (step 1306), according to some embodiments. In some embodiments, the list of service providers includes all of the service providers and the service provider attributes that describe them. In some embodiments, the list of service providers includes only some of the service providers and/or some of the service provider attributes that are considered relevant based on the optimal equipment service types and the equipment service times received in step 1302. For example, the list of service provider may exclude one or more service providers that do not meet a certain criterion (e.g., do not have availabilities at certain times of day, do not have availabilities on certain days of the week, excessive costs, low ratings, etc.). In some embodiments, a lead time is accounted for when determining whether to exclude a service provider. In some embodiments, a lead time indicates an amount of time ahead of an equipment service deadline provided by MPM system 602 that equipment service should be scheduled. For example, if an equipment service takes a week to perform, the lead time may adjust a latest scheduled equipment service time to be at least a week ahead of the equipment service deadline. In some embodiments, if equipment service scheduler 1100 is operating in advisory mode, a longer lead time is set to account for user delay in providing feedback regarding equipment service. In some embodiments, step 1306 is performed by service provider list generator 1118.

Process 1300 includes performing model predictive maintenance over a future time period to determine an overall cost savings associated with each service provider in the list of service providers (optional step 1308), according to some embodiments. In some embodiments, step 1308 helps determine which of the service providers of the list of service providers best optimizes equipment servicing over an optimization period (e.g., which service provider offers maintenance/replacements at a time/date and with a cost that results in a minimum value of objective function J as compared to the value of objective function J that results from using other service providers). In some embodiments, step 1308 is an optional step in process 1300 as model predictive maintenance of each service provider is not always necessary. For example, if a service provider is to be selected exclusively based on how soon they are available to fix a critical failure, it may not be necessary to determine if the service provider optimizes cost over the optimization period with respect to other service provider options. In some embodiments, step 1308 is performed by MPM system 602.

Process 1300 includes retrieving one or more user defined ratings for one or more service providers in the list of service providers (optional step 1310), according to some embodiments. In some embodiments, the one or more user defined ratings are retrieved by directly querying a user for the user defined ratings and/or by retrieving the user defined ratings from a database. In some embodiments, step 1310 is an optional step because retrieving the one or more user defined ratings is not always necessary. For example, a user can elect equipment service scheduler 1100 to be fully automatic, and thus they may not give any input when equipment service scheduler 1100 is selecting a service provider. In some embodiments, step 1310 is performed by service provider list generator 1118, user interface 1110, and communications interface 1108. During step 1310, a user can be prompted by user interface 1110 to provide a user rating for a previously used service provider, such that the user rating can override a rating a service provider may already have.

Process 1300 includes selecting a service provider and an equipment service time from the list of service providers and creating an equipment service appointment based on the selection (step 1312), according to some embodiments. In some embodiments, the selection is made based on the service provider attributes. In some embodiments, the equipment service appointment includes the service provider and the equipment service time selected from the list of service providers. In some embodiments, the selection is made by comparing the optimal equipment service times received in step 1302 to the service provider attributes. In some embodiments, the selection is made based on comparing which service provider provides a largest overall savings cost as determined in step 1308. In some embodiments, the selection is made based on the user defined ratings retrieved in step 1310. In some embodiments, the selection is made based on the service provider score equation $Score_{sp}$ implemented by service provider list selector 1120 for determining which service provider best fits one or more service provider constraints. For example, a service provider A can be selected because a user defined rating can indicate that service provider A should be chosen whenever available due to preference of the user. As another example, a service provider B can be selected based on that service provider B best optimized overall cost over the optimization period. In some embodiments, if an internal service provider is used, only the equipment service times are considered as the internal service provider should always be used to perform the equipment service. In some embodiments, step 1312 is performed by service provider list selector 1120.

Process 1300 includes generating a service work order based on the equipment service appointment generated from the service provider and the equipment service time selected in step 1312 (step 1314), according to some embodiments. The service work order can include information regarding, for example, the service provider, the equipment service time, what equipment service is being performed, a cost of the equipment service, etc. In some embodiments, step 1314 is performed by work order generator 1122.

Process 1300 includes transmitting the service work order generated in step 1314 to the selected service provider (step 1316), according to some embodiments. Once the service work order is transmitted to the selected service provider, the equipment service can be fully scheduled. The service work order can be transmitted to the service provider by, for example, an email, a facsimile, a mobile application, a website notification, an automated phone call, an SMS message, etc. In some embodiments, step 1316 is performed by wireless transceiver manager 1114, service provider(s) 1124, and communications interface 1108.

Process 1300 includes notifying the user regarding the scheduled equipment service (optional step 1318), according to some embodiments. The user can be notified about the scheduled equipment service by, for example, an email, a facsimile, a mobile application, a website notification, etc. In some embodiments, step 1318 is an optional step in process 1300 because a user is not required to be notified about the scheduled equipment service. For example, when equipment service scheduler 1100 is operating in automatic mode, equipment service scheduler 1100 can be configured to not required user input to select and schedule the equipment service. In some embodiments, the user opts in to receiving the notification regarding the scheduled equipment service as to be aware of the scheduling. In some embodiments, step 1318 is performed by work order generator 1122, user interface 1110, and communications interface 1108.

Figure 14:
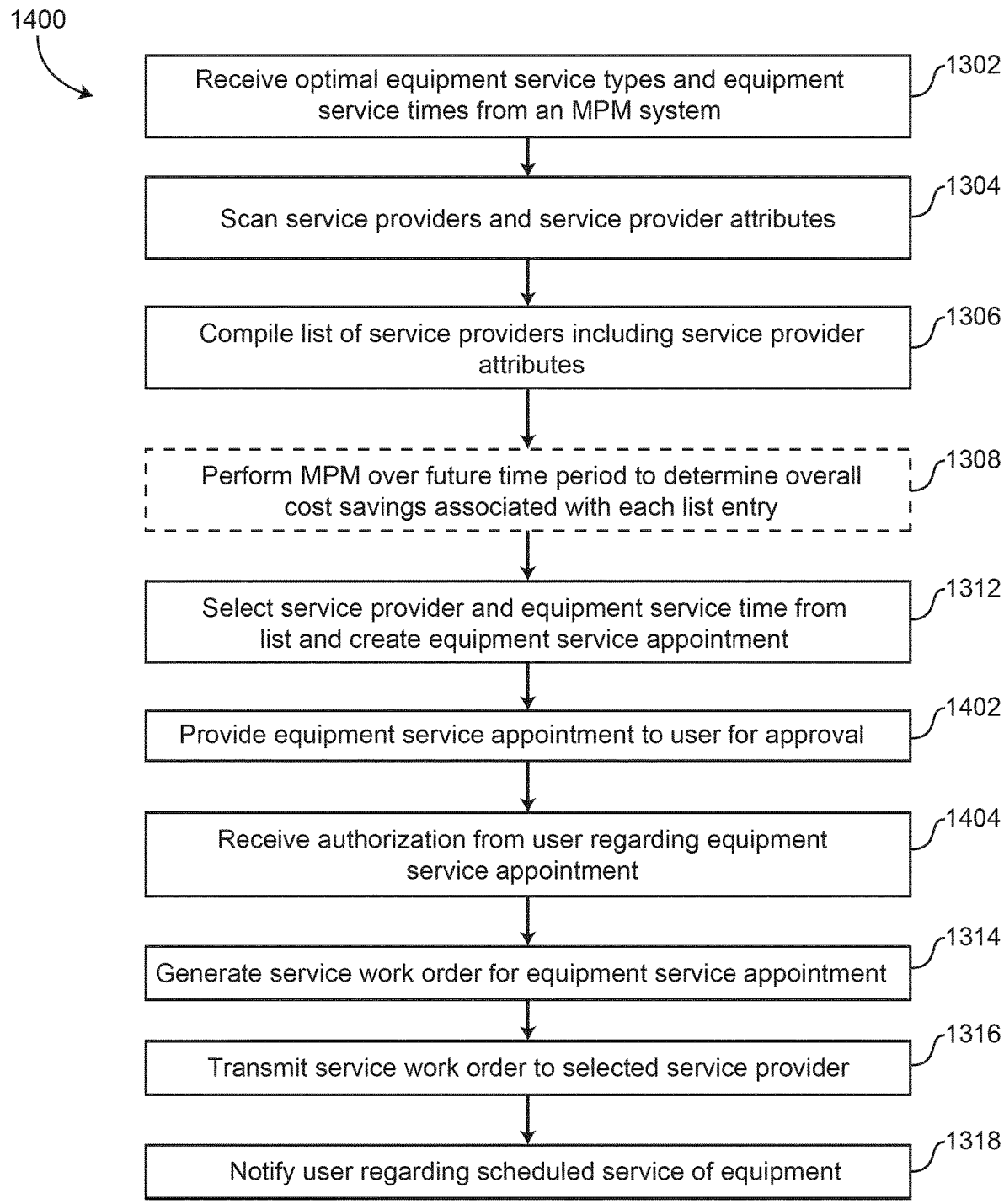
FIG. 14 is a flow diagram of a process for generating a service work order with user verification through an MPM system, according to an exemplary embodiment.

Referring now to FIG. 14, a flow diagram of a process 1400 for generating a service work order with user verification through MPM system 602 is shown, according to some embodiments. In some embodiments, process 1400 is be similar to and/or the same as process 1300 described with reference to FIG. 13. In some embodiments, process 1400 differs from process 1300 in that process 1400 describes a process for operating equipment service scheduler 1100 in automatic mode while process 1300 describes a process for operating equipment service scheduler 1100 in advisory mode. In some embodiments, equipment service scheduler 1100 is configured to perform some and/or all steps of process 1400. In some embodiments, process 1400 requires user verification to generate the service work order because equipment service scheduler 1100 is running in advisory mode.

Process 1400 includes providing the equipment service appointment created in step 1312 to the user for approval (step 1402), according to some embodiments. In some embodiments, the equipment service scheduler 1100 is configured to not schedule the equipment service until a user approves the equipment service appointment. In some embodiments, the user is provided a list of available service providers and appointment times. If the user is provided the list, the user can select a particular service provider and appointment time from the list. Providing the list may provide the user more flexibility for an equipment service as the user can select what a service provider and appointment time that best suits the user's needs. In some embodiments, step 1402 is performed by service provider list selector 1120, communications interface 1108, and user interface 1110.

Process 1400 includes receiving authorization from the user regarding the equipment service appointment (step 1404), according to some embodiments. In some embodiments, the user rejects the equipment service appointment. If the user rejects the equipment service appointment, another service provider and/or another time at which equipment service can be performed can be selected. Based on the new service provider and/or the new time, a new equipment service appointment can be created and provided to the user for authorization. In some embodiments, the equipment service is scheduled in response to user approval. For example, work order generator 1122 may receive the user approval from user interface 1110 and schedule the equipment service in response to receiving the user approval. In some embodiments, if the user is provided a list of available service providers and appointment times, step 1404 includes receiving a selected service provider and selected appointment time from the user. If the user selects the service provider and appointment time, the equipment service appointment can be created based on the selected service provider and appointment time. In some embodiments, step 1404 is performed by service provider list selector 1120, communications interface 1108, and user interface 1110.

Figure 15:
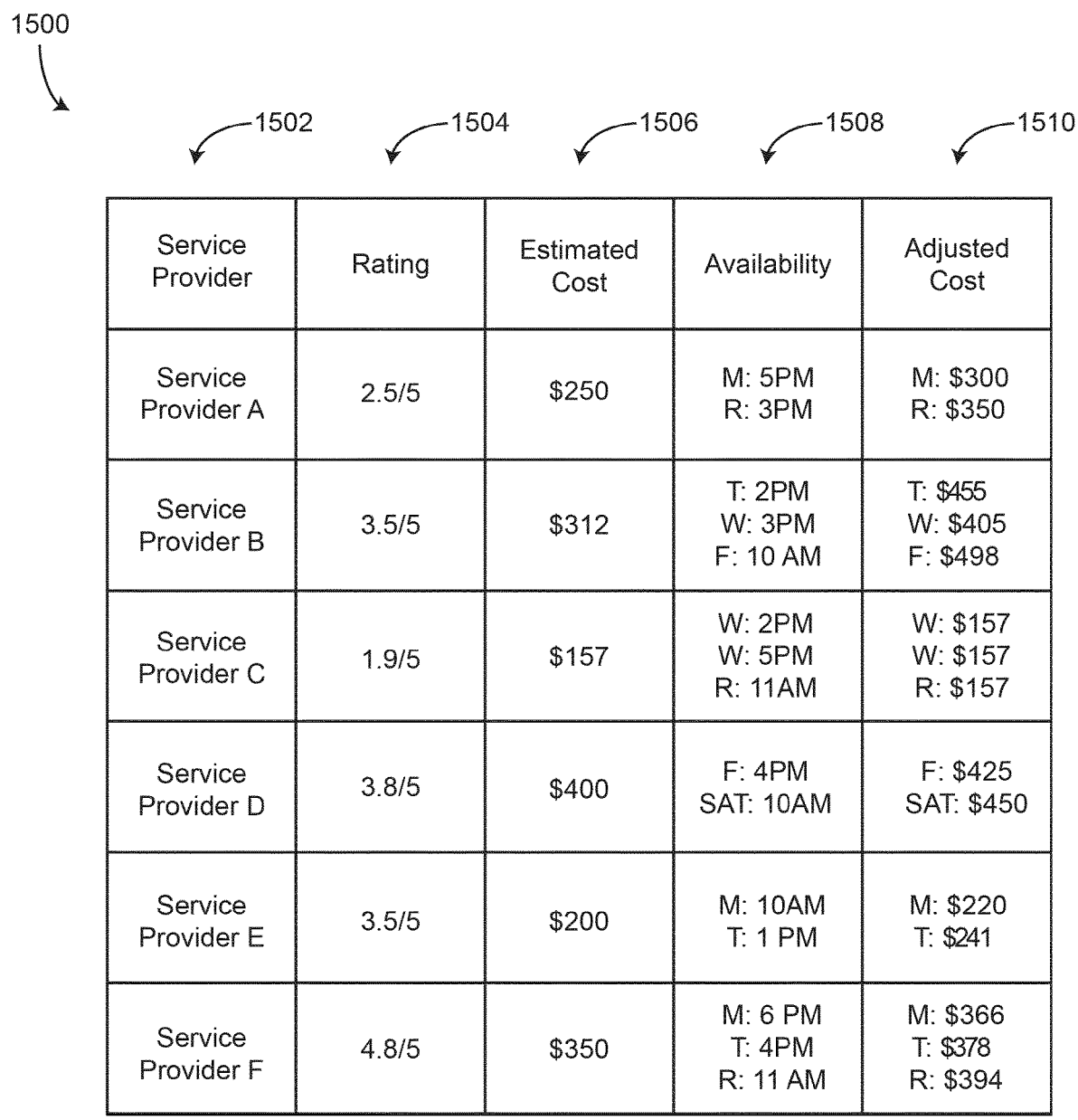
FIG. 15 is a table illustrating service provider attributes that can be considered by a maintenance scheduler when selecting a service provider, according to an exemplary embodiment.

Referring now to FIG. 15, a table 1500 illustrating service provider attributes that can be considered when selecting a service provider for an equipment service is shown, according to some embodiments. Table 1500 illustrates a list of service providers and service provider attributes that can be used to determine an optimal service provider by service provider list selector 1120 and/or be provided to a user via user interface 1110. In some embodiments, the service provider attributes in table 1500 are stored in service provider database 1116 after they have been gathered by wireless transceiver manager 1114 through one or more service provider recommendation service 1126 via wireless transceiver 1130. In some embodiments, service provider recommendation service 1126 includes multiple service provider recommendation services. In some embodiments, one or more service provider attributes are calculated and/or estimated by equipment service scheduler 1100 and/or MI'M system 602.

Table 1500 is shown to include a service provider column 1502. In some embodiments, service provider column 1502 includes one or more service providers stored in service provider database 1116 that are relevant to the equipment service. For example, consider the equipment service is to repair a malfunctioning VRF device. In this case, service provider column 1502 may only include service providers from service provider database 1116 that specialize in VRF systems. In some embodiments, service provider column 1502 includes one or more service providers that are not related to the equipment service, but nonetheless are identified as a service provider to be included based on other service provider attributes. In some embodiments, if a service provider is known to not typically be associated with the equipment service, the service provider has a service provider penalty that is taken into account when selecting a service provider to recommend to a user. For example, if the equipment service is to repair a malfunctioning VRF device and service provider A is known to not typically deal with VRF devices, service provider A may incur a service provider penalty. Thus, even if service provider A is the optimal service provider based on service provider price, service provider availability, etc., a different service provider may be chosen due to the service provider penalty of service provider A.

Table 1500 is also shown to include a rating column 1504. In some embodiments, rating column 1504 includes a rating provided by service provider recommendation service 1126 (e.g., a BBB rating, a Yelp rating, a Facebook rating, a Google rating etc.). For example, a service provider C is shown to have a rating of 1.9/5 which can be a direct reflection of an average Facebook rating of all users that have rated service provider C on Facebook. In some embodiments, a rating in rating column 1504 is a cumulative rating across one or more service provider recommendation services. For example, a service provider D is shown to have a rating of 3.8/5. The rating of 3.8/5 can be an average rating between both Yelp and Facebook. For instance, on Facebook, service provider D may have a rating of 4.0/5, while on Yelp service provider D has a rating of 3.6/5, thus resulting in an average rating of 3.8/5 as shown in rating column 1504. In some embodiments, a rating/score in rating column 1504 is used during model predictive maintenance for an equipment requiring service. In some embodiments, when performing model predictive maintenance, a high rating indicates a higher quality of service should be expected, while a low rating indicates a lower quality of service should be expected. Based on the quality of service expected, the model predictive maintenance for the equipment can estimate that fewer repairs may be required over a time period if the rating is high, according to some embodiments. Similarly, when a rating in rating column 1504 is low, model predictive maintenance for an equipment can predict that more servicing may be required on the equipment over an optimization period due to a lower service quality.

Table 1500 is also shown to include an estimated cost column 1506. In some embodiments, estimated cost column 1506 includes amounts (e.g. $) that a service provider is estimated to cost. In some embodiments, estimated cost column 1506 is a quoted amount by the service provider. In some embodiments, estimated cost column 1506 is an estimation provided by the service provider for an equipment service. In some embodiments, an estimated cost of a service provider is determined based on a query run by wireless transceiver manager 1114 to one or more service provider recommendation service 1126. In some embodiments, service provider recommendation service 1126 provides information regarding how much a service provider charges for a particular service. An estimated cost for a service provider can be generated by equipment service scheduler 1100 based on prior information stored about the service provider in service provider database 1116. For example, service provider B is shown to have an estimated cost of $312. In some embodiments, the estimated cost of $312 of the service provider B comes directly from service provider recommendation service 1126. In some embodiments, the estimated cost of $312 of the service provider B is a previous price that the service provider B charged that was stored in service provider database 1116. In some embodiments, the estimated cost of $312 of the service provider B is estimated based on other service provider attributes (e.g., a service provider with a high rating costs more than a service provider with a low rating).

Table 1500 is also shown to include an availability column 1508. In some embodiments, availability column 1508 indicates when a service provider is available to perform equipment servicing. In some embodiments, availability of service providers in availability column 1508 is gathered based on wireless transceiver manager 1114 gathering availability information from service provider(s) 1124. In some embodiments, availability column 1508 gives upcoming availability of a service provider over a set time period. For example, the set time period may be over a next week where a service provider E is shown to have availability Monday at 10 a.m. and Tuesday at 1 p.m. In some embodiments, equipment service scheduler 1100 accounts for a lead time for the equipment service, such that the lead time indicates a set amount of time in which the equipment service should be completed in its entirety before a deadline determined by MPM system 602. For example, the equipment service scheduler 1100 may consider selecting service provider E on Tuesday at 1 p.m. only if the time it takes to complete the equipment service (e.g., 2 hours) is still within a timeframe set by MPM system 602. For example, if the equipment service takes 2 hours and MPM system 602 requires the equipment service to be completed by Tuesday at 2 p.m., service provider E on Tuesday at 1 p.m. should not be selected. In some embodiments, availability column 1508 includes availability of service providers while constrained by optimal equipment service times received from MPM system 602. In some embodiments, constraining availability column 1508 to the optimal equipment service times prevents non-optimal equipment service times from ever being considered when comparing service providers. In some embodiments, availability column 1508 is empty, indicating that every service provider is completely scheduled over the set time period and/or does not have availability meeting the optimal equipment service times. In some embodiments, a service provider that does not have availability over the set time period is excluded from table 1500.

Table 1500 is also shown to include an adjusted cost column 1510. In some embodiments, adjusted cost column 1510 includes an adjusted price for performing equipment service on each availability time in availability column 1508. In some embodiments, some and/or all values in adjusted cost column 1510 are calculated by MPM system 602. In some embodiments, a value in adjusted cost column 1510 indicates a combined value of an estimated cost of a service provider from estimated cost column 1506 and an estimated cost of additional costs incurred for not performing equipment service until each availability time. Additional costs incurred for not performing equipment service until each availability time can be, for example, additional costs for power consumption when an equipment is consuming more power than typical. For example, an outdoor VRF unit can be detected by MPM system 602 as consuming an additional 50% more power than preferred. In response, MPM system 602 communicates to equipment service scheduler 1100 that equipment service needs to be performed on the outdoor VRF unit along with one or more optimal equipment service times to the equipment service to be performed, according to some embodiments. In some embodiments, if service provider A is chosen to perform the equipment service on the outdoor VRF unit, an adjusted cost for performing the equipment service on Monday at 5 p.m. is $300 while an adjusted cost for performing the equipment service on Thursday at 3 p.m. is $350. In some embodiments, a difference of $50 is because of additional cost incurred by the outdoor VRF unit consuming additional power for the additional days between Monday and Thursday. In some embodiments, adjusted costs for a service provider is the same if no additional costs are incurred for not performing equipment maintenance at a particular time. For example, service provider C is shown to have an adjusted cost of $157 for all availability times. In some embodiments, the adjusted cost of $157 for all availability times indicates, from a cost perspective, that it does not matter which availability time is chosen to schedule the equipment service.

Model Predictive Maintenance of a Variable Refrigerant Flow System

Figure 16A:
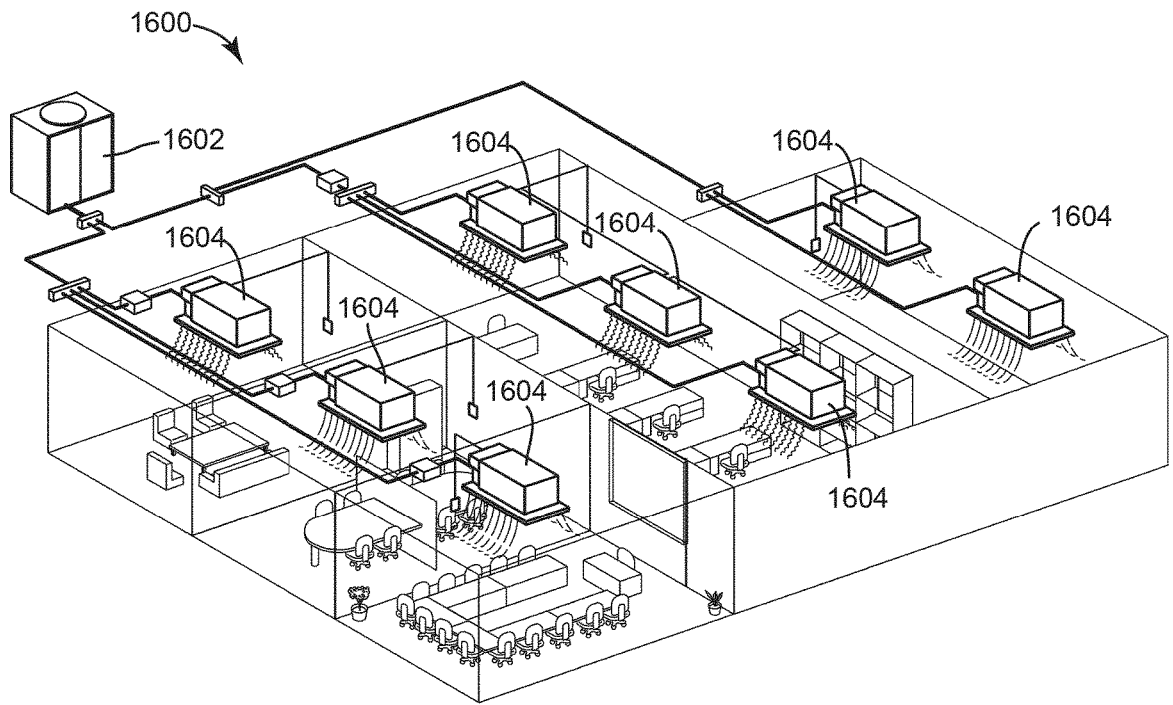
FIGS. 16A-16B are drawings of a variable refrigerant flow (VRF) system having one or more outdoor VRF units and one or more indoor VRF units, according to an exemplary embodiment.
Figure 16B:
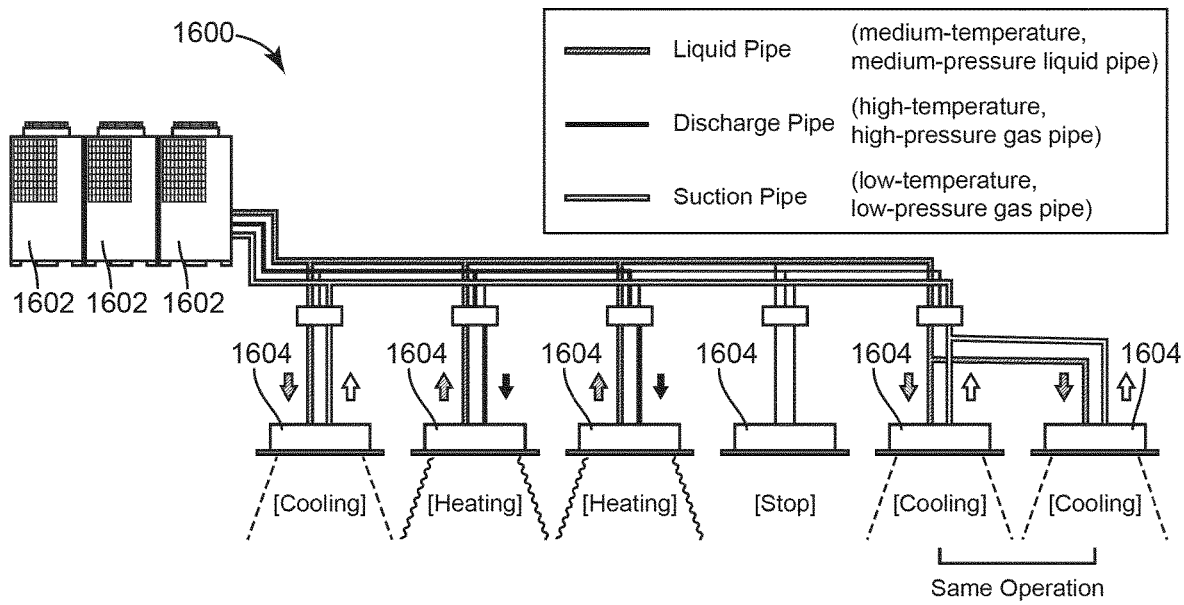

Referring now to FIGS. 16A-16B, a variable refrigerant flow (VRF) system 1600 is shown, according to some embodiments. VRF system 1600 is shown to include a plurality of outdoor VRF units 1602 and a plurality of indoor VRF units 1604. Outdoor VRF units 1602 can be located outside a building and can operate to heat or cool a refrigerant. Outdoor VRF units 1602 can consume electricity to convert refrigerant between liquid, gas, and/or super-heated gas phases. Indoor VRF units 1604 can be distributed throughout various building zones within a building and can receive the heated or cooled refrigerant from outdoor VRF units 1602. Each indoor VRF unit 1604 can provide temperature control for the particular building zone in which the indoor VRF unit is located.

A primary advantage of VRF systems is that some indoor VRF units 1604 can operate in a cooling mode while other indoor VRF units 1604 operate in a heating mode. For example, each of outdoor VRF units 1602 and indoor VRF units 1604 can operate in a heating mode, a cooling mode, or an off mode. Each building zone can be controlled independently and can have different temperature setpoints. In some embodiments, each building has up to three outdoor VRF units 1602 located outside the building (e.g., on a rooftop) and up to 128 indoor VRF units 1604 distributed throughout the building (e.g., in various building zones).

Many different configurations exist for VRF system 1600. In some embodiments, VRF system 1600 is a two-pipe system in which each outdoor VRF unit 1602 connects to a single refrigerant return line and a single refrigerant outlet line. In a two-pipe system, all of the outdoor VRF units 1602 operate in the same mode since only one of a heated or chilled refrigerant can be provided via the single refrigerant outlet line. In other embodiments, VRF system 1600 is a three-pipe system in which each outdoor VRF unit 1602 connects to a refrigerant return line, a hot refrigerant outlet line, and a cold refrigerant outlet line. In a three-pipe system, both heating and cooling can be provided simultaneously via dual refrigerant outlet lines.

In some embodiments, VRF system 1600 is integrated with model predictive maintenance (MPM) system 602 described with reference to FIGS. 6-9. In some embodiments, MPM system 602 is configured to determine an optimal maintenance strategy for VRF system 1600 and any/all components therein. In some embodiments, MPM system 602 is configured to determine an optimal purchase/replacement strategy for VRF system 1600 and any/all components therein similar to and/or the same as the below.

In some embodiments, MPM system 602 can be configured to monitor some and/or all of the components of VRF system 1600 for each component's current state of degradation and usage estimations (e.g., load predictions and performance curves). For example, MPM system 602 can monitor each of the indoor VRF units 1604 and each of the outdoor VRF units 1602. In some embodiments, each of the VRF units can have a different current state of degradation due to various factors (e.g., when the VRF unit was installed, how often the VRF unit is used, what average level of power the VRF unit is run at, etc.). In some embodiments, based on the current state of degradation and usage estimations, MPM system 602 can predict operational costs, maintenance costs, and/or capital costs associated with equipment. In some embodiments, these predictions are made through a process similar to and/or the same as process 1000 described with reference to FIG. 10.

In some embodiments, after the various costs above are predicted, the objective function J can be generated for an optimization period. In some embodiments, after the objective function J is generated, MPM system 602 can be configured to optimize (i.e., minimize) the objective function J. In some embodiments, the optimization of the objective function J can determine optimal values of decision variables for each of the components of VRF system 1600. For example, one decision variable may indicate that an indoor VRF unit 1604 requires maintenance performed on at a particular time step during the optimization period in response to a building zone not being cooled properly. As another example, another decision variable may indicate that an outdoor VRF unit 1602 may need to be replaced (i.e., incurring a capital cost) at a particular time step in the optimization period in response to a detection that outdoor VRF unit 1602 is consuming an additional 50% more power than when the outdoor VRF unit 1602 was installed.

In some embodiments, MPM system 602 managing VRF system 1600 is configured to automatically schedule equipment servicing based on an optimal servicing schedule generated by MPM system 602. In some embodiments, the optimal servicing schedule can include when and how equipment within VRF system 1600 should be serviced. In some embodiments, the optimal servicing schedule can be determined based on a degradation model of the equipment in VRF system 1600. For example, if outdoor unit 1602 is estimated by MPM system 602 to stop functioning in 2 months based on a current state of degradation of outdoor VRF unit 1602, MPM system 602 can recommend scheduling equipment service for outdoor VRF unit 1602 before that time. In some embodiments, equipment service scheduler 1100 can be configured to schedule equipment service based on recommendations from MPM system 602.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps can differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An automatic work order generation system for model predictive maintenance of building equipment, the automatic work order generation system comprising:
a model predictive maintenance system comprising an equipment controller configured to operate the building equipment to affect an environmental condition of a building, wherein the model predictive maintenance system is configured to automatically determine a service time in a future time period at which to service the building equipment by performing a predictive optimization of an objective function for the future time period, wherein the service time is a decision of the predictive optimization and the predictive optimization determines a specific type of maintenance activity to be performed at the service time from a set of multiple different types of maintenance activities based on (1) first costs of operating the building equipment over the future time period predicted to result from the multiple different types of the maintenance activities and (2)

second costs of servicing the building equipment over the future time period predicted to result from the multiple different types of the maintenance activities; and an equipment service scheduler configured to:
   determine whether any service providers are available to perform equipment service within a predetermined time range of the service time;
   in response to determining that one or more of the service providers are available to perform the equipment service within the predetermined time range, select a service provider and an appointment time from the one or more available service providers based on one or more service provider attributes of each of the one or more available service providers;
   generate a service work order for the service provider and the appointment time; and
   transmit the service work order to the service provider to schedule a service appointment at the appointment time for the building equipment.

2. The automatic work order generation system of claim 1, wherein:
the one or more service provider attributes include service provider availability, service provider rating, and service cost;
the one or more service provider attributes define one or more constraints on the predictive optimization; and
the service time is determined by performing the predictive optimization subject to the one or more constraints.

3. The automatic work order generation system of claim 1, wherein the equipment service scheduler is configured to determine a score for each of the one or more available service providers based on the one or more service provider attributes.

4. The automatic work order generation system of claim 3, wherein the equipment service scheduler is configured to select the service provider with a highest score from the one or more available service providers.

5. The automatic work order generation system of claim 1, wherein the equipment service scheduler is configured to search a database of service providers to identify the one or more available service providers and to determine the one or more service provider attributes of each of the one or more available service providers.

6. The automatic work order generation system of claim 1, wherein the equipment service scheduler is configured to select the service provider based on a rating equal to or greater than a predetermined value set by a user.

7. The automatic work order generation system of claim 1, wherein the equipment service scheduler is configured to:
   provide the service provider and the appointment time to a user for approval; and
   generate the service work order in response to receiving approval from the user.

* * * * *